US012811690B2

(12) United States Patent
Howe et al.

(10) Patent No.: US 12,811,690 B2
(45) Date of Patent: *Nov. 24, 2026

(54) POSITION MODULATION TO COMMUNICATE INFORMATION

(71) Applicant: The Boeing Company, Arlington, VA (US)

(72) Inventors: Wayne Richard Howe, Irvine, CA (US); Jeffrey H. Hunt, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/639,004

(22) Filed: Apr. 18, 2024

(65) Prior Publication Data

US 2025/0300737 A1 Sep. 25, 2025

Related U.S. Application Data

(63) Continuation-in-part of application No. 18/475,548, filed on Sep. 27, 2023, which is a continuation-in-part (Continued)

(51) Int. Cl.

*H04B 10/50* (2013.01)
*H04B 10/11* (2013.01)

(52) U.S. Cl.

CPC ........... *H04B 10/503* (2013.01); *H04B 10/11* (2013.01)

(58) Field of Classification Search

CPC .............................. H04B 10/503; H04B 10/11

(Continued)

(56) References Cited

U.S. PATENT DOCUMENTS

| | | | |
|---|---|---|---|
| 1,309,031 | A | 7/1919 | Hettinger |
| 3,404,403 | A | 10/1968 | Vallese et al. |

(Continued)

FOREIGN PATENT DOCUMENTS

| | | | |
|---|---|---|---|
| CA | 3077841 | A1 | 10/2020 |
| CN | 111756470 | A | 10/2020 |

(Continued)

OTHER PUBLICATIONS

Antipov A A et al: "Microwave Generation in an Optical Breakdown Plasma Created by Modulated Laser Radiation", Soviet Journal of Quantum Electronics, American Institute of Physics, New York, NY, US, vol. 6, Jun. 1, 1990 (Jun. 1, 1990), pp. 664-666, XP000174924, ISSN: 0049-1748, DOI: 10.1070/QE1990V020N06ABEH006676.

(Continued)

*Primary Examiner* — Amritbir K Sandhu

(74) *Attorney, Agent, or Firm* — Yee & Associates, P.C.

(57) ABSTRACT

A communications system comprising a laser generation system configured to emit a set of laser beams, a computer system, and a communications manager in the computer system. The communications manager is configured to identify digital information for transmission. The communications manager is configured to control an emission of the set of laser beams by the laser generation system to generate electromagnetic radiation at positions in a space that encode the digital information.

22 Claims, 66 Drawing Sheets

Related U.S. Application Data of application No. 18/361,036, filed on Jul. 28, 2023, now Pat. No. 12,676,680, which is a continuation-in-part of application No. 18/334,739, filed on Jun. 14, 2023, now Pat. No. 12,476,710, which is a continuation-in-part of application No. 18/067,516, filed on Dec. 16, 2022, now Pat. No. 12,401,425, and a continuation-in-part of application No. 18/067,547, filed on Dec. 16, 2022, now Pat. No. 12,407,420.

(58) Field of Classification Search
USPC .......................................................... 398/115
See application file for complete search history.

(56) References Cited

U.S. PATENT DOCUMENTS

| | | | | |
|---|---|---|---|---|
| 3,719,829 | A | 3/1973 | Vaill | |
| 6,087,992 | A | 7/2000 | Anderson | |
| 6,087,993 | A | 7/2000 | Anderson et al. | |
| 6,377,436 | B1 | 4/2002 | Margolin | |
| 6,650,297 | B2 | 11/2003 | Anderson et al. | |
| 6,657,594 | B2 | 12/2003 | Anderson | |
| 6,674,970 | B1 | 1/2004 | Anderson | |
| 7,456,791 | B2 | 11/2008 | Pellet | |
| 7,613,074 | B1 | 11/2009 | Blackmon et al. | |
| 7,965,241 | B2 | 6/2011 | Marquis | |
| 8,922,436 | B2 | 12/2014 | Stone et al. | |
| 10,069,564 | B2 | 9/2018 | Hening et al. | |
| 10,211,522 | B2 | 2/2019 | Anderson | |
| 10,411,808 | B2 | 9/2019 | Chien et al. | |
| 10,601,517 | B1 | 3/2020 | Kim et al. | |
| 10,630,383 | B2 | 4/2020 | Zhang et al. | |
| 10,763,963 | B2 | 9/2020 | Jia et al. | |
| 11,024,950 | B2 | 6/2021 | Hening et al. | |
| 12,196,879 | B2 | 1/2025 | Englesbe et al. | |
| 12,580,650 | B2 | 3/2026 | Barnwell et al. | |
| 2007/0215946 | A1 | 9/2007 | Eastlund | |
| 2014/0288539 | A1* | 9/2014 | Bischoff | A61F 9/00825 606/4 |
| 2015/0323647 | A1 | 11/2015 | Jones et al. | |
| 2018/0167144 | A1* | 6/2018 | Howlader | H04B 10/524 |
| 2018/0175936 | A1 | 6/2018 | Jia et al. | |
| 2018/0233876 | A1* | 8/2018 | Schulz | H01S 3/0971 |
| 2018/0263103 | A1 | 9/2018 | Exton | |
| 2019/0068413 | A1 | 2/2019 | Xu et al. | |
| 2019/0094185 | A1 | 3/2019 | Athanassiadis | |
| 2019/0379459 | A1 | 12/2019 | Kim et al. | |
| 2020/0091994 | A1 | 3/2020 | Kalita et al. | |
| 2020/0191721 | A1 | 6/2020 | Morel et al. | |
| 2021/0364476 | A1 | 11/2021 | Safai | |
| 2021/0384981 | A1 | 12/2021 | Dolgin et al. | |
| 2022/0390553 | A1* | 12/2022 | Englesbe | G01S 13/0209 |
| 2023/0198624 | A1 | 6/2023 | Franklin | |
| 2024/0146321 | A1 | 5/2024 | Miyata | |
| 2024/0204878 | A1 | 6/2024 | Howe et al. | |
| 2024/0204883 | A1 | 6/2024 | Howe et al. | |
| 2024/0244738 | A1 | 7/2024 | Walczak et al. | |
| 2024/0244739 | A1 | 7/2024 | Widder et al. | |
| 2024/0267126 | A1 | 8/2024 | Howe et al. | |
| 2025/0365074 | A1 | 11/2025 | Howe et al. | |
| 2026/0031913 | A1 | 1/2026 | Howe et al. | |

FOREIGN PATENT DOCUMENTS

| | | | | |
|---|---|---|---|---|
| CN | 113489495 | A | 10/2021 | |
| CN | 113534321 | B * | 5/2023 | G02B 5/3016 |
| CN | 117240375 | A | 12/2023 | |
| CN | 117529975 | A | 2/2024 | |
| EP | 3370352 | A1 | 9/2018 | |
| EP | 4016875 | A1 | 6/2022 | |
| GB | 124833 | A | 4/1919 | |
| JP | 3562029 | B2 * | 9/2004 | |
| WO | 2010111089 | A2 | 9/2010 | |
| WO | WO-2017063662 | A1 * | 4/2017 | H01S 3/0971 |
| WO | 2017210871 | A1 | 12/2017 | |

OTHER PUBLICATIONS

European Patent Office Extended Search Report, dated Apr. 25, 2024, regarding Application No. EP23205184.7, 10 pages.
Howe et al., "Motion Modulation to Communicate Information," U.S. Appl. No. 18/639,069, filed Apr. 18, 2024, 171 pages.
Howe et al., "Position and Motion Modulation to Communicate Information," U.S. Appl. No. 18/639,130, filed Apr. 18, 2024, 170 pages.
Zong Si-Guang et al: "Study of opto-acoustic communication between air and underwater carrier", Proceedings of SPIE; [Proceedings of SPIE ISSN 0277-786X vol. 10524], SPIE, US, vol. 10697, Feb. 20, 2018 (Feb. 20, 2018), pp. 106975S-106975S, XP060102900, DOI: 10.1117/12.2315446, ISBN: 978-1-5106-1533-5.
Extended European Search Report, dated Aug. 26, 2025, regarding EP Application No. 25159385.1, 10 pages.
Notice of Allowance, dated Aug. 18, 2025, regarding U.S. Appl. No. 18/334,739, 26 pages.
Zhao Yang et al: "Photoacoustic communication system based on detecting laser-generated sound by optical fiber underwater acoustic sensor", Optics and Lasers in Engineering, Elsevier, Amsterdam, NL, vol. 177, Feb. 29, 2024 (Feb. 29, 2024), XP087483956, ISSN: 0143-8166, DOI: 10.1016/J.OPTLASENG.2024.108134 [retrieved on Feb. 29, 2024] * the whole document *.
Office Action, dated Apr. 23, 2025, regarding U.S. Appl. No. 18/334,739, 87 pages.
Office Action, dated Apr. 4, 2025, regarding U.S. Appl. No. 18/067,547, 70 pages.
Alshershby et al., Reconfigurable Plasma Antenna Produced in Air by Laser-induced Filaments: Passive Radar Application, 2012 International Conference on Optoelectronics and Microelectronics (ICOM), Aug. 23-25, 2012, Changchun, China, 8 pages.
Brelet et al., "Radiofrequency plasma antenna generated by femtosecond laser filaments in air," Applied Physics Letters , vol. 101, Issue 26, Dec. 27, 2012, 4 pages.https://aip.scitation.org/doi/abs/10.1063/1.4773492.
Choe et al., "Radiation characteristics of femtosecond laser-induced plasma channel Vee antenna," Physics of Plasmas, vol. 22, Issue 6, 10.1063/1.4922083, Published Online Jun. 4, 2015, 10 pages.
Dai et al., "Demonstration of 17 Meter Standoff THz Wave Generation," Nonlinear Optics: Materials, Fundamentals and Applications 2009, Honolulu, Hawaii, Jul. 12-17, 2009, 4 pages.
Griffiths et al., "Scalable visible light communications with a micro-LED array projector and high-speed smartphone camera," Optics Express, vol. 27, No. 11, May 27, 2019, pp. 15585-15594, https://opg.optica.org/oe/fulltext.cfm?uri=oe-27-11-15585&id=412698.
Harilal et al., "Lifecycle of laser-produced air sparks," Physics of Plasmas, vol. 22, Issue 6, 10.1063/1.4922076, Published Online Jun. 3, 2015, 35 pages.https://aip.scitation.org/doi/10.1063/1.4922076.
Howe et al., "Analog Amplitude Noise Modulation to Communicate Information," filed Jun. 14, 2023, U.S. Appl. No. 18/334,739, 208 pages.
Howe et al., "Digital Amplitude Noise Shift Keying to Communicate Information," filed Jul. 28, 2023, U.S. Appl. No. 18/361,036, 237 pages.
Howe et al., "Digital Pulse-Position Noise Shift Keying to Communicate Information," filed Sep. 27, 2023, U.S. Appl. No. 18/475,548, 199 pages.
Howe et al., "Pulse Noise Modulation to Encode Data," filed Dec. 16, 2022, U.S. Appl. No. 18/067,547, 98 pages.
Howe et al., "Radio Frequency Communications Using Laser Optical Breakdowns," filed Dec. 16, 2022, U.S. Appl. No. 18/067,516, 100 pages.
Kumar et al., "Detection and analysis of low-frequency electromagnetic emissions from ns laser induced breakdown of air," Proceedings of SPIE—The International Society for Optical Engineering, May 2012, vol. 8434, 7 pages.
Kumar et al., "Effect of laser intensity on radio frequency emissions from laser induced breakdown of atmospheric air," Journal of Applied Physics, vol. 119, Issue 21, 214904, Jun. 7, 2016, 9

(56) References Cited

OTHER PUBLICATIONS pages.https://doi.org/10.1063/1.4953211.

Kumar et al., "Radio frequency emissions from laser induced material breakdown," 10th Asia Plasma and Fusion Association Conference, International Conference Series, Journal of Physics, Conference Series 823, (2017), 012008, 7 pages.

Kumar et al., "RF emissions from laser breakdown of target materials," 2013 International Conference on Microwave and Photonics (ICMAP), Dec. 13-15, 2013, 4 pages.doi: 10.1109/ICMAP.2013.6733512.

Kumar et al., "Spectral selective radio frequency emissions from laser induced breakdown of target materials," Applied Physics Letters, vol. 105, Issue 6, 10.1063/1.4893279, Published Online Aug. 13, 2014, 6 pages.https://doi.org/10.1063/1.4893279.

Li et al., "Optical Computing using hybrid encoded shadow casting," Rapid Communications, Applied Optics, vol. 25, No. 16, Aug. 15, 1986, 4 pages.

Mechain et al., "A virtual antenna produced in air by intense femtosecond laser pulses," European Symposium on Optics and Photonics for Defence and Security, Nov. 3, 2005, Bruges, Belgium, 7 pages.https://www.spiedigitallibrary.org/conference-proceedings-of-spie/5989/59890S/A-virtual-antenna-produced-in-air-by-intense-femtosecond-laser/10.1117/12.631202.short.

Pearlman et al., "Emission of rf radiation from laser-produced plasmas," Journal of Applied Physics, vol. 49, Issue 1, 457 (1978), Published Online Aug. 12, 2008, 4 pages.https://doi.org/10.1063/1.324360.

Stallings, "Spread Spectrum," Data and Computer Communications 7th Edition, Chapter 9, Feb. 2007, 28 pages. http://williamstallings.com/DCC/DCC7e.html.

Theberge et al., "Broadband and long lifetime plasma-antenna in air initiated by laser-guided discharge," Applied Physics Letters, vol. 111, Issue 7, Aug. 14, 2017, 5 pages.https://aip.scitation.org/doi/10.1063/1.4985045.

Wang et al., "Effect of laser energy and polarization on RF emission characteristics of laser induced air plasma," Eleventh International Conference on Information Optics and Photonics (CIOP 2019), 2019, Xi'an, China, Proceedings of SPIE vol. 11209, 8 pages.https://www.spiedigitallibrary.org/conference-proceedings-of-spie.

European Patent Office, Extended Search Report, dated Nov. 11, 2024, regarding Application No. EP24180478.0, 12 pages.

European Patent Office, Extended Search Report, dated Oct. 25, 2024, regarding Application No. EP24180480.6, 10 pages.

Office Action, dated Oct. 31, 2025, regarding U.S. Appl. No. 18/361,036, 111 pages.

Yu et al; Plasma optical modulators for intense lasers; Jun. 2016, Nature communications, pp. 1-7. (Year: 2016).

Office Action, dated May 14, 2025, regarding U.S. Appl. No. 18/067,516, 44 pages.

Notice of Allowance, dated Feb. 23, 2026, regarding U.S. Appl. No. 18/361,036, 13 pages.

Budinger et al; Quaternary Pulse Position Modulation Electronics for Free-Space Laser Communication; 1991; NASA Techincal Memorandum 104502; pp. 1-21. (Year: 1991).

Li; Design of Digital Pulse-Position Modulation System based on minimum distance method—2022; International conference on Neural networks; pp. 1-8. (Year: 2022).

Office Action, dated Jan. 29, 2026, regarding U.S. Appl. No. 18/475,548, 86 pages.

Kumar et al., "A reconfigurable plasma antenna," Journal of Applied Physics, Mar. 1, 2010, 10 pages, vol. 107, Issue 5, AIP Publishing, accessed Jul. 16, 2025, https://doi.org/10.1063/1.3318495. (Re-Cited).

Notice of Allowance, dated Apr. 21, 2026, regarding U.S. Appl. No. 18/475,548, 24 pages.

Christian et al; Analysis and Improvement of motion encoding in magnetic resonance encoding; Aug. 2018; Wiley; pp. 1-20. ( Year: 2018).

Gu et al; Motion Matters: Motion-guided Modulation Network for Skeleton-based Micro-Action Recognition; Nov. 2025; Hefei University of Technology; pp. 1-10. (Year: 2025).

Office Action, dated Jun. 16, 2026, regarding U.S. Appl. No. 18/639,130, 73 pages.

Office Action, dated May 28, 2026, regarding U.S. Appl. No. 18/639,069, 76 pages.

Notice of Allowance, dated Jul. 28, 2026, regarding U.S. Appl. No. 18/639,069, 19 pages.

Notice of Allowance, dated Jul. 30, 2026, regarding U.S. Appl. No. 18/639,130, 20 pages.

* cited by examiner

4000

| | BIT POSITIONS 1 | BIT POSITIONS 2 | BIT POSITIONS 3 | BIT POSITIONS 4 | BIT POSITIONS 5 | BIT POSITIONS 6 | BIT POSITIONS 7 | BIT POSITIONS 8 |
|---|---|---|---|---|---|---|---|---|
| BIT POSITIONS A | 1 | 0 | 1 | 0 | 1 | 1 | 0 | 1 |
| BIT POSITIONS B | 0 | 1 | 1 | 1 | 0 | 0 | 1 | 0 |
| BIT POSITIONS C | 0 | 1 | 0 | 1 | 1 | 0 | 0 | 1 |
| BIT POSITIONS D | 1 | 0 | 1 | 0 | 0 | 1 | 0 | 0 |
| BIT POSITIONS E | 0 | 1 | 0 | 1 | 0 | 1 | 1 | 1 |
| BIT POSITIONS F | 0 | 0 | 0 | 1 | 1 | 1 | 0 | 0 |
| BIT POSITIONS G | 1 | 0 | 1 | 1 | 0 | 0 | 1 | 1 |
| BIT POSITIONS H | 0 | 1 | 0 | 1 | 1 | 1 | 1 | 1 |

FIG. 40

4000

| | BIT POSITIONS 1 | BIT POSITIONS 2 | BIT POSITIONS 3 | BIT POSITIONS 4 | BIT POSITIONS 5 | BIT POSITIONS 6 | BIT POSITIONS 7 | BIT POSITIONS 8 |
|---|---|---|---|---|---|---|---|---|
| BIT POSITIONS A | 0 | 1 | 1 | 1 | 0 | 0 | 1 | 0 |
| BIT POSITIONS B | 0 | 1 | 0 | 1 | 1 | 0 | 0 | 1 |
| BIT POSITIONS C | 1 | 0 | 1 | 0 | 0 | 1 | 0 | 0 |
| BIT POSITIONS D | 0 | 1 | 0 | 1 | 0 | 1 | 1 | 1 |
| BIT POSITIONS E | 0 | 0 | 0 | 1 | 1 | 1 | 0 | 0 |
| BIT POSITIONS F | 1 | 0 | 1 | 1 | 0 | 0 | 1 | 1 |
| BIT POSITIONS G | 0 | 1 | 0 | 1 | 1 | 1 | 1 | 1 |
| BIT POSITIONS H | 1 | 0 | 1 | 0 | 1 | 1 | 0 | 1 |

FIG. 41

POSITION MODULATION TO COMMUNICATE INFORMATION

CROSS-REFERENCE TO RELATED APPLICATIONS

This application is a Continuation-in-Part (CIP) of U.S. patent application entitled "Digital Pulse-Position Noise Shift Keying to Communicate Information,", Ser. No. 18/475,548, filed Sep. 27, 2023, which is a Continuation-in-Part (CIP) of U.S. patent application entitled "Digital Amplitude Noise Shift Keying to Communicate Information,", Ser. No. 18/361,036, filed Jul. 28, 2023, which is a Continuation-in-Part (CIP) of U.S. patent application entitled "Analog Amplitude Noise Modulation to Communicate Information,", Ser. No. 18/334,739, filed Jun. 14, 2023, which is a Continuation-in-Part (CIP) of U.S. patent application entitled "Radio Frequency Communications Using Laser Optical Breakdowns,", Ser. No. 18/067,516, filed Dec. 16, 2022, and U.S. patent application entitled "Pulse Noise Modulation to Encode Data,", Ser. No. 18/067,547, filed Dec. 16, 2022, all of which are incorporated herein by reference in their entirety.

This application is related to the following U.S. patent application entitled "Motion Modulation to Communicate Information," Ser. No. 18/639,069, and U.S. patent application entitled "Position and Motion Modulation to Communicate Information," Ser. No. 18/639,130, filed even date hereof, assigned to the same assignee, and incorporated herein by reference in their entirety.

BACKGROUND INFORMATION

1. Field

The present disclosure relates generally to communications and in particular, to methods, apparatuses, systems, and computer program products for communicating information using radio frequency (RF), optical, and/or other signals within the electromagnetic spectrum without physical antenna structures.

2. Background

Wireless communications using radio frequency (RF) signals, optical, and/or other signals within the electromagnetic spectrum are common and widespread. Radio frequency signals are commonly used in computer networks, for example, in the form of Wi-Fi signals that provide communications links between various computing devices.

Radio frequency signals are also used for communications between various clients such as ships, aircraft, land vehicles, buildings, and other physical locations. These communications can include data and/or information such as position information, voice messages, voice communications, and other types of information and/or data. For example, other types of information and/or data can include digital and analog signaling.

Communications using radio frequency transmissions are facilitated using physical antennas. The transmission or reception of radio frequency signals occurs between antennas. The use of physical antennas can be less convenient or reliable than desired.

In addition, radio frequency communications can be implemented using a carrier signal or carrier wave modulated by at least one of a modulation signal, a message signal, or an information signal that modulates or digitally "shift keys" the carrier wave.

The terms "shift key", "shift keys", "shift keying" and similar terms are terms of art used in the communications technology field to describe digital modulation techniques that represent digital data as variations of a carrier wave or carrier signal. The terms de-"shift key" or de-"shift keying" are terms used to describe demodulation of digital data. In these examples, shift keying is a form of modulation. Classical carrier signals use at least one of periodic waves, repeating waveforms, pseudo-random waveforms, or other predictable waveforms such as sinusoidal, cosinusoidal, square-waves, sawtooth, or other repeatable carriers which are then modulated in various ways by the message signal, modulation signal, and/or information signal.

Communications have been attempted using lasers, gas-filled tubes, electric arcs, high-voltage electrodes, high-voltage fields, field exciter members, and other mechanisms to create and maintain "plasma antennas" including plasma columns, plasma filaments, plasma structures, plasma channels, laser-induced plasma filaments (LIPF), arrays of focusing and defocusing cycles of plasma, and/or bounded or unbounded ionized air or water columns to emulate the shapes and/or conductance of physical antennas. These devices may be continuous wave or pulsed devices. Previous communication approaches attempt to input, impel, induce, impute, impress upon, influence, and/or modulate an RF or other signal onto the plasma or conductive plasma column with a coupling device, such as an RF coupler, an electromagnetic or capacitive coupling device, an electro-optical crystal, electro-optic modulators such as beams of light, and/or other influencing device. In effect, previous approaches attempt to treat plasma or the plasma column as a conductor or a classical physical conducting antenna, such as a monopole or dipole device. These approaches use conventional modulation of periodic, repeating, sinusoidal, and/or pseudo-random carrier waveforms, such as amplitude-, frequency-, and/or phase-modulation, to generate, induce, impel, influence, and/or control the plasma's amplitude-, frequency-, or phase-modulated electromagnetic fields that radiate from the plasma or plasma column.

Therefore, it would be desirable to have methods, systems, and apparatuses that take into account at least some of the issues discussed above, as well as other possible issues. For example, it would be desirable to have methods and apparatus that overcome a technical problem with radio frequency communications using physical antennas. It would also be desirable to have systems, methods, and apparatuses that overcome the limitations of periodic and/or predictable carriers. It would also be desirable to have systems, methods, and apparatuses that overcome the limitations of plasma antennas and coupled modulation.

SUMMARY

An embodiment of the present disclosure provides a communications system comprising a laser generation system configured to emit a set of laser beams, a computer system, and a communications manager in the computer system. The communications manager is configured to identify digital information for transmission. The communications manager is configured to control an emission of the set of laser beams by the laser generation system to generate electromagnetic radiation at positions in a space that encode the digital information.

Another embodiment of the present disclosure provides a method for communicating digital information. Digital information is identified for transmission. An emission of a set of laser beams by a laser generation system is controlled to cause electromagnetic radiation at positions in a space that encode the digital information.

Yet another embodiment of the present disclosure provides a computer program product for communicating digital information. The computer program product comprises a computer-readable storage medium having program instructions embodied therewith. The program instructions are executable by a computer system to cause the computer system to perform computer operations to identify the digital information for transmission, and control an emission of a set of laser beams by a laser generation system to cause electromagnetic radiation at positions in a space that encode the digital information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 40 is an illustration of a two-dimensional array of positions for plasma dots in accordance with an illustrative embodiment;

FIG. 41 is an illustration of a two-dimensional array of positions for plasma dots in accordance with an illustrative embodiment;

FIG. 66 is an illustration of a flowchart of a process for controlling the emission of a set of laser beams in accordance with an illustrative embodiment;

DETAILED DESCRIPTION

Figure 1A:
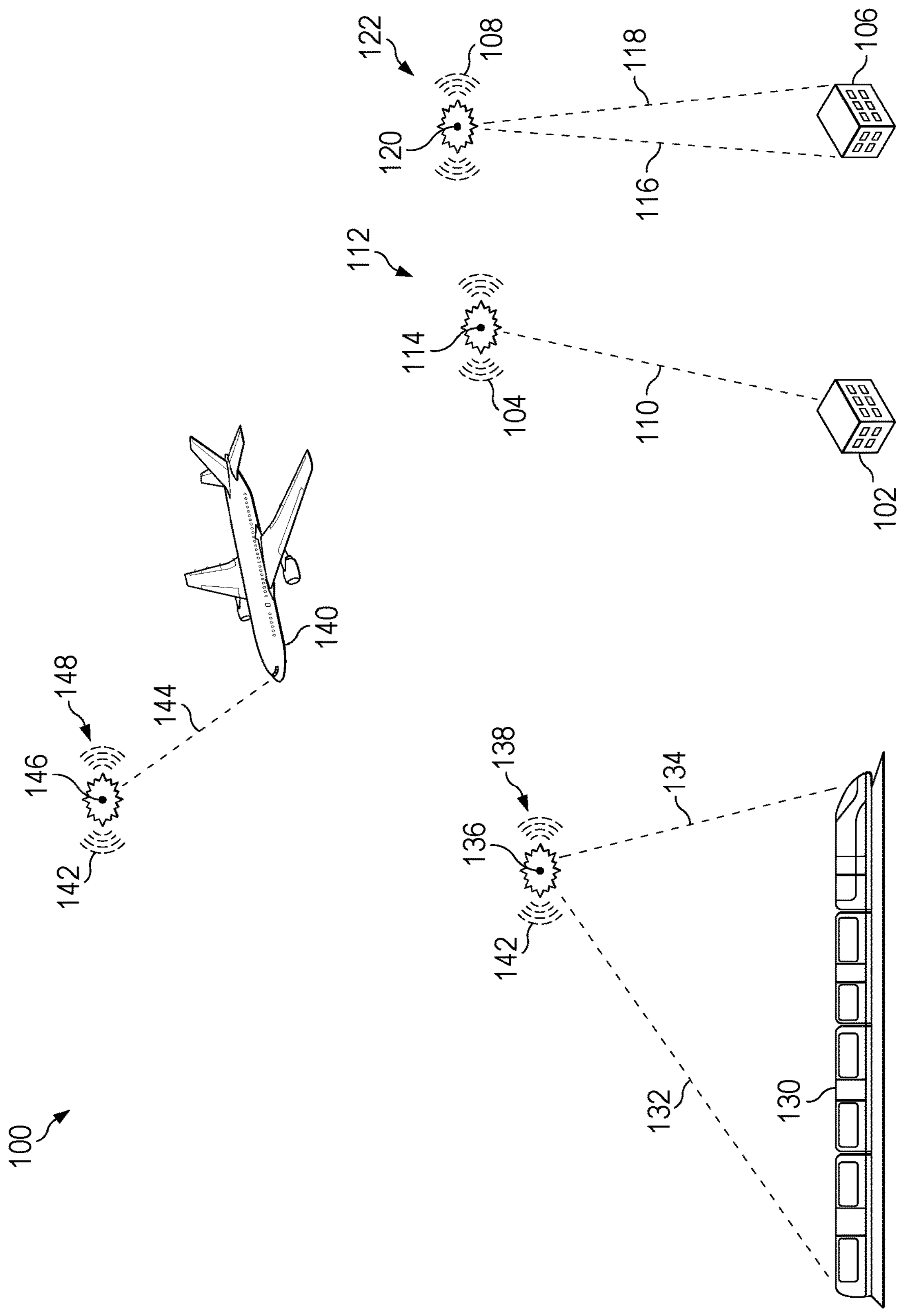
FIG. 1A is a pictorial representation of platforms that can transmit radio frequency signals using non-physical antennas in which illustrative embodiments may be implemented.

The illustrative embodiments recognize and take into account one or more different considerations as described herein. For example, currently used physical antennas for transmitting radio frequency signals are subject to damage or destruction from various causes. For example, adverse weather conditions such as a hurricane or tornado can damage or destroy antennas such as transmission towers for land-based communications. As another example, these physical antennas are also subject to damage or destruction from kinetic attacks.

In other considerations, currently used "plasma antennas" require an ionized column of air or water which is not readily relocatable or easily repositioned. Plasma antennas also require a coupling mechanism to modulate the ionized plasma column as if it were a traditional conductive antenna. Plasma antennas also must use traditional modulation techniques of sinusoidal, pseudorandom, and/or other repeating carrier signals which may be easily detected and decoded.

As used herein, the phrase "and/or" when used with a list of items means different combinations of one or more of the listed items can be used and only one of each item in the list can be needed. In other words, "and/or" when used with a list of items means any combination of items and number of items can be used from the list, but not all of the items in the list are required. The item can be a particular object, thing, or a category. For example, without limitation, item A, item B, and/or item C" can mean solely item A, solely item B, solely item C, both items A and B, both items B and C, both items A and C, or all three items A and B and C.

Thus, the illustrative embodiments provide a method, apparatus, system, and computer program product for transmitting radio frequency signals without hardware such as transmission towers and physical antenna structures. In one or more illustrative examples we provide a non-physical radio frequency antenna that is impervious to adverse environmental conditions and kinetic attack. These illustrative embodiments provide a method, apparatus, system, and computer program product for transmitting radio frequency signals without plasma antennas and/or ionized columns of air or water, without coupling mechanisms, and without the need for periodic, repeating, sinusoidal, and/or pseudorandom carrier waves with classical modulation schemes based on these periodic, repeating, sinusoidal, and/or pseudorandom carrier waves. Further, these non-physical radio frequency antennas can be more difficult to detect.

These transmitters can be positioned away from airplanes, transport, installations, buildings, or other physical locations that are subject to attack or undesired environmental conditions.

In the illustrative examples, radio frequency transmissions are transmitted by using laser beams that induce, cause, and/or control optical breakdowns to generate and control the radio frequency transmissions. In this illustrative example, the optical breakdowns create plasma that generates the radio frequency signals including radio frequency noise. These optical breakdown points where the optical breakdowns occur are the points of origination for transmitting the radio frequency signals and/or radio frequency noise. These optical breakdown points also may be used for transmission in the range of light frequencies, either visible and/or non-visible light.

With reference now to the figures and, in particular, with reference to FIG. 1A, a pictorial representation of platforms that can transmit radio frequency signals using non-physical antennas is depicted in which illustrative embodiments may be implemented. As depicted, radio frequency signals can be transmitted from various platforms as depicted in this figure.

As depicted, ground station 102 can transmit radio frequency signals 104 without using a physical antenna. In a similar fashion, ground station 106 can also transmit radio frequency signals 108 without using a physical antenna.

In this example, laser beams are used by these ground stations to transmit the radio frequency signals. For example, ground station 102 emits laser beam 110 in a manner that causes optical breakdown 112 at optical breakdown point 114. Radio frequency signals 104 are generated at and transmitted from optical breakdown point 114.

In this example, ground station 106 emits laser beam 116 and laser beam 118 at optical breakdown point 120 to cause optical breakdown 122. In this example, two laser beams are used to cause optical breakdown 122 that results in transmission of radio frequency signals 108.

This type of transmission can be used from other platforms such as train 130. In this example, train 130 emits laser beam 132 and laser beam 134 from different physical locations on train 130 at optical breakdown point 136. The intersection of these two laser beams at optical breakdown point 136 causes optical breakdown 138. As a result, radio frequency signals 142 are transmitted in response to optical breakdown 138 at optical breakdown point 136.

As another example, airplane 140 transmits radio frequency signals 142 using laser beam 144. As depicted, laser beam 144 is emitted from airplane 140 at optical breakdown point 146. Optical breakdown 148 occurs at optical breakdown point 146 which results in the transmission of radio frequency signals 142.

Figure 1B:
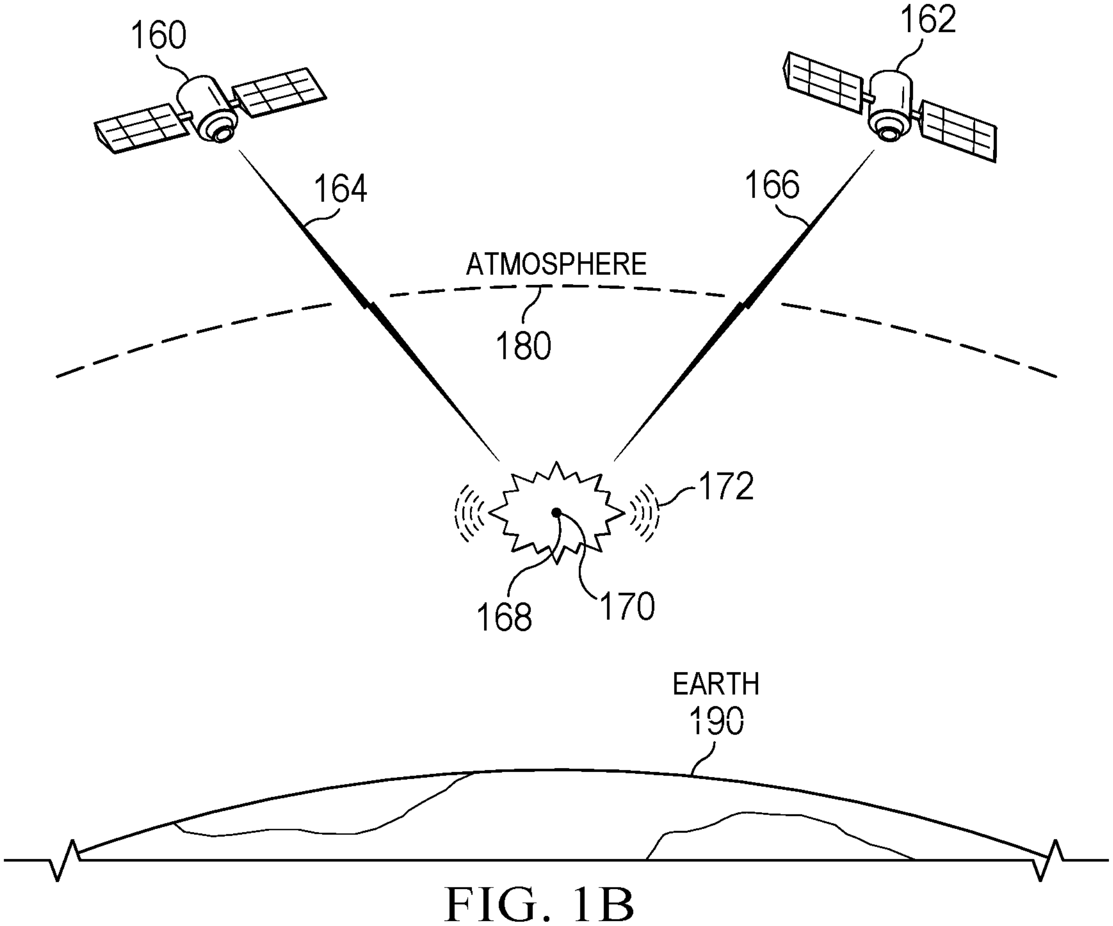
FIG. 1B is a pictorial representation of platforms that can transmit radio frequency signals using non-physical antennas from space in which illustrative embodiments may be implemented.

Turning now to FIG. 1B, a pictorial representation of platforms that can transmit radio frequency signals using non-physical antennas from space in which illustrative embodiments may be implemented. As another example, in FIG. 1B, satellite 160 emits laser 164 from space into the atmosphere 180 above earth 190 while satellite 162 emits laser 166 from space into the atmosphere 180 such that laser 164 and laser 166 intersect at optical breakdown point 168 causing optical breakdown 170 which results in radio frequency signals 172 originating and emanating from optical breakdown point 168.

Figure 1C:
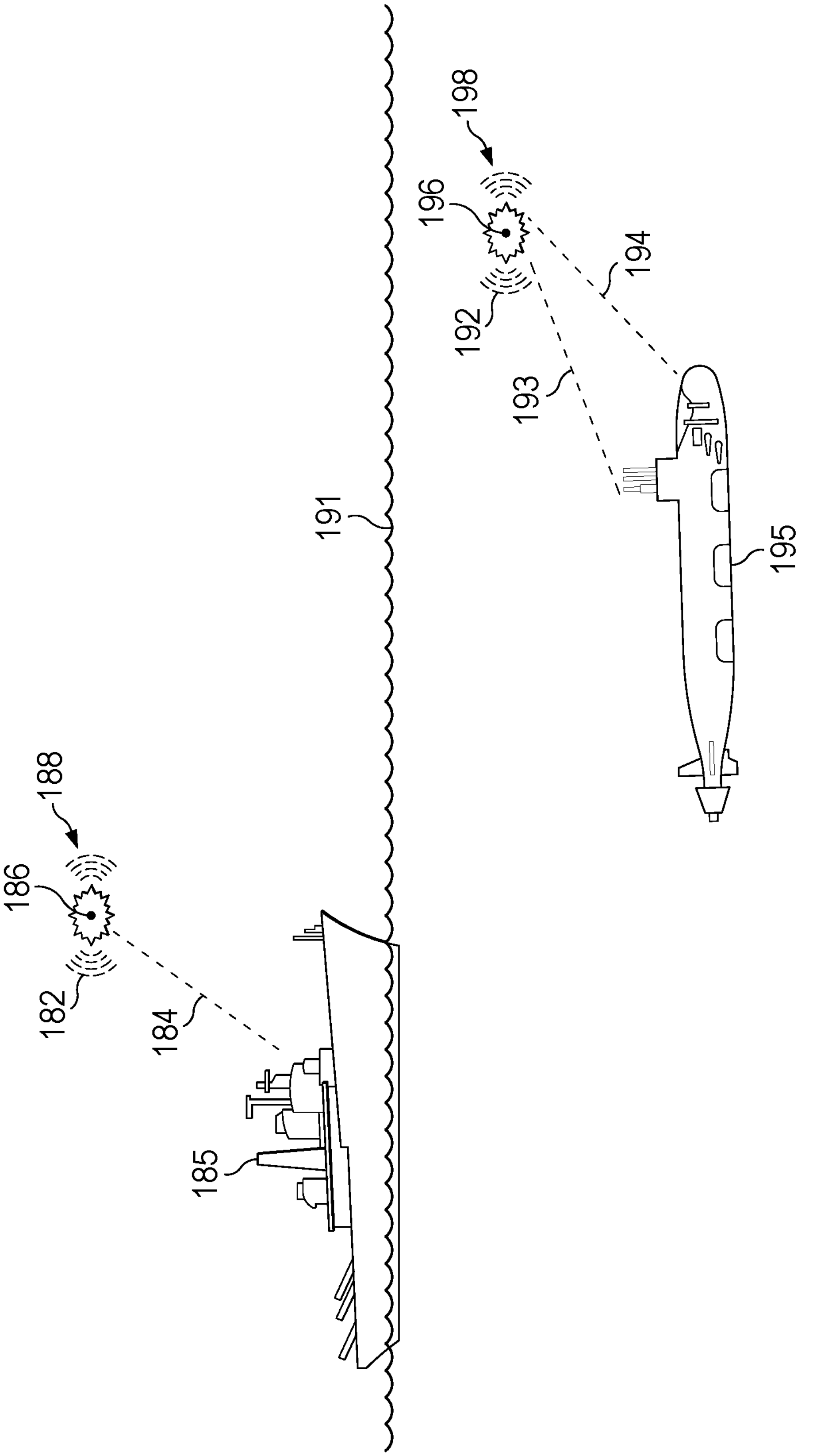
FIG. 1C is a pictorial representation of platforms that can transmit radio frequency signals using non-physical antennas on, in, or under water in which illustrative embodiments may be implemented.

Turning now to FIG. 1C, a pictorial representation of platforms that can transmit radio frequency signals using non-physical antennas on, in, or under water 191 in which illustrative embodiments may be implemented. In this example, ship 185 emits laser beam 184 from ship 185 in a manner that at least one of causes or controls optical breakdown 188 at optical breakdown point 186. As a result, radio frequency signals 182 as well as light emissions are transmitted in response to optical breakdown 188 at optical breakdown point 186.

As another example, submarine 195 emits laser beam 193 and laser beam 194 from different physical locations on submarine 195. The intersection of these two laser beams at optical breakdown point 196 causes optical breakdown 198 which results in the transmission of radio frequency signals 192 as well as underwater light emissions, including visible and non-visible light frequencies.

As depicted, these radio frequency signals are generated without using physical antennas to transmit signals. Further, these radio frequency signals are transmitted at physical locations away from the platforms. As a result, identifying the platforms generating these radio frequency signals can be more difficult because antennas for transmitting the radio frequency signals are not visible. Further, tracking the physical location of where the radio frequency signals are generated does not provide identification of the platform or the platform physical location, nor the physical location of the communications system, computer system, communications manager, or the laser origination points in these examples.

The physical locations of these optical breakdowns are considered radio frequency source emitters that can be in remote physical locations from the platforms emitting the laser beams. As a result, identifying the physical locations of the platforms becomes more difficult with the absence of physical antennas. Note that these optical breakdowns are distinguished from "plasma antennas" or ionized air or water columns.

Illustration of the different platforms in radio frequency communications environment 100 are only provided as examples of platforms that can implement this type of radio frequency signal transmission. In other illustrative examples, other platforms in addition to or in place of these platforms can be used. For example, this type of radio frequency generation can be implemented in a surface ship, a car or truck, a cruise missile, an aerial vehicle, a tank, a submersible sensor, or some other suitable type of platform in other illustrative examples.

Figure 2:
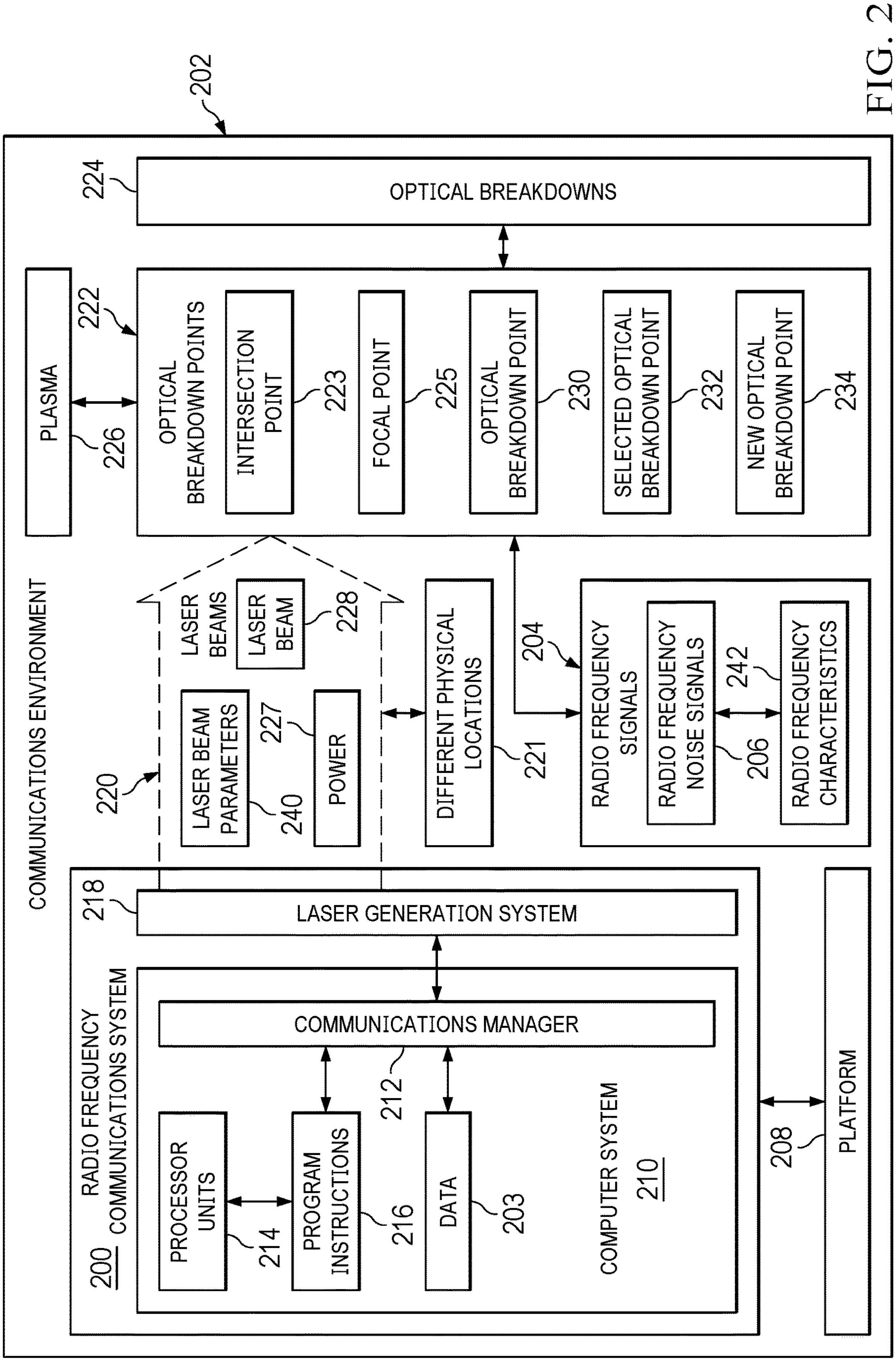
FIG. 2 is an illustration of a block diagram of a radio frequency communications environment in accordance with an illustrative embodiment.

With reference now to FIG. 2, an illustration of a block diagram of a radio frequency communications environment is depicted in accordance with an illustrative embodiment. In this illustrative example, radio frequency communications system 200 in communications environment 202 can communicate data 203 by using radio frequency signals 204 in the form of radio frequency noise signals 206.

Data 203 can take a number of different forms. For example, data 203 can be a document, a spreadsheet, sensor data, an image, a video, and email message, a text message, a webpage, a table, a data structure, serial data, commands, or other types of data that is to be transmitted or communicated. Data can also be analog or digital information and/or data. Analog and digital information and/or data can include, for example, music and audio.

In one illustrative example, a noise signal is a signal with irregular fluctuations that are or appear to be at least one of random, non-predictable, or nondeterministic.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. Thus, a noise signal can be non-predictable.

In this example, radio frequency noise signals 206 are electromagnetic noise signals that can have a frequency from around 20 kHz to above the Terahertz range. Radio frequency noise signals can include signals with frequencies such as extremely low frequency (ELF), high frequency (HF), and other types of frequencies. These noise signals can also include microwave noise signals and Terahertz noise signals. Electromagnetic noise signals can also be optical noise in the visible range, infrared, ultraviolet X-rays and other types of noise signals that can be used as modulated noise. For example, lasers used at optical breakdown also may transmit various ranges of noisy light in addition to noisy broadband radio frequencies. Modulating this noisy light with different techniques such as pulse noise modulation is included in this disclosure.

In this illustrative example, radio frequency communications system 200 is associated with platform 208. Platform 208 is an object that can transmit radio frequency noise signals 206 using radio frequency communications system 200.

Platform 208 can take a number of different forms. For example, platform 208 can be one of a mobile platform, a stationary platform, a land-based structure, an aquatic-based structure, and a space-based structure. More specifically, the platform can be a surface ship, a tank, a personnel carrier, a train, an airplane, a commercial airplane, a spacecraft, a space station, a satellite, a submarine, an automobile, a ground station, a power plant, a bridge, a dam, a house, a manufacturing facility, a building, and other suitable platforms.

In this illustrative example, radio frequency communications system 200 comprises computer system 210 and communications manager 212. In this example, communications manager 212 is located in computer system 210.

As used herein, "a number of" when used with reference to items, means one or more items. For example, "a number of different forms" is one or more different forms.

Communications manager 212 can be implemented in software, hardware, firmware or a combination thereof.

When software is used, the operations performed by communications manager 212 can be implemented in program instructions configured to run on hardware, such as a processor unit. When firmware is used, the operations performed by communications manager 212 can be implemented in program instructions and data and stored in persistent memory to run on a processor unit.

When hardware is employed, the hardware may include circuits that operate to perform the operations in communications manager 212. The circuits used to implement communications manager 212 can take other forms in addition to or in place of a processor unit.

In the illustrative examples, the hardware used to implement communications manager 212 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, computer system 210 includes a number of processor units 214 that are capable of executing program instructions 216 implementing processes in the illustrative examples. In other words, program instructions 216 are computer-readable program instructions.

As used herein, a processor unit in the number of processor units 214 is a hardware device and is comprised of hardware circuits such as those on an integrated circuit that respond and process instructions and program code that operate a computer. When the number of processor units 214 executes program instructions 216 for a process, the number of processor units 214 can be one or more processor units that are on the same computer or on different computers. In other words, the process can be distributed between processor units 214 on the same or different computers in a computer system 210.

Further, the number of processor units 214 can be of the same type or different type of processor units. For example, a number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

As depicted, radio frequency communications system 200 can also include laser generation system 218. In other examples, laser generation system 218 can be considered a separate component controlled by radio frequency communications system 200.

In this example, laser generation system 218 is a hardware system that can emit a set of laser beams 220. The operation of laser generation system 218 can be controlled by communications manager 212.

In this example, the set of laser beams 220 can be emitted from different physical locations 221. For example, laser generation system 218 can be comprised of laser units that are positioned in different physical locations. Each physical location can have one or more laser units for laser generation system 218 in this illustrative example.

Communications manager 212 can identify data 203 for transmission using radio frequency noise signals 206. Communications manager 212 controls an emission of a set of laser beams 220. In this example, communications manager 212 directs or steers the set of laser beams 220 at a set of optical breakdown points 222. In this example, the set of optical breakdown points 222 can be selected from at least one of intersection point 223 or focal point 225.

As used herein, "a set of" when used with reference to items, means one or more items. For example, "a set of optical breakdown points 222" is one or more of optical breakdown points 222. In another example, a "set of laser beams" means one or more laser beams.

In this example, intersection point 223 can be a physical location where two or more laser beams intersect. This physical location can be where an optical breakdown occurs from the intersection of two or more laser beams when the power 227 of two or more intersecting laser beams is sufficient to cause an optical breakdown. Focal point 225 can be a physical location where the laser beam is focused to cause an optical breakdown to occur at that physical location.

This emission of the set of laser beams 220 is controlled by communications manager 212 to cause optical breakdowns 224 at the set of optical breakdown points 222 that generate radio frequency noise signals 206 encoding data 203. In this illustrative example, plasma 226 occurs at optical breakdown points 222 in response to optical breakdowns 224 by the set of laser beams 220. This plasma generated by optical breakdowns 224 causes radio frequency noise signals 206 to be transmitted at the set of optical breakdown points 222.

In this example, power 227 of laser beam 228 in the set of laser beams 220 at optical breakdown point 230 in the set of optical breakdown points 222 can be controlled using different mechanisms. For example, power 227 can be controlled by at least one of a shutter, a lens, a deformable lens, a microelectromechanical systems mirror, an attenuator, a controlling optics, an optical filter, an amplitude modulator in a laser beam generator, or other device.

In this illustrative example, communications manager 212 can control the emission of the set of laser beams 220 by laser generation system 218 in a number of different ways. For example, communications manager 212 can control laser generation system 218 to emit a first number of the set of laser beams 220 continuously at the set of optical breakdown points 222. Communications manager 212 can control laser generation system 218 to pulse a second number of the set of laser beams 220 at the set of optical breakdown points 222 to cause optical breakdowns 224 that generate radio frequency noise signals 206 encoding data 203. The laser beam can be pulsed by turning the laser beam on and off. In another example, a laser beam can be pulsed by varying the power of the laser beam. In other words, the power can be pulsed by increasing and decreasing the power of the laser beam.

In another illustrative example, communications manager 212 can control laser generation system 218 to emit the set of laser beams 220 at the set of optical breakdown points 222 causing optical breakdowns 224 that generate radio frequency noise signals 206 encoding data 203.

In this example, the emission of the set of laser beams 220 can be performed in a number of different ways. The set of laser beams can be emitted as at least one of pulsed or continuous. For example, one laser beam can be continuous while another laser beam is pulsed. Further, the laser beams can be originated from different directions at the set of optical breakdown points 222.

The direction at which a laser beam is emitted can move or sweep back such that an optical breakdown point is included during the movement of the laser beam. In other words, during the sweeping of the laser beam the laser beam can intersect with another laser beam. The intersection of this laser beam with another laser beam emitted the optical breakdown point can cause the optical breakdown at that optical breakdown point.

In another illustrative example, communications manager 212 can control laser generation system 218 to emit the set of laser beams 220 at selected optical breakdown point 232 in the set of optical breakdown points 222. Communications manager 212 can select new optical breakdown point 234 in the set of optical breakdown points as the selected optical breakdown point. Communications manager 212 can repeat emitting the set of laser beams 220 and selecting the new optical breakdown point while generating radio frequency noise signals 206 encoding data 203.

In yet another illustrative example, communications manager 212 can control laser generation system 218 to emit the set of laser beams 220 from different physical locations 221 at optical breakdown point 230. In this example, a portion of the set of laser beams 220 intersect at optical breakdown point 230 such that power 227 from the portion of the set of laser beams 220 is sufficient to cause optical breakdowns 224 at intersection point 223 that generate radio frequency noise signals 206 encoding data 203.

As another example, communications manager 212 can control laser generation system 218 to emit the set of laser beams 220 at optical breakdown point 230. In this example, optical breakdowns 224 occur in response to all of the set of laser beams 220 intersecting at optical breakdown point 230.

In controlling the emission of the set of laser beams 220, communications manager 212 can change a set of laser beam parameters 240 for the set of laser beams 220 to encode data 203 into radio frequency noise signals 206 or visible and/or non-visible light. Laser beam parameters 240 include but are not limited to pulse durations, pulse repetition rate, beam diameter, beam profile (temporal and spatial), optical focal length, pulse shape, power, frequency, wavelength, directivity, gain, efficiency, and physical properties of propagation media such as index of refraction. In this example, changing the set of laser beam parameters 240 changes a set of radio frequency characteristics 242 for radio frequency noise signals 206 or visible and/or non-visible light. The set radio frequency characteristics 242 for radio frequency noise signals 206 can be selected from at least one of a timing, an optical breakdown point, an amplitude of the radio frequency noise signals, a frequency band, a relative phase, or other characteristics for radio frequency noise signals 206.

In yet another illustrative example, communications manager 212 can control laser generation system 218 to emit a subset of the set of laser beams 220 at the set of optical breakdown points 222 to cause the optical breakdowns 224 that generates radio frequency noise signals 206 encoding data 203. Communications manager 212 can select a new subset of the set of laser beams 220 as the subset of laser beams 220. Communications manager 212 can repeat emitting of the subset of the set of laser beams 220 and selecting the new subset of the set of laser beams 220 while transmitting radio frequency noise signals 206 encoding the data 203.

Thus, one or more illustrative examples enable transmitting radio frequency noise signals using radio frequency source emitters that do not require physical structures. As a result, one or more illustrative examples can overcome an issue with the vulnerability present in using physical source emitters such as antennas. In the illustrative examples, the optical breakdown points for the optical breakdowns are radio frequency source emitters.

Further, these radio frequency source emitters can be moved almost instantaneously to different physical locations by repositioning the laser beams such that the laser beams point at different optical breakdown points. Attacks at these radio frequency source physical locations are attacks at the optical breakdown points where the plasma is generated. As a result, kinetic attacks against these physical locations are useless because the laser modulation sources are remote from the physical locations of these radio frequency source emitters.

The illustration of communications environment 202 to in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 212 is shown as being implemented using program instructions 216 run on a number of processor units 214 in computer system 210, communications manager 212 can be implemented in other hardware instead of or in addition to the number of processor units 214. For example, computer system 210 may use other hardware in addition to or in place of the number of processor units 214.

For example, other types of hardware circuits capable of performing the operations for communications manager 212 can be used. This other hardware can be at least one of a circuit system, an integrated circuit, an application-specific integrated circuit (ASIC), a programmable logic device, or some other suitable type of hardware configured to perform a number of operations.

Figure 3:
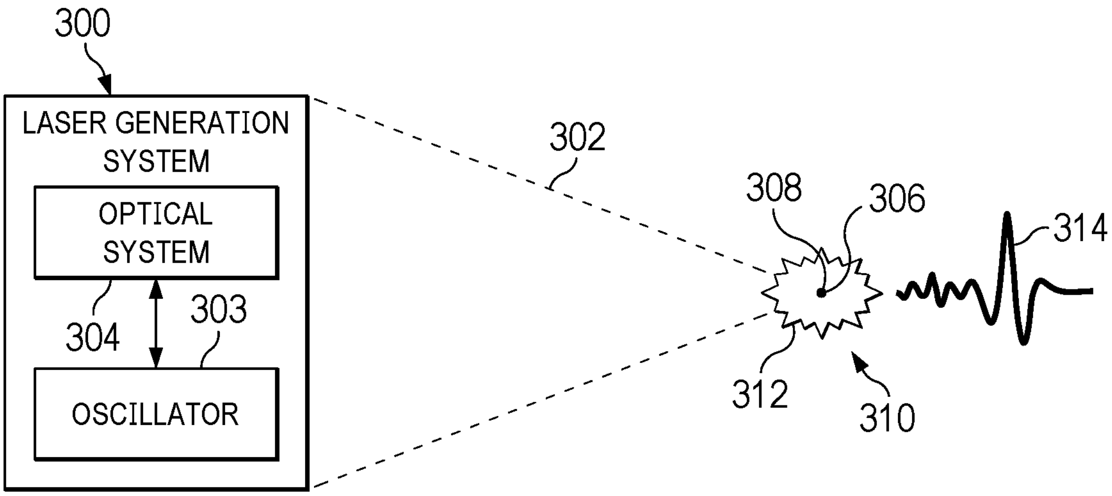
FIG. 3 is an illustration of radio frequency noise generation using a laser beam in accordance with an illustrative embodiment.

Turning next to FIG. 3, an illustration of radio frequency noise generation using a laser beam is depicted in accordance with an illustrative embodiment. This depicted example in FIG. 3 illustrates how a single laser beam can be used to generate radio frequency signals.

In this illustrative example, laser generation system 300 is an example of laser generation system 218 in FIG. 2. Laser generation system 300 emits laser beam 302.

As depicted, laser generation system 300 comprises a number of different components. In this example, laser generation system 300 includes oscillator 303 and optical system 304.

Oscillator 303 generates coherent light for emitting laser beam 302. In this example, optical system 304 can focus laser beam 302. Optical system 304 includes at least one of a lens, a mirror, or other optical element that can change the focus of laser beam 302.

In this example, the focus of laser beam 302 is controlled such that the power at focal point 306 is an optical breakdown point 308 where optical breakdown 310 occurs. As depicted in this example, optical breakdown 310 results in the generation of plasma 312. Plasma 312 resulting from optical breakdown 310 causes the generation of radio frequency noise signal 314. Thus, this example illustrates how a single laser beam can be used to generate radio frequency signals.

Figure 4:
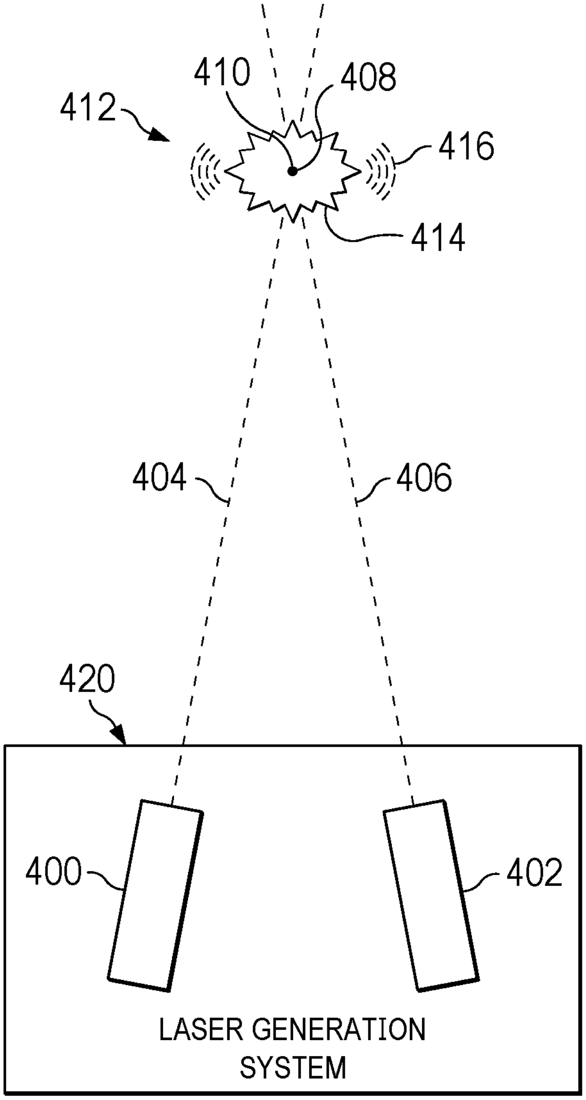
FIG. 4 is an illustration of radio frequency noise generation using a plurality of laser beams in accordance with an illustrative embodiment.

Turning next to FIG. 4, an illustration of radio frequency noise generation using a plurality of laser beams is depicted in accordance with an illustrative embodiment. In this illustrative example, laser generation system 420 comprises laser unit 400 and laser unit 402. Laser generation system 420 is an example of an implementation for laser generation system 218 in FIG. 2.

In this illustrative example, laser unit 400 generates first laser beam 404. Laser unit 402 generates second laser beam 406.

In this example, first laser beam 404 and second laser beam 406 are emitted in directions from these laser beam units to intersect at optical breakdown point 408. These two laser beams are emitted along different paths that intersect at optical breakdown point 408. This optical breakdown point where the two laser beams intersect each other is intersection point 410.

In this example, the intersection of first laser beam 404 and second laser beam 406 results in optical breakdown 412. This optical breakdown generates plasma 414. As depicted in this example, optical breakdown 412 results in radio frequency noise signals 416.

As depicted in the example, optical breakdown 412 occurs where first laser beam 404 and second laser beam 406 intersect at intersection point 410. In this example, the power for first laser beam 404 and second laser beam 406 individually is not sufficient to cause an optical breakdown.

The illustration of the two laser units for laser generation system 420 in FIG. 4 is provided as an example of one implementation for generating radio frequency noise signals. This illustration is not meant to limit the manner in which other illustrative examples can be implemented. In another example, one or more laser units in addition to laser unit 400 and laser unit 402 can be used to generate additional laser beams. The laser beams can also intersect at intersection point 410 to cause optical breakdown 412.

Figure 5:
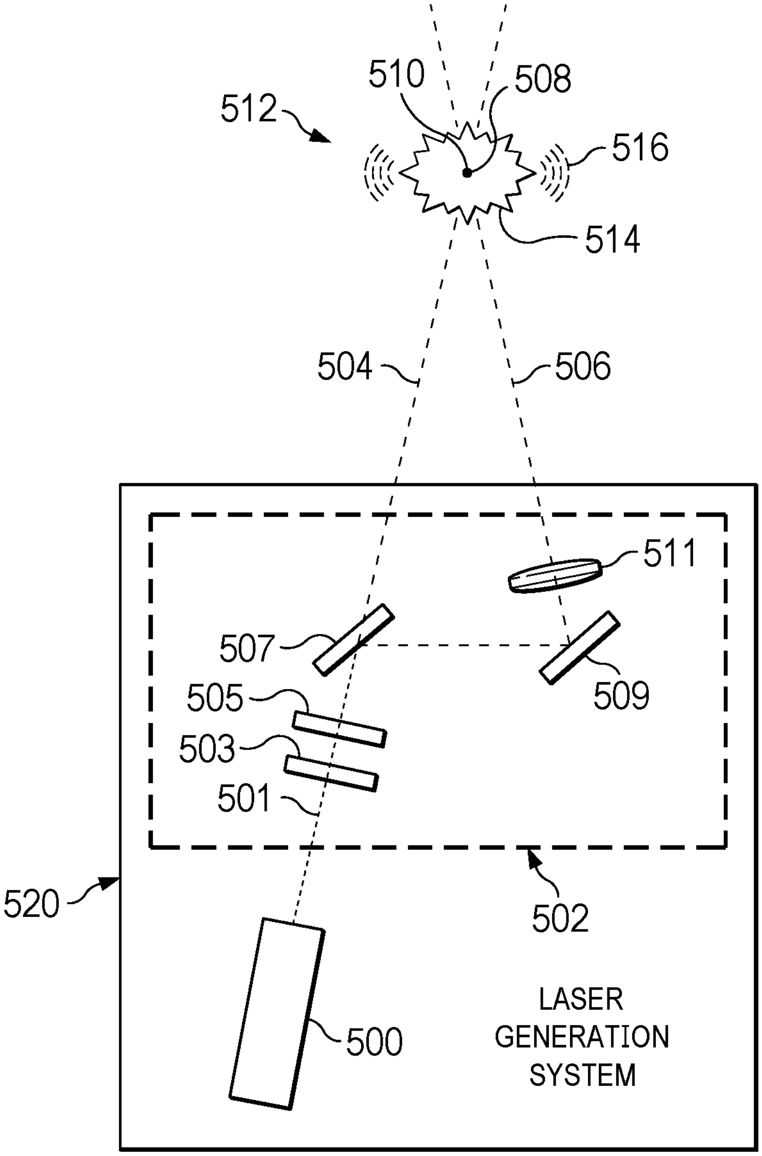
FIG. 5 is an illustration of radio frequency noise generation using a plurality of laser beams in accordance with an illustrative embodiment.

Turning next to FIG. 5, an illustration of radio frequency noise generation using a plurality of laser beams is depicted in accordance with an illustrative embodiment. In this illustrative example, laser generation system 520 comprises laser unit 500 and optical system 502. Laser generation system 520 is an example of an implementation for laser generation system 218 in FIG. 2.

In this example, laser unit 500 emits first laser beam 504 and second laser beam 506. In this example, laser unit 500 generates initial laser beam 501 that is split into two laser beams, first laser beam 504 and second laser beam 506 by optical system 502.

As depicted, optical system 502 comprises a number of different components. In this depicted example, optical system 502 comprises shutter 503, variable attenuator 505, beam splitter 507, mirror 509, and lens 511.

The components depicted are example components that can be used in optical system 502 and can change in other illustrative examples. For example, one or more of lens 511, variable attenuator 505, and shutter 503 may be omitted in other illustrative examples. In yet other illustrative examples, other components may be added such as a lens located before beam splitter 507.

As depicted, initial laser beam 501 is split into two laser beams by beam splitter 507. Mirror 509 can be used to direct second laser beam 506 in different directions. Further, mirror 509 can be used to provide focus to increase the power of second laser beam 506 at a focal point such as optical breakdown point 508. Lens 511 also can be used to provide focus to increase the power of second laser beam 506 at optical breakdown point 508.

In this example, first laser beam 504 and second laser beam 506 are emitted in directions to intersect at optical breakdown point 508, which is intersection point 510 in this example. Optical breakdown 512 occurs at this intersection of first laser beam 504 and second laser beam 506, generating plasma 514 that results in the generation of radio frequency noise signals 516.

In this example, the power of first laser beam 504 and second laser beam 506 are sufficient to cause optical breakdown 512 at the intersection of the laser beams. Optical breakdowns do not occur in other physical locations where these laser beams do not intersect each other in this example.

Figure 6:
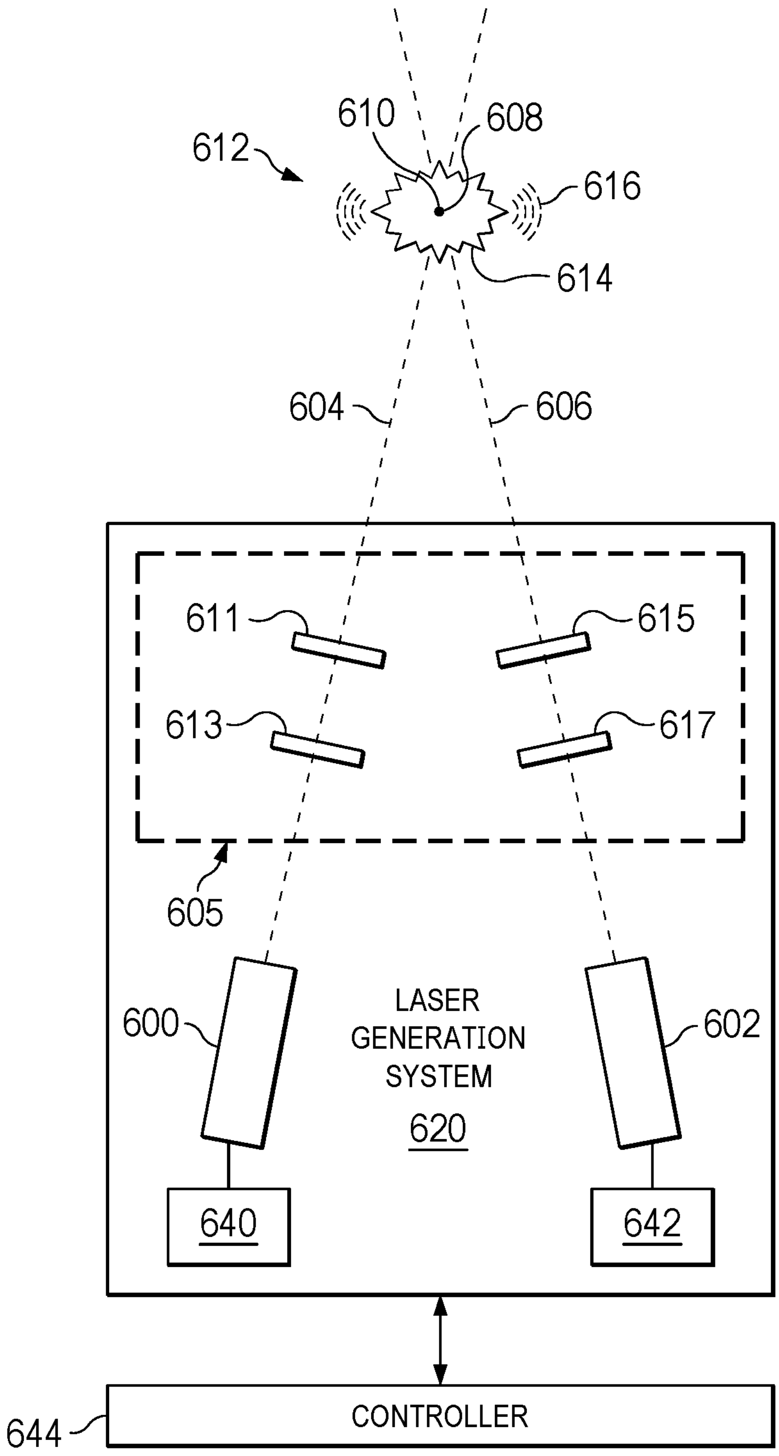
FIG. 6 is an illustration of a diagram for controlling radio frequency noise generation in accordance with an illustrative embodiment.

With reference now to FIG. 6, an illustration of a diagram for controlling radio frequency noise generation is depicted in accordance with an illustrative embodiment. In this illustrative example, the operation of laser generation system 620 is controlled by controller 644. As depicted, laser generation system comprises laser unit 600, laser unit 602, first power source 640, second power source 642, and optical system 605. In this example, controller 644 can control the operation of laser generation system 620.

In this example, laser generation system 620 is an example of an implementation for laser generation system 218 in FIG. 2. Controller 644 is an example a component that can be implemented in communications manager 212 in FIG. 2.

In this illustrative example, controller 644 can control the emission of first laser beam 604 and second laser beam 606 from laser generation system 620. In this illustrative example, laser unit 600 generates first laser beam 604 using power supplied by first power source 640. Laser unit 602 generates second laser beam 606 using power supplied by second power source 642.

In this example, first laser beam 604 and second laser beam 606 are emitted in directions that have paths that intersect at optical breakdown point 608, which is intersection point 610. Optical breakdown 612 occurs at this intersection of first laser beam 604 and second laser beam 606, generating plasma 614 that results in the transmission of radio frequency noise signals 616.

In this example, controller 644 can control the emission of these laser beams such that at least one of first laser beam 604 or second laser beam 606 is pulsed. This pulsing can include at least one of turning a laser beam on and off for increasing and decreasing the power of the laser beam. This pulsing of one or both of first laser beam 604 and second laser beam 606 can be controlled to control the timing of radio frequency noise generation.

When pulsed, optical breakdown 612 occurs when both laser beams intersect at intersection point 610. When one laser beam is turned off, and intersection is not present between both laser beams and optical breakdown 612 does not occur. By controlling the timing of when first laser beam 604 and second laser beam 606 intersect at intersection point 610, controller 644 can control the generation of radio frequency noise signals in a manner that encodes at least one of information or data.

For example, data can be encoded in radio frequency noise signals based on the timing of when radio frequency noise signals are generated. As another example, the timing of the laser beams can be used to control the duration of radio frequency noise signals. This duration can also be used to encode data into the radio frequency noise signals.

In this illustrative example, controller 644 can control whether a laser unit emits a continuous laser beam or a pulsed laser beam using components such as first power source 640 and second power source 642. These power sources can be turned on and off to turn the laser beams on and off. With this pulsing, optical breakdowns occur when both laser beams are on and intersect at intersection point 610.

In this example, the pulsing can also include increasing and decreasing the power in one or both of first laser beam 604 and second laser beam 606. In this example, decreasing the power of one or both laser beams can prevent the occurrence of an optical breakdown because of insufficient power being present when first laser beam 604 and second laser beam 606 intersect at intersection point 610. Optical breakdown 612 occurs when the power present from both laser beams intersecting at intersection point 610 is high enough for an optical breakdown.

As another example, the pulsing of the laser beams can also be controlled using optical elements in optical system 605. These optical elements can be controlled by controller 644 to pulse one or more of first laser beam 604 and second laser beam 606.

For example, variable attenuator 611 and shutter 613 can be operated to pulse first laser beam 604. For example, shutter 613 can be used to selectively emit first laser beam 604. Variable attenuator 611 can be used to change the power of first laser beam 604. In similar fashion, the emission of second laser beam 606 can also be pulsed using variable attenuator 615 and shutter 617.

Thus, the emission of first laser beam 604 and second laser beam 606 from laser generation system 620 can be controlled by controller 644 such that both laser beams are continuous, one laser beam is continuous while the other laser beam is pulsed, or both laser beams are pulsed. This control can be performed to achieve optical breakdowns to transmit radio frequency noise signals in a manner that encodes data into the radio frequency signals.

The illustration of laser generation system 620 is an example of one implementation and is not meant to limit the manner in which other illustrative examples can be implemented. For example, in other illustrative examples one or more laser units can be present in addition to laser unit 600 and laser unit 602.

Figure 7:
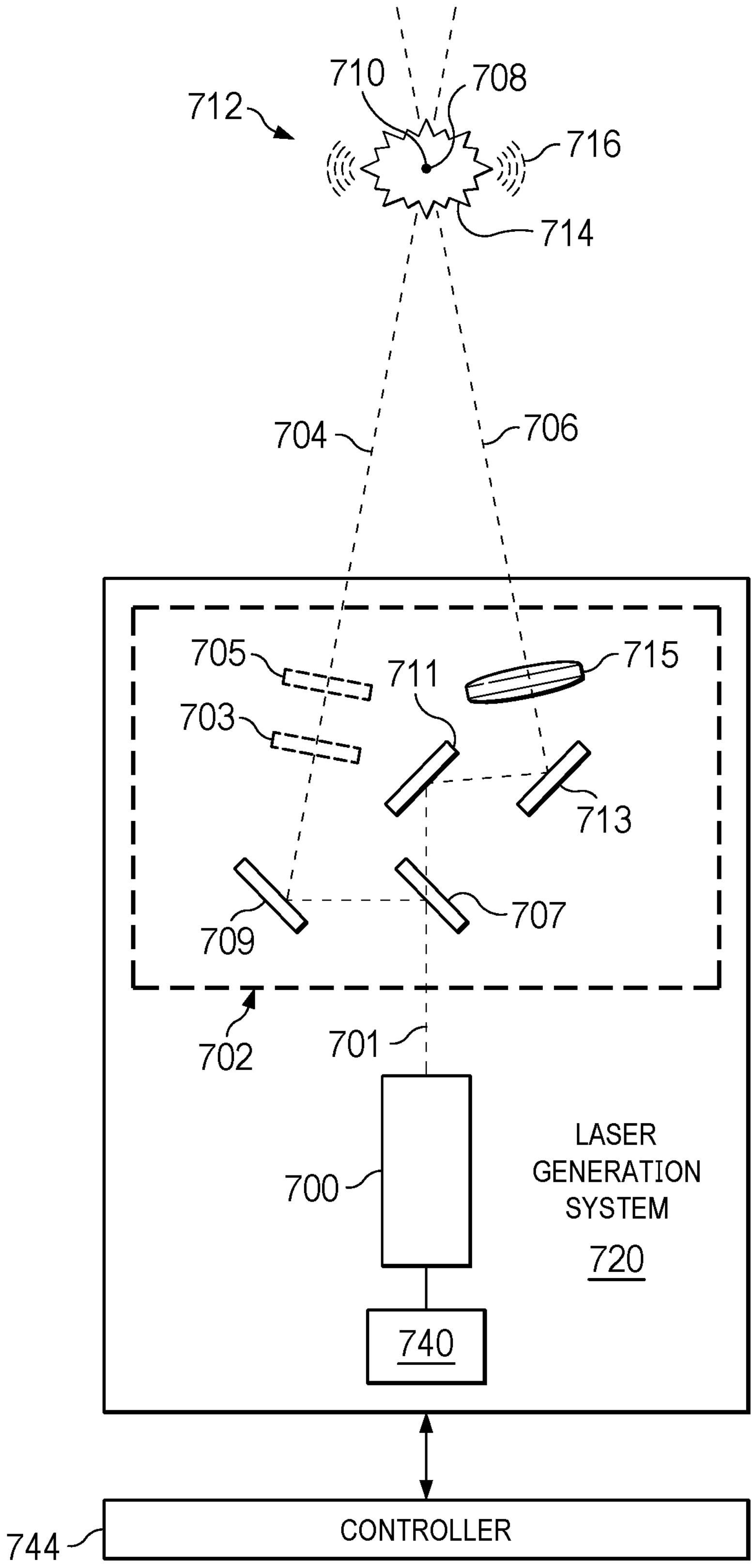
FIG. 7 is an illustration of a diagram for controlling radio frequency noise generation in accordance with an illustrative embodiment.

With reference next to FIG. 7, an illustration of a diagram for controlling radio frequency noise generation is depicted in accordance with an illustrative embodiment. In this illustrative example, laser generation system 720 is controlled by controller 744. As depicted, laser generation system 720 comprises laser unit 700, power source 740, and optical system 702.

Laser generation system 720 is an example of an implementation for laser generation system 218 in FIG. 2. Controller 744 is an example of the components that can be implemented in communications manager 212 in FIG. 2.

In this illustrative example, controller 744 controls the emission of first laser beam 704 and second laser beam 706 from laser generation system 720. In this illustrative example, laser unit 700 generates first laser beam 704 and second laser beam 706 using power supplied by power source 740. In this example, laser unit 700 generates initial laser beam 701 that is split into two laser beams, first laser beam 704 and second laser beam 706 by optical system 702.

As depicted, optical system 702 comprises a number of different components. In this example, optical system 702 comprises shutter 703, variable attenuator 705, beam splitter 707, and mirror 709, mirror 711, mirror 713, and lens 715 as other components that can be located in optical system 702. The components depicted are example components that can be used in optical system 702 and these components can change in other illustrative examples. For example, one or more lens 715, variable attenuator 705, and shutter 703 may be omitted in other illustrative examples. In yet other illustrative examples, other components may be included such as a lens located before beam splitter 707.

As depicted, initial laser beam 701 is split into two laser beams by beam splitter 707. In this example, first laser beam 704 and second laser beam 706 are emitted in directions to intersect at optical breakdown point 708, which is intersection point 710 in this example. Optical breakdown 712 occurs at this intersection of first laser beam 704 and second laser beam 706. Optical breakdown 712 generates radio frequency signal 716 through plasma 714 occurring from optical breakdown 712.

In this example, the power of the first laser beam 704 and second laser beam 706 are sufficient to cause optical breakdown 712 at the intersection of the laser beams. Optical breakdowns do not occur in other physical locations where these laser beams do not intersect each other in this example.

In this example, controller 744 can control the emission of these laser beams such that at least one of first laser beam 704 or second laser beam 706 is pulsed. This pulsing can include at least one of turning a laser beam on and off for increasing and decreasing the power of the laser beam. This pulsing of one or both of first laser beam 704 and second laser beam 706 can be controlled to control the timing of radio frequency noise generation.

In this example, first laser beam 704 can be pulsed by controller 744 controlling the operation of at least one of variable attenuator 705 or shutter 703. Variable attenuator 705 can be used to change the power of first laser beam 704. Shutter 703 can turn laser beam on and off with respect to emissions of laser beams from laser generation system 720. In this example, both laser beams can be pulsed at the same time by controlling power source 740. In another illustrative example, components within laser unit 700 such as an amplitude modulator can be controlled to pulse the power of initial laser beam 701 resulting in a pulsing of both first laser beam 704 and second laser beam 706.

By controlling the timing of when first laser beam 704 and second laser beam 706 intersect at intersection point 710, controller 744 can control the generation of radio frequency noise signals in a manner that encodes data.

In yet another illustrative example, controller 744 can control the physical location of optical breakdown point 708 by moving one or both of first laser beam 704 and second laser beam 706. This movement of optical breakdown point 708 can be controlled using at least one of mirror 709 or mirror 713. By moving the physical location of optical breakdown point 708, the phase of radio frequency noise signal can be changed to encode data.

The illustration of example implementations for laser generation system 218 in FIG. 2 and in FIGS. 3-7 have been provided as an example of some illustrative examples and are not meant to limit the manner in which other laser generation systems can be implemented. For example, a laser generation system can include both a first laser unit and a second laser unit with an optical system. In yet another illustrative example, one or more laser units can be present that emit laser beams in addition to the ones depicted at different optical breakdown points. With this example, two or more optical breakdowns can occur from laser beams emitted from a laser generation system.

In yet another illustrative example, different laser beams can be emitted at different times at the same optical breakdown point. As a result, optical breakdowns can be generated from different combinations of laser beams at the same optical breakdown point.

The illustrative embodiments also recognize and take into account that current techniques for transmitting data involves the use of carrier wave forms. For example, many techniques use only periodic, sinusoidal, or other repetitive or predictable carrier wave forms that are modulated to encode data. These types of waveforms can be detected in noise through various techniques including the denoiser technology which can detect sinusoidal carriers at 20 dB to 40 dB below a noise floor.

As a result, interception and decoding of signals can occur using current transmission techniques. Further, when the sinusoidal carriers can be detected, security issues can arise. For example, information can be inserted into transmissions, jamming attacks can occur, or other issues with using single sinusoidal, periodic, or other repetitive carriers to transmit data.

Thus, the illustrative embodiments provide a method, apparatus, and system for transmitting data. In the illustrative examples, this data can be transmitted using various modulation techniques that modulate noise signals. The use of noise signals is in contrast to the use of a sinusoidal, periodic, repetitive, or predictable carrier that can be detected.

Figure 8:
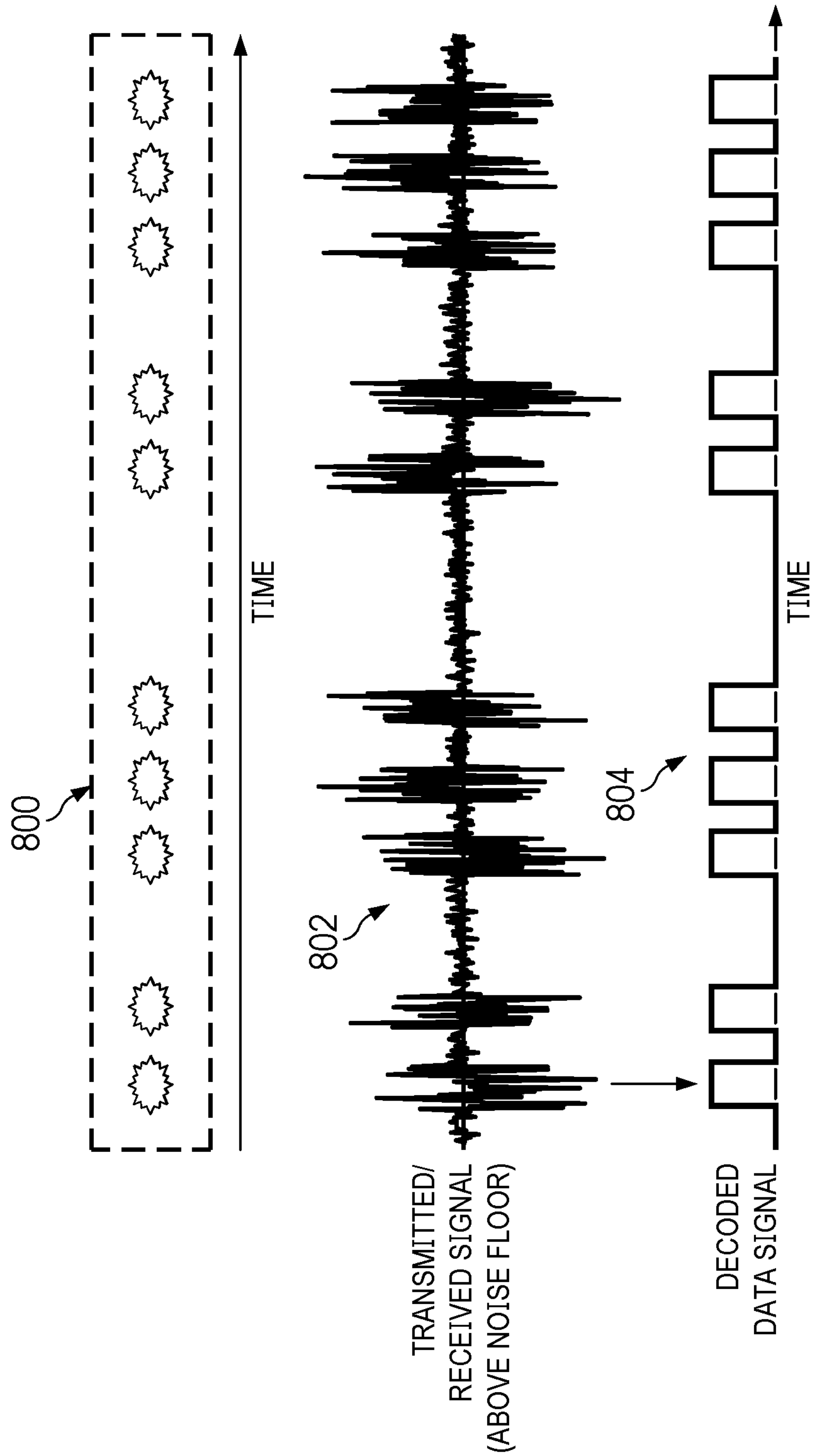
FIG. 8 is an illustration of data transmission using pulse code noise modulation or pulse noise modulation in accordance with an illustrative embodiment.

Turning to FIG. 8, an illustration of data transmission using pulse code noise modulation (also called pulse noise modulation) is depicted in accordance with an illustrative embodiment. In this illustrative example, pulse code noise modulation or pulse noise modulation can be performed using a radio frequency communication system such as radio frequency communications system 200 in FIG. 2.

In this illustrative example, optical breakdowns are generated over time. These optical breakdowns result in the generation of plasma 800 that causes radio frequency noise signals 802 to be transmitted.

The timing of these optical breakdowns can be selected to encode data such that the generation of radio frequency noise signals 802 encode the data. In this example, pulses are present in radio frequency noise signals 802 with timing that corresponds to the timing of optical breakdowns that generated plasma 800. These pulses of radio frequency noise signals 802 are timed to encode data. This type of encoding of data can be referred to as pulse noise modulation. As depicted, radio frequency noise signals 802 can be received and decoded to obtain decoded data signal 804.

This illustration of using radio frequency noise signals generated by optical breakdowns to communicate data is presented as one example of how pulses of radio frequency noise signals can encode data. This illustration is not meant to limit the manner in which other illustrative examples can be implemented.

For example, the pulses of radio frequency noise signals can be generated using other techniques in addition to or in place of laser-induced optical breakdowns. A transmitter system can use a noise signal as a carrier signal and a modulator to modulate the carrier signal such that pulses of radio frequency noise are transmitted that encode the data.

In still other illustrative examples, other types of noise signals in addition to or in place of radio frequency electromagnetic noise signals can be used. For example, noise signals can be used for transmitting data encoded in pulses and can be selected from at least one of electromagnetic frequency noise signals, radio frequency noise signals, microwave frequency signals, audio frequency noise signals, ultrasonic frequency noise signals, ultra-low frequency noise signals, very low frequency noise signals, underwater frequency noise signals, optical frequency noise signals, or other types of noise signals. These different types of noise signals can be used for various applications including speech communication, music, or other types of information for data that that are encoded in the noise signals.

Figure 9:
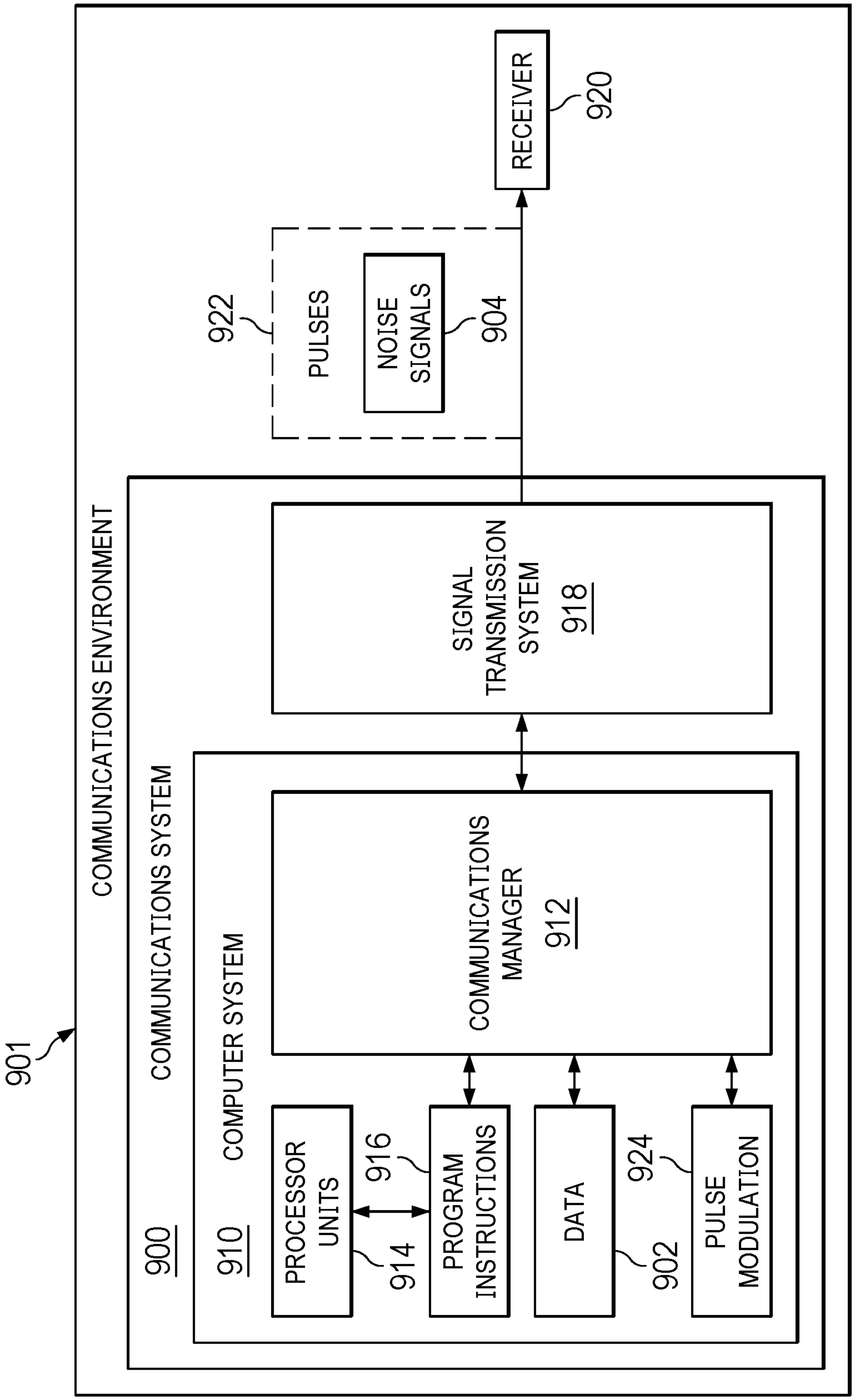
FIG. 9 is an illustration of a block diagram of a communication system in accordance with an illustrative embodiment.

With reference next to FIG. 9, an illustration of a block diagram of a communication system is depicted in accordance with an illustrative embodiment. In this illustrative example, communications system 900 in communications environment 901 operates to transmit data 902 encoded in noise signals 904.

In one illustrative example, a noise signal is a signal with irregular fluctuations that are or appear to be random, non-predictable, or non-deterministic. A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. In this example, the noise in noise signals 904 can be selected from at least one of nondeterministic noise, pseudo random noise, or some other suitable type of noise signal.

In the illustrative example, signals can have characteristics selected from at least one of amplitude, frequency, bandwidth, timing, phase, or other characteristics. In this illustrative example, noise signals 904 can be noise signals in which at least one of these characteristics are not controlled to encode the data. In other words, at least one or more of these characteristics meet one or more standard tests for statistical randomness in noise signals 904.

In these examples, noise signals 904 do not include carrier waves that are periodic. These types of signals can be, for example, sinusoidal, sawtooth, square, or other types of signals. Noise signals 904 also do not include periodic or sinusoid-based carrier signals that employ spread spectrum, frequency-hopping signals, and radar "chirps" that are based on periodic signals such as sinusoids or sawtooths. These and other types of signals that do not meet one or more standard tests for statistical randomness are not considered noise signals 904 in this example. However, "spread noise spectrum", frequency-hopping noise signals, and noise-based radar bursts that use noise as the basis of their carrier signals are considered noise signals 904 in this example.

As depicted, communications system 900 comprises computer system 910 and communications manager 912 located in computer system 910.

Communications manager 912 can be implemented in software, hardware, firmware or a combination thereof. When software is used, the operations performed by communications manager 912 can be implemented in program instructions configured to run on hardware, such as a processor unit. When firmware is used, the operations performed by communications manager 912 can be implemented in program instructions and data and stored in persistent memory to run on a processor unit.

When hardware is employed, the hardware may include circuits that operate to perform the operations in communications manager 912.

The circuits used to implement communications manager 912 can take other forms in addition to or in place of a processor unit.

In the illustrative examples, the hardware used to implement communications manager 912 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 910 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 910, those data processing systems are in communication with each other using a communications medium. The communications medium may be a network. The data processing systems may be selected from at least one of a computer, a server computer, a tablet, or some other suitable data processing system.

As depicted, computer system 910 includes a number of processor units 914 that are capable of executing program instructions 916 implementing processes in the illustrative examples. In other words, program instructions 916 are computer-readable program instructions.

As used herein, a processor unit in the number of processor units 914 is a hardware device and is comprised of hardware circuits such as those on an integrated circuit that respond and process instructions and program code that operate a computer. When the number of processor units 914 executes program instructions 916 for a process, the number of processor units 914 can be one or more processor units that are on the same computer or on different computers. In other words, the process can be distributed between processor units 914 on the same or different computers in a computer system 910.

Further, the number of processor units 914 can be of the same type or different type of processor units. For example, a number of processor units 914 can be selected from at least one of a single core processor, a dual-core processor, a multi-processor core, a general-purpose central processing unit (CPU), a graphics processing unit (GPU), a digital signal processor (DSP), or some other type of processor unit.

As depicted, communications system 900 can also include signal transmission system 918. In other examples, signal transmission system 918 can be considered a separate component controlled by communications system 900.

In this depicted example, signal transmission system 918 is a hardware system that can transmit noise signals 904. The operation of signal transmission system 918 can be controlled by communications manager 912.

In this illustrative example, noise signals 904 are received by receiver 920. Receiver 920 is also depicted as part of communications system 900. In yet other illustrative examples, receiver 920 may be a separate component from communications system 900.

Receiver 920 is a hardware system and can include processes implemented in hardware or software that decode data 902 that is encoded in pulses 922 of noise signals 904.

In this illustrative example, communications manager 912 identifies data 902 for transmission. In response to identifying data 902, communications manager 912 transmits pulses 922 of noise signals 904 encoding data 902. In one illustrative example, data 902 can be encoded in pulses 922 of noise signals 904 using at least one of a timing of the pulses 922, an amplitude of the pulses 922, duration of pulses 922, or other characteristic for pulses 922. In this manner, communications manager 912 can perform pulse noise modulation through the modulation of noise signals 904 to encode data 902.

For example, communications manager 912 can control the operation of signal transmission system 918 to perform pulse modulation 924. With pulse modulation 924, pulses 922 can encode data 902 through the timing of pulses 922 which are noise pulses or pulses of noise in this example.

For example, the presence of a noise pulse or pulse of noise can be considered a “1” and the absence of a noise pulse or pulse of noise can be considered a “0” which can be selected in time to encode data 902. The timing of the presence or absence of pulses 922 of noise can occur using various time periods.

For example, the timing can be based on whether a noise pulse or pulse of noise is present or absent at each period of time. The period of time can be, for example, a microsecond, a millisecond, two milliseconds, or some other period of time during which a pulse is absent or present for encoding data 902 in pulses 922 of noise.

Figure 10:
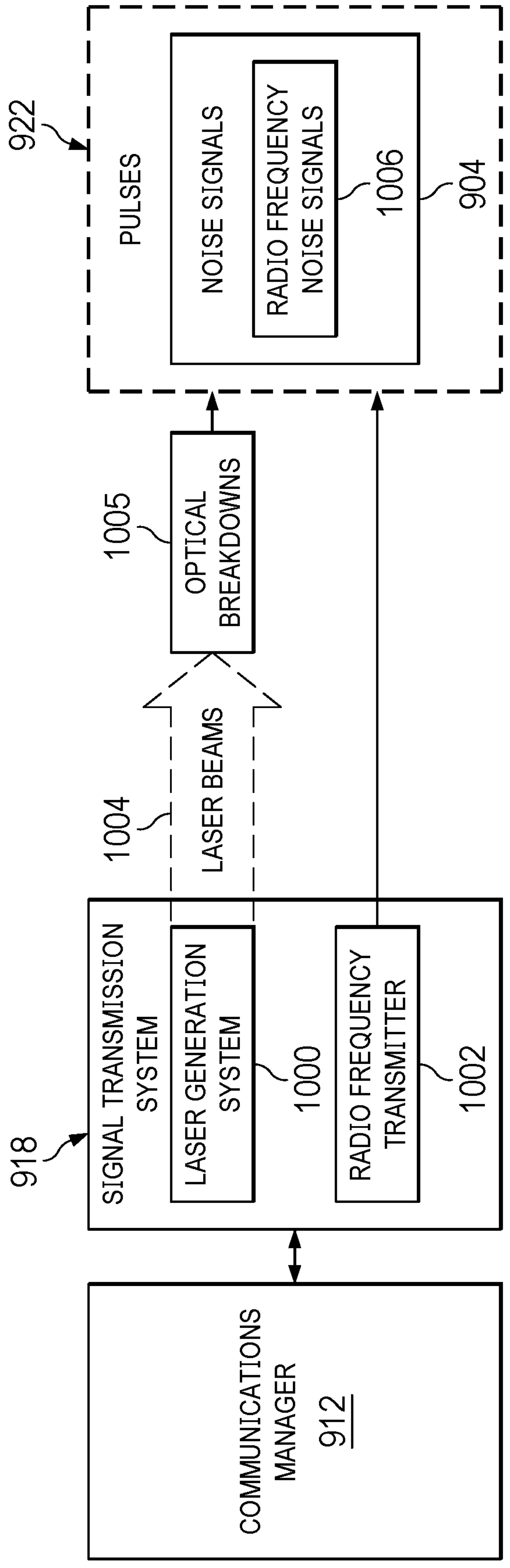
FIG. 10 is an illustration of a transmitter in accordance with an illustrative embodiment.

With reference next to FIG. 10, an illustration of a transmitter is depicted in accordance with an illustrative embodiment. In the illustrative examples, the same reference numeral may be used in more than one figure. This reuse of a reference numeral in different figures represents the same element in the different figures. In this illustrative example, examples of components that can be used to implement signal transmission system 918 in FIG. 9 are depicted.

As depicted in this illustrative example, signal transmission system 918 can include a number of different components that can be controlled to transmit noise signals 904. More specifically, these components can be controlled to generate pulses 922 of noise signals 904. These components can include at least one of laser generation system 1000 or radio frequency transmitter 1002.

In this illustrative example, laser generation system 1000 is a hardware system that emits a set of laser beams 1004. Communications manager 912 can control the emission of the set of laser beams 1004 from laser generation system 1000 to cause optical breakdowns 1005.

In this example, optical breakdowns 1005 result in the generation of noise signals 904 in the form of radio frequency noise signals 1006. In this example, pulses 922 of radio frequency noise signals 1006 can be generated based on the timing of optical breakdowns 1005. In this illustrative example, each optical breakdown in optical breakdowns 1005 can be a pulse in pulses 922 of radio frequency noise signals 1006.

In this example, radio frequency transmitter 1002 is a hardware system and can transmit pulses 922 of noise signals 904 in the form of radio frequency noise signals 1006. For example, radio frequency transmitter 1002 can transmit pulses 922 of noise signals 904 in the form of radio frequency noise signals 1006 transmitted from a physical hardware antenna instead of using lasers and optical breakdowns to produce the radio frequency noise signals 1006.

Figure 11:
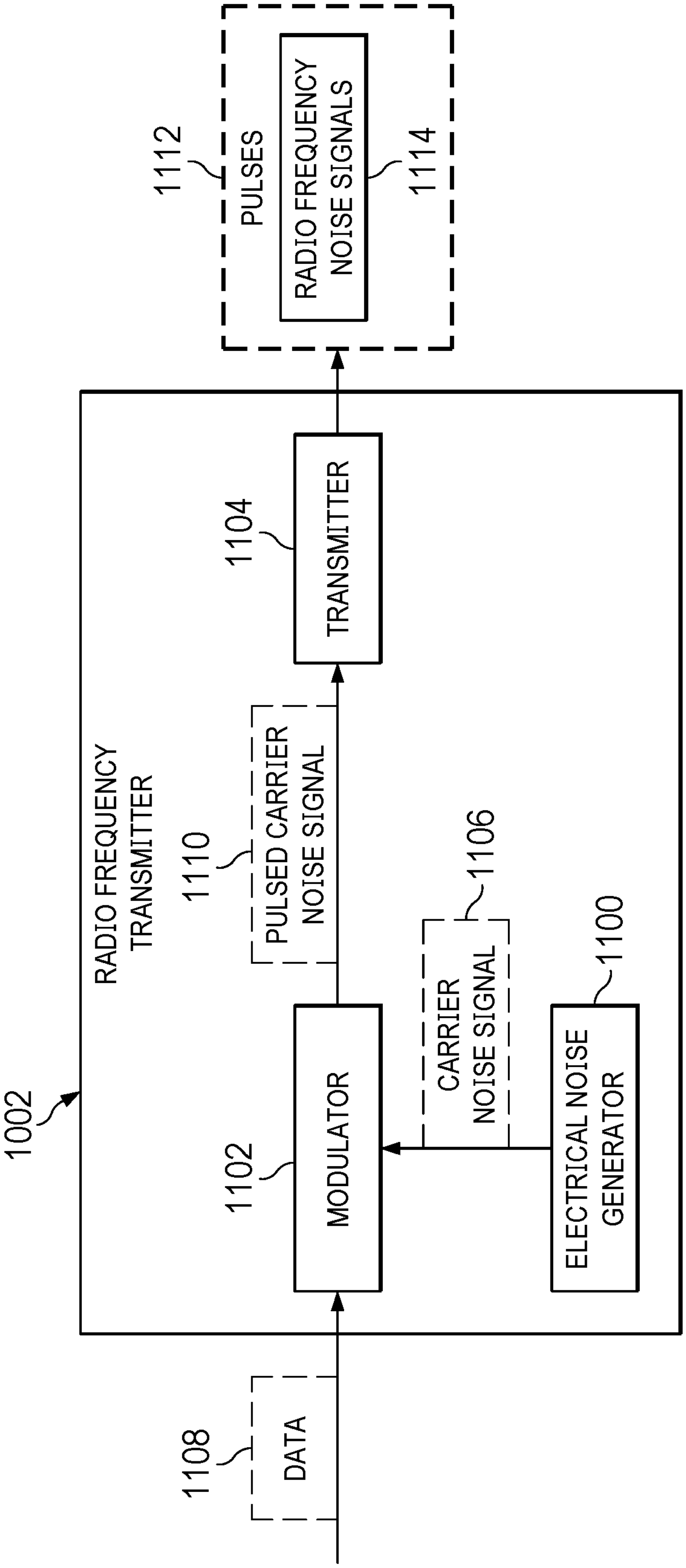
FIG. 11 is an illustration of a block diagram of a radio frequency transmitter in accordance with an illustrative embodiment.

Turning next to FIG. 11, an illustration of a block diagram of a radio frequency transmitter is depicted in accordance with an illustrative embodiment. This figure illustrates example components that can be used to implement radio frequency transmitter 1002. As depicted in this example, radio frequency transmitter 1002 comprises electric noise generator 1100, modulator 1102, and transmitter 1104.

As depicted, electric noise generator 1100 generates carrier noise signal 1106. Electric noise generator 1100 is connected to modulator 1102 and sends carrier noise signal 1106 to modulator 1102.

As depicted, modulator 1102 receives data 1108 that is to be transmitted. In this example, modulator 1102 modulates or digitally "shift keys" carrier noise signal 1106 to create pulsed carrier noise signal 1110 that encodes data 1108. This data is encoded in pulses in pulsed carrier noise signal 1110. In this example the modulation occurs by modulator 1102 turning carrier noise signal 1106 on and off to form pulsed carrier noise signal 1110.

Transmitter 1104 transmits pulsed carrier noise signal 1110 as pulses 1112 of radio frequency noise signals 1114. In this example, transmitter 1104 includes a physical antenna that is used to transmit pulses 1112 of radio frequency noise signals 1114. In other illustrative examples, the antenna can be a separate component from the hardware used to generate radio frequency noise signals 1114.

Figure 12:
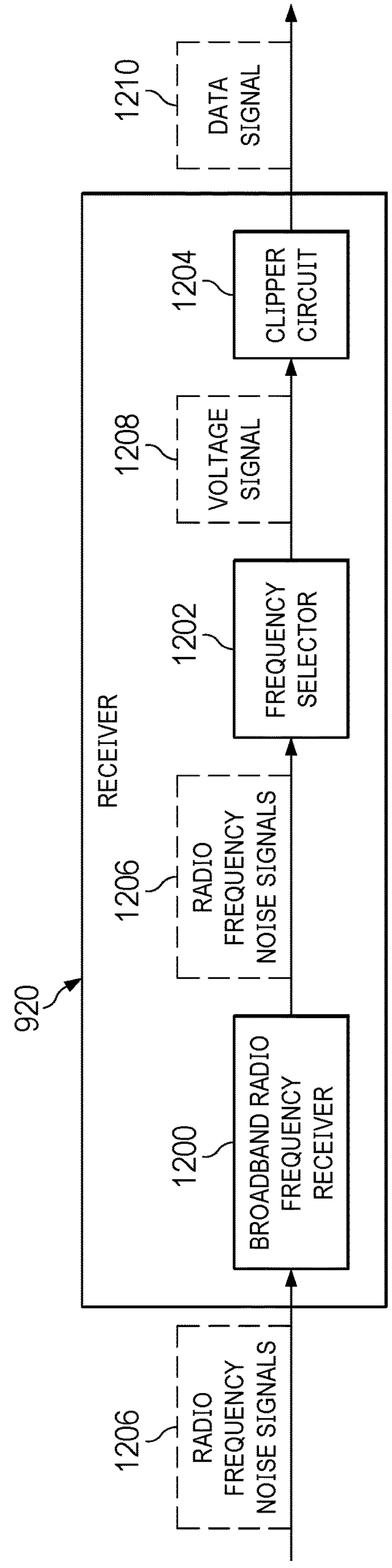
FIG. 12 is an illustration of a block diagram of a receiver in accordance with an illustrative embodiment.

Turning next to FIG. 12, an illustration of a block diagram of a receiver is depicted in accordance with an illustrative embodiment. An example of components that can be used to implement receiver 920 are shown in this figure. As depicted, receiver 920 is a hardware system. As depicted, receiver 920 comprises broadband radio frequency receiver 1200, frequency selector 1202, and clipper circuit 1204.

In this illustrative example, broadband radio frequency receiver 1200 receives radio frequency noise signals 1206. Broadband radio frequency receiver 1200 is connected to frequency selector 1202 and sends the received signals to frequency selector 1202.

Frequency selector 1202 outputs voltage signal 1208 from the frequencies selected in radio frequency noise signals 1206. In this illustrative example, the selection of frequencies by frequency selector 1202 can be performed using at least one of a bandpass filter, a band-reject filter, an envelope follower, an envelope detector, a low-pass filter, a rectified low pass filter, multiple bandpass filters tuned to different frequencies, or some other suitable type of circuit.

Frequency selector 1202 is connected to clipper circuit 1204. Voltage signal 1208 is received by clipper circuit 1204, which shapes voltage signal 1208. In this illustrative example, clipper circuit 1204 prevents voltage signal 1208 from exceeding a selected voltage level. Clipper circuit 1204 outputs data signal 1210. In this example, data signal 1210 is in an analog or digital signal and contains pulses that can be used re-create the data transmitted in radio frequency noise signals 1206.

Thus, one or more illustrative examples enable communicating data using noise carrier signals. In one illustrative example, these noise carrier signals or carrier noise signals can be modulated to encode data. The modulation can be pulse noise modulation or pulse code noise modulation in which a noise signal is transmitted in pulses. The timing of the pulses selected encodes data in these pulses of noise signals.

In this illustrative example, the modulation and demodulation of these pulses of noise signals do not depend on a single frequency or periodic waveform as the basis for the carrier wave as compared to current techniques that use a sinusoidal, periodic, or predictable carrier. As result, increased security can be present and interference with the sinusoidal carriers can be reduced.

In one illustrative example, the pulse code noise modulation or pulse noise modulation can be a broadband noise radio frequency carrier signal encoding the data. The generation of the pulses of radio frequency noise signals can be performed using a laser generation system that generates radio frequency signals through optical breakdowns. In another example, the generation of the radio frequency noise signals can be performed using a physical electromagnetic receipt transmitter having a physical antenna.

The illustration of communications environment 901 and the different components in FIGS. 9-12 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 912 is shown as being implemented using program instructions 916 run on a number of processor units 914 in computer system 910, communications manager 912 can be implemented in other hardware instead of or in addition to the number of processor units 914. For example, computer system 910 may use other hardware in addition to or in place of the number of processor units 914.

For example, other types of hardware circuits capable of performing the operations for communications manager 912 can be used. This other hardware can be at least one of a circuit system, an integrated circuit, an application-specific integrated circuit (ASIC), a programmable logic device, or some other suitable type of hardware configured to perform a number of operations.

As another example, the illustration of laser generation system 1000 and radio frequency transmitter 1002 are provided as examples of some implementations of components that can transmit pulses 922 of noise signals 904. As another example, radio frequency transmitter 1002 that generates electrical noise in electric noise generator 1100 as carrier noise signal 1106 to be modulated and transmitted as radio frequency noise signals 1114 in pulses 1112 can be transmitted on any type of physical, hardware antenna, or both. Examples of antenna types include, for example, whip antennas, dipole antennas, microwave antennas, metamaterial antennas, directional antennas, omnidirectional antennas, and any other type of physical antenna.

Figure 13:
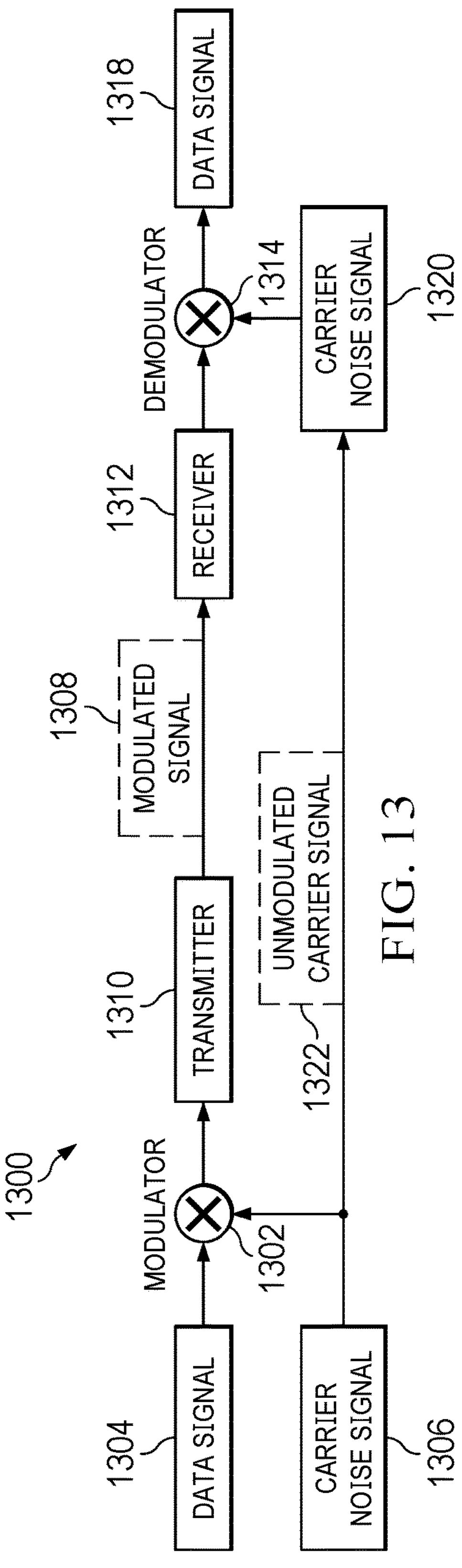
FIG. 13 is an illustration of a communications system for transmitting and receiving electromagnetic noise signals in accordance with an illustrative embodiment.

Turning next to FIG. 13, an illustration of a communications system for transmitting and receiving electromagnetic noise signals is depicted in accordance with an illustrative embodiment. In this illustrative example, communications system 1300 can transmit or receive electromagnetic noise signals encoding data using electromagnetic noise signals. Examples of electromagnetic noise signals may include electromagnetic ranges of ULF (Ultra Low Frequency), VLF (Very Low Frequency), 20 KHz to 300 KHz, HF (High Frequency), UHF (Ultra High Frequency), millimeter wave and microwave ranges, EHF (Extremely High Frequencies) up through Gigahertz frequencies and above Terahertz frequencies, and including the optical spectrum. Examples of applications or uses include noise carrier communications for modulation of audio, voice, and video communications, as well as noise-based radar, noise-based precision navigation and timing such as noise-based global positioning systems, noise-based spread spectrum using frequency bands of noise instead of sinusoidal-based carrier spread spectrum, noise-based frequency band-hopping using frequency-hopping of frequency bands of noise instead of using sinusoidal or periodic-based carrier frequency-hopping, as well as Signals Intelligence (SI) waveforms such as Low Probability of Intercept/Low Probability of Detect (LPI/LPD) and other clandestine signaling where detection and interception of messages using noise carriers will be difficult.

As depicted, modulator 1302 receives data signal 1304 and carrier noise signal 1306. In this illustrative example, carrier noise signal 1306 can be generated by an electric noise generator.

Modulator 1302 modulates or digitally "shift keys" carrier noise signal 1306 to generate modulated signal 1308. In this example, modulated signal 1308 comprises pulses of carrier noise signal 1306. For example, modulated signal 1308 can be generated by turning modulator 1302 on and off to send pulses of carrier noise signal 1306 to transmitter 1310 for transmission as modulated signal 1308. The generation of the pulses is based on the data in data signal 1304. In this manner, the data in data signal 1304 can be encoded in modulated signal 1308.

Transmitter 1310 transmits modulated signal 1308 to receiver 1312. In one illustrative example, receiver 1312 can be a broadband radio frequency receiver when modulated signal 1308 is a radio frequency signal. When other types of signals are used, receiver 1312 is selected to detect the signals transmitted by transmitter 1310.

Modulated signal 1308 detected by receiver 1312 is sent to demodulator 1314. In this example, demodulator 1314 demodulates or digitally de-"shift keys" the modulated or "shift keyed" signal 1308 using carrier noise signal 1320 to generate data signal 1318, which contains the same data in data signal 1304 in this depicted example.

As depicted, the demodulation of modulated signal 1308 is performed using carrier noise signal 1320. In this illustrative example, carrier noise signal 1306 is not predictable as compared to current techniques using sinusoidal wave forms for carrier signals.

As depicted, carrier noise signal 1320 can be obtained by demodulator 1314 in the form of unmodulated carrier noise signal 1322 being transmitted to demodulator 1314. In this manner, carrier noise signal 1320 used to demodulate modulated signal 1308 can be the same carrier signal as carrier noise signal 1306. Unmodulated carrier noise signal 1322 can be an in-band or out-of-band copy of carrier noise signal 1306.

Figure 14:
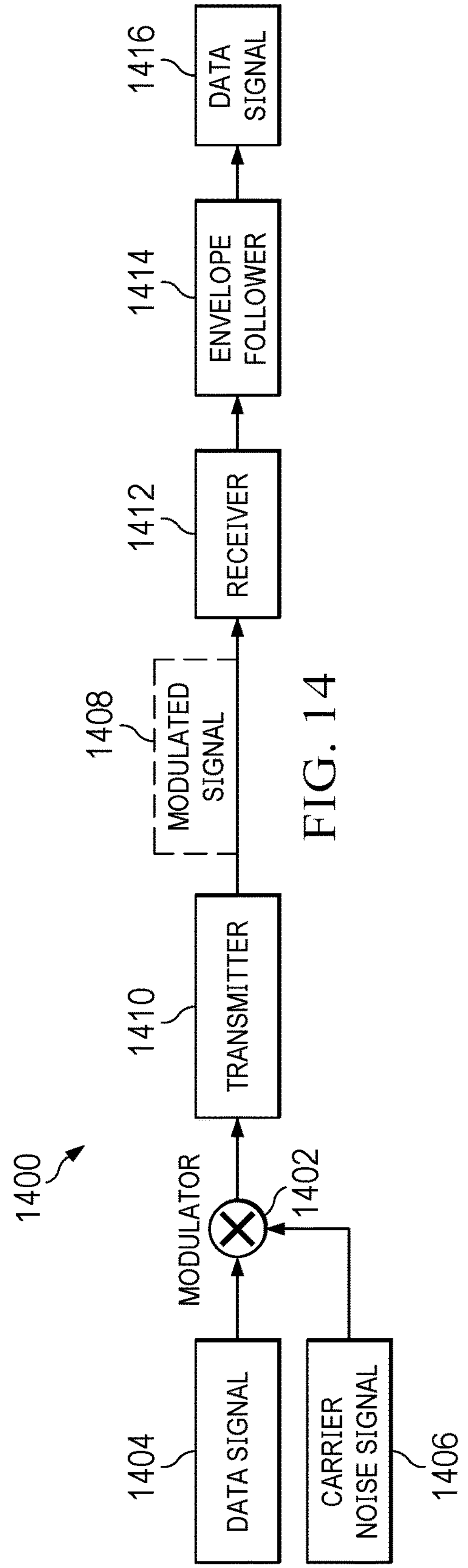
FIG. 14 is an illustration of a block diagram of a communications system for transmitting and receiving electromagnetic noise signals in accordance with an illustrative embodiment.

With reference now to FIG. 14, an illustration of a block diagram of a communications system for transmitting and receiving electromagnetic noise signals is depicted in accordance with an illustrative embodiment. Communications system 1400 can transmit or receive electromagnetic noise signals encoding data using electromagnetic noise signals.

In this illustrative example, communications system 1400 can transmit or receive electromagnetic noise signals encoding data using electromagnetic noise signals.

As depicted, modulator 1402 receives data signal 1404 and carrier noise signal 1406. In this illustrative example, carrier noise signal 1406 can be generated by an electric noise generator.

Modulator 1402 modulates or digitally "shift keys" carrier noise signal 1406 to generate modulated signal 1408. In this example, modulator 1402 can be an on/off modulator. As an on/off modulator, modulator 1402 sends carrier noise signal 1406 transmitter 1410 for transmission when modulator 1402 is turned on and does not send carrier noise signal 1406 to transmitter 1410 when modulator 1402 is turned off. As result, modulated signal 1408 comprises pulses of carrier noise signal 1406. These pulses are generated to encode data signal 1404. In other words, the timing of these pulses can be generated to encode the data. For example, the timing in these depicted examples can be time for pulses to perform pulse code noise modulation or pulse noise modulation.

For example, modulated signal 1408 can be generated by turning modulator 1402 on and off to send pulses of carrier noise signal 1406 to transmitter 1410 for transmission as modulated signal 1408.

Transmitter 1410 transmits modulated signal 1408 to receiver 1412. In one illustrative example, receiver 1412 can be a broadband radio frequency receiver when modulated signal 1408 is a radio frequency signal. When other types of signals are used, receiver 1412 is selected to detect the signals transmitted by transmitter 1410.

In this example, modulated signal 1408 detected by receiver 1412 is sent to envelope follower 1414. As depicted, envelope follower 1414 can also be referred to as an envelope detector. Envelope follower 1414 can detect amplitude variations in modulated signal 1408 and create a signal having a shape that resembles those variations. This example, modulated signal 1408 contains pulses of noise. As a result, envelope follower 1414 can generate a signal with the shape of the noise pulses to form data signal 1416. Envelope follower 1414 can be a selected from at least one of a low pass filter, a bandpass filter, an envelope detector, a peak detector, or a diode detector that follows and outputs the overall shape of at least one of the amplitudes or pulses as currently used.

The illustrative examples of communication systems in FIG. 13 and in FIG. 14 are presented as examples of some implementations for communications system 900 in FIG. 9. These illustrations are not meant to limit the manner in which other illustrative examples can be implemented. For example, a clipper circuit as is known in the art can be placed after envelope follower 1414 in FIG. 14 to convert rough envelopes of pulses into square wave pulses.

Figure 15A:
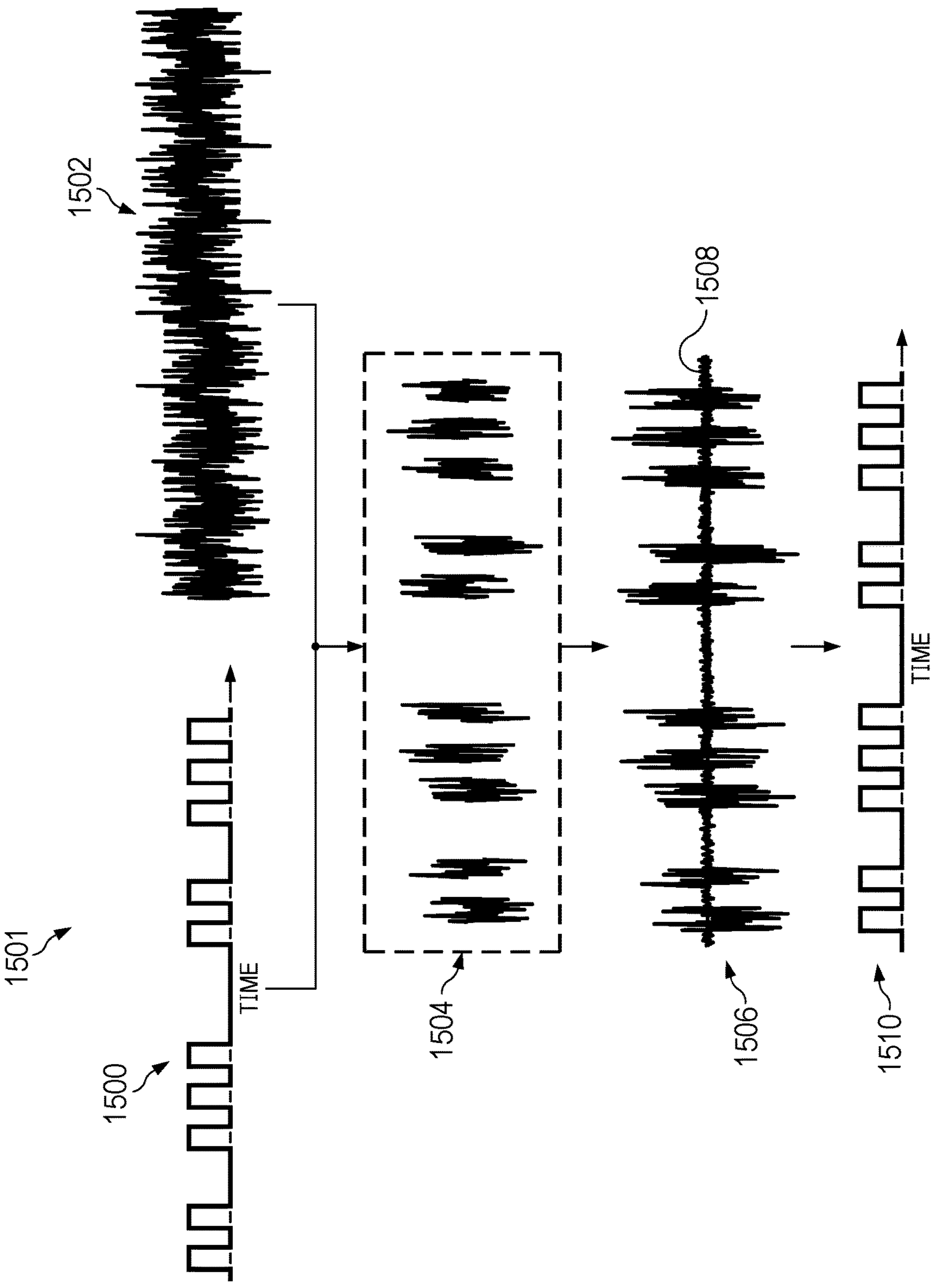
FIG. 15A is an illustration of a data flow of signals transmitting data using modulated noise signals in accordance with an illustrative embodiment.

Turning now to FIG. 15A, an illustration of a data flow of signals transmitting data using modulated noise signals is depicted in accordance with an illustrative embodiment. In this illustrative example, data signal 1501 is an example of signals in communications system 1400 in FIG. 14.

In this illustrative example, data signal 1500 is used to modulate carrier noise signal 1502. Data signal 1500 is an example of data signal 1404 and carrier noise signal 1502 is an example of carrier noise signal 1406 in FIG. 14.

The modulation of carrier noise signal 1502 forms modulated signal 1504, which encodes the data in data signal 1500. Modulated signal 1504 is an example of modulated signal 1408 in FIG. 14. As depicted in this example, modulated signal 1504 is a modulated noise signal comprising pulses of carrier noise signal 1502.

Received signal 1506 is an example of the signal received by a receiver. As depicted, received signal 1506 also includes noise 1508 in addition to the pulses of carrier noise signal 1502 in modulated signal 1504. In this example, noise 1508 is background noise or other noise in addition to the pulses in the carrier noise in modulated signal 1504.

As depicted, received signal 1506 can be processed and decoded using a component such as envelope follower 1414 in FIG. 14. Other components such as a bandpass filter, low-pass filter, band reject filter, clipper circuit, or other circuits can be used to generate output data signal 1510. In this example, output data signal 1510 is the same as or close enough to data signal 1500 such that the same data used to generate data signal 1500 can be obtained from output data signal 1510.

As discussed previously, the set of characteristics for noise signals can be selected from at least one of a timing, an amplitude, a frequency band, a relative phase, or other characteristics for carrier noise signals. For pulse noise modulation the carrier noise may be of different frequency characteristics that the transmitter and receiver will share. For pulse noise modulation the carrier noise signals will vary in amplitude, duration, and timing to modulate the message signal. For reception of these pulse noise modulated signals the receivers in FIG. 12 and FIG. 14 use various types of techniques to receive and demodulate the original data signal.

Figure 15B:
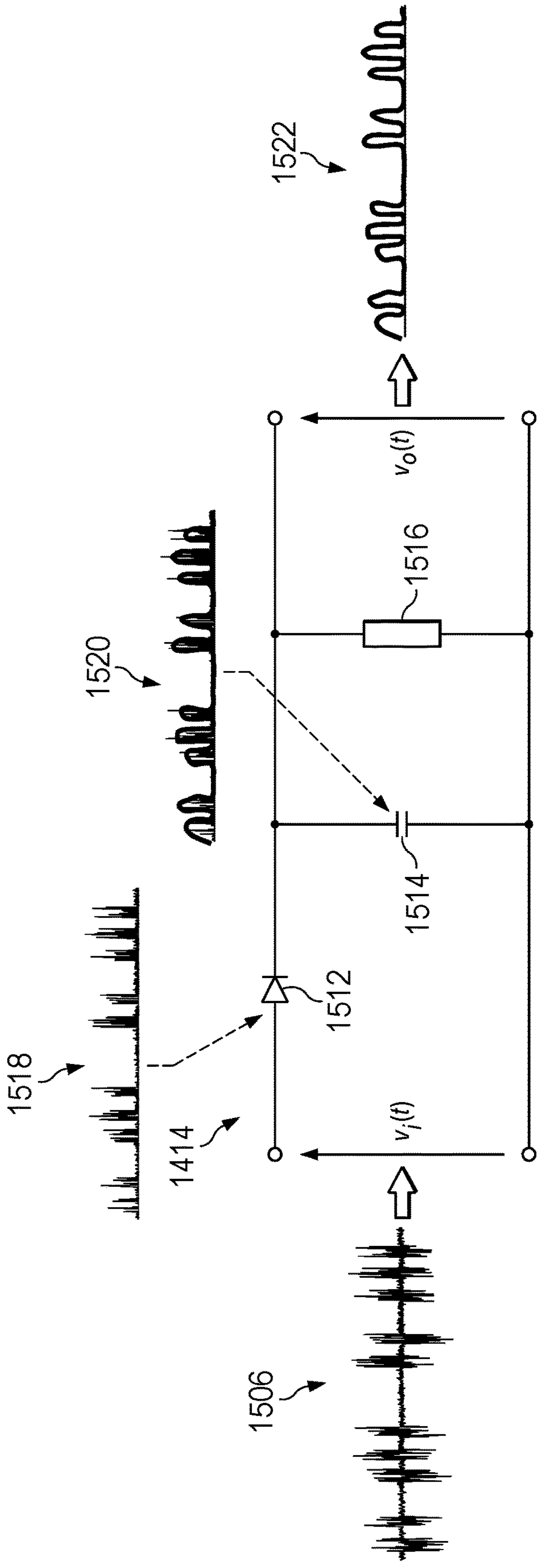
FIG. 15B is an illustration of an envelope follower circuit using a diode detector with a low pass filter in accordance with an illustrative embodiment.

Turning now to FIG. 15B, an illustration of an envelope follower circuit using a diode detector with a low pass filter in accordance with an illustrative embodiment. In this figure, an illustration of a simple circuit for envelope follower 1414 is shown. In this illustrative example, envelope follower 1414 is comprised of a diode 1512 to rectify the input signal, capacitor 1514 to provide a low pass filter to smooth out the noisy rectified signal and produce a lower frequency envelope. An optional resistor 1516 or inductive coil may be provided to affect the tuning or resonance of the circuit. Here, received signal 1506 of carrier pulses of noise is inputted to the envelope follower 1414 circuit. As received signal 1506 travels through diode 1512 the diode acts as a rectifier and converts the AC noise signal into a DC noise signal 1518 as shown by the dashed arrow from DC noise signal 1518 to the output of diode 1512. From there the rectified DC noise signal 1518 travels across capacitor 1514 which acts as a low pass filter to smooth the signal into an envelope signal 1520. The actual envelope signal, envelope signal 1520, is shown by the line the follows the outline or envelope of the noise bursts from DC noise signal 1518. The envelope signal 1520 then travels across optional resistor 1516 or coil and exits at the output as the envelope followed signal 1522.

In this illustrative example it is clear that the envelope followed signal 1522 is beginning to look like the received signal 1506.

Figure 15C:
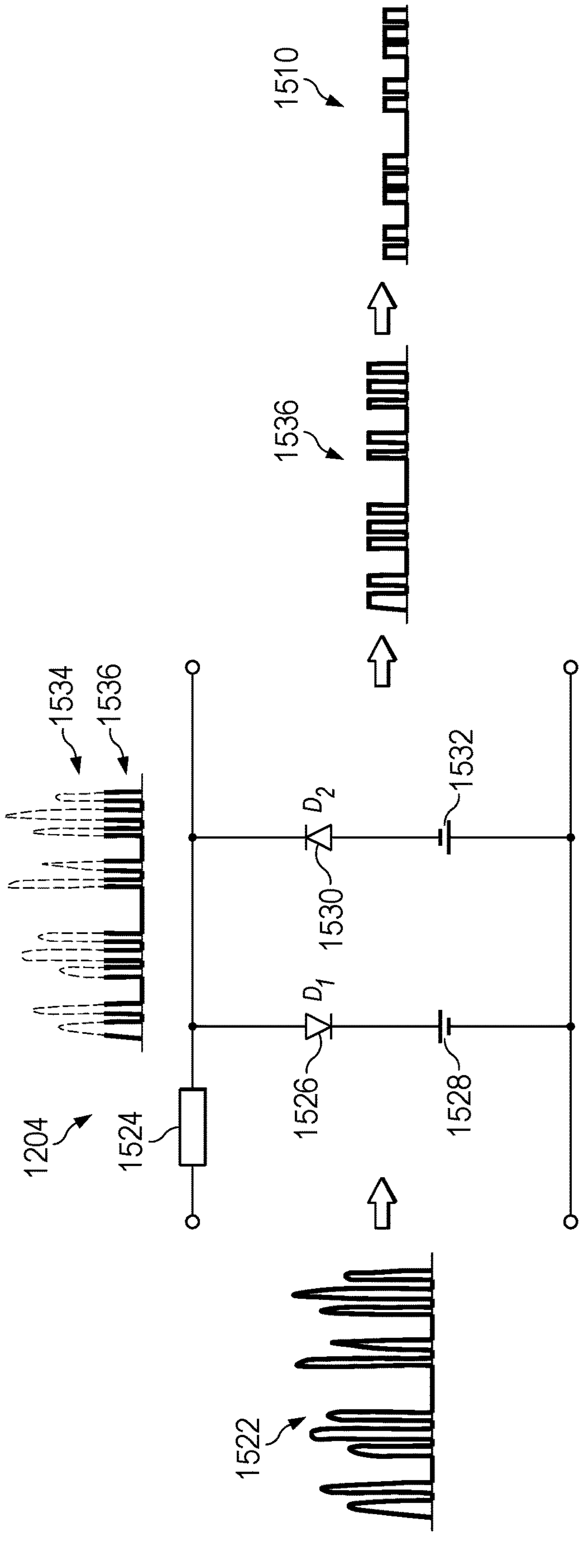
FIG. 15C is an illustration of a clipper circuit in accordance with an illustrative embodiment.

With reference to FIG. 15C, an illustration of a clipper circuit in accordance with an illustrative embodiment. In this figure, clipper circuit 1204 is also referred to as a slicer or amplitude selector. In this illustrative example, clipper circuit 1204 is comprised of optional input resistor 1524, and a bidirectional clipping circuit comprised of diode D1 1526, bias voltage 1528, diode D2 1530, and bias voltage 1532. This and many other known methods of clipping can be used. Single directional clipping may be used as well as bidirectional or any other type of clipping circuit.

In this illustrative example, envelope followed signal 1522 from FIG. 15B has been amplified to be a stronger signal and is inputted into clipper circuit 1204. Envelope followed signal 1522 travels through optional input resistor 1524 which may be an impedance matching circuit.

This signal then travels across one or more illustrative diode D1 1526 and diode D2 1530. Various types of diodes may be used. A single diode may be used, or a transistor circuit may be used with the purpose of clipping off the top of envelope followed signal 1522 such that top part of signal 1534 is clipped off and bottom part of signal 1536 remains. The level at which top part of the signal 1534 is clipped off is determined by the diode D1 1526 and diode D2 1530 as well as by the bias voltage 1528 and 1532.

Thus, bottom part of signal 1536 remaining is output at the output. This bottom part of the signal 1536 can be transferred through another stage of clipping until it becomes output data signal 1510 which is extremely similar to the original data signal 1500.

As can be seen in this illustrative example, the pulses of carrier noise signal 1502 encode data in data signal 1500. In other words, the timing in generating pulses of carrier noise signal 1502 is used to encode the data.

Thus, the different illustrative examples use pulse modulation of a noise signal that can be generated using a laser generator or a transmitter. With a laser generator, optical breakdowns are used to create the pulses of noise signals. With a physical transmitter, an electronic noise source generates a carrier noise signal that is modulated to create pulses of the carrier noise signal based on the data to be transmitted. These pulses of the carrier noise signals form the pulses of noise signal encoding data that can be transmitted using a physical antenna.

In this illustrative example, FIGS. 16-27 are flowcharts illustrating operations that can be performed to generate radio frequency noise signals encoding data in which a physical antenna is unnecessary.

Figure 16:
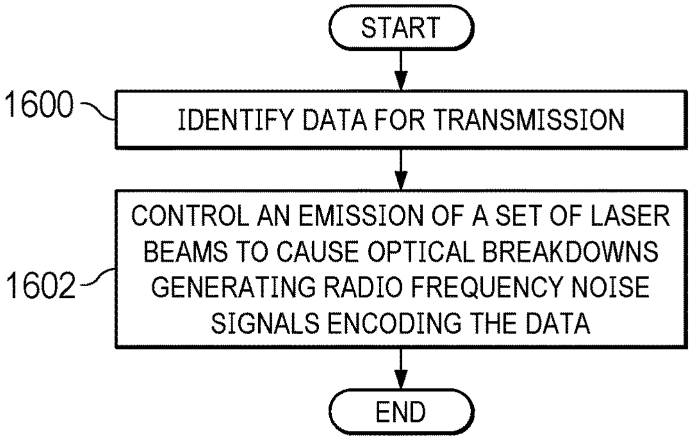
FIG. 16 is an illustration of a flowchart of a process for transmitting data in accordance with an illustrative embodiment.

With reference first to FIG. 16, a flowchart of a process for transmitting data is depicted in accordance with an illustrative embodiment. The process in FIG. 16 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying data for transmission (operation 1600). The process controls an emission of a set of laser beams to cause optical breakdowns generating radio frequency noise signals encoding the data (operation 1602). The process terminates thereafter.

In operation 1602, the emission of the set of laser beams can be controlled in number of different ways. For example, the laser beams can be emitted continuously or pulsed. Further, direction at which the laser beams are directed can also be changed. For example, the set of laser beams can be directed towards a set of optical breakdown points. The optical breakdown points can be selected from at least one of an intersection point or focal point. These optical breakdown points are physical locations where optical breakdowns occur. These optical breakdowns are physical locations where plasma is generated that generates the radio frequency noise signals.

The manner in which the optical breakdowns occur can be used to encode the data in the radio frequency noise signals. For example, the timing of the occurrence of optical breakdowns generates time pulses used to encode data. In this manner, different types of data encoding such as pulse noise modulation can be used to encode data based on when radio frequency noise signals are generated.

As another example, the set of laser beams can be moved or swept such that the optical breakdowns occur in different physical locations resulting in the frequency of a phase change in the optical breakdowns that can be used to encode data. As another example, the power of the laser beams can be changed to change the amplitude of the radio frequency noise signals two encode data. In this manner, different types of data encoding such as pulse noise modulation can be used to encode data based on when radio frequency noise signals are generated.

Figure 17:
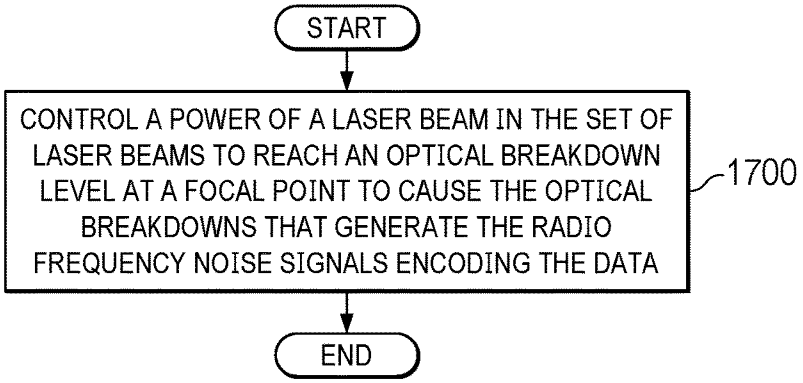
FIG. 17 is an illustration of a flowchart for controlling the emission of laser beams in points in accordance with an illustrative embodiment.

Turning next to FIG. 17, an illustration of a flowchart for controlling the emission of laser beams is depicted in points with an illustrative embodiment. The process illustrated in FIG. 17 is an example of one implementation for operation 1602 in FIG. 16.

The process controls a power of a laser beam in the set of laser beams to reach an optical breakdown level at a focal point to cause the optical breakdowns that generate the radio frequency noise signals encoding the data (operation 1700). The process terminates thereafter.

Figure 18:
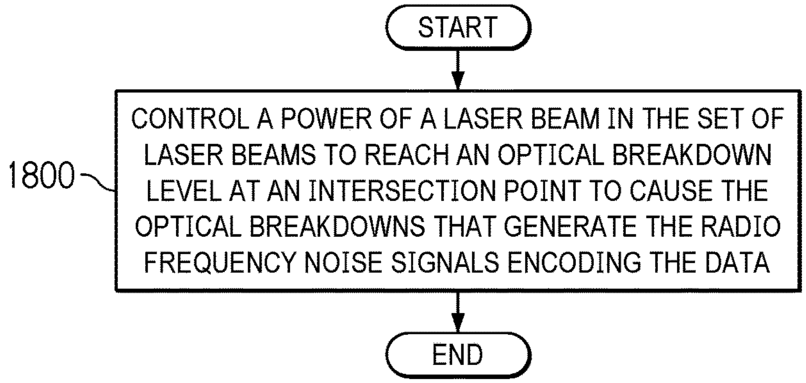
FIG. 18 is an illustration of a flowchart for controlling the emission of laser beams in intersecting points in accordance with an illustrative embodiment.

With reference next to FIG. 18, an illustration of a flowchart for controlling the emission of laser beams is depicted at intersecting points with an illustrative embodiment. The process illustrated in FIG. 18 is another example of an implementation for operation 1602 in FIG. 16.

The process controls a power of a laser beam in the set of laser beams to reach an optical breakdown level at an intersecting point to cause the optical breakdowns that generate the radio frequency noise signals encoding the data (operation 1800). The process terminates thereafter.

Figure 19:
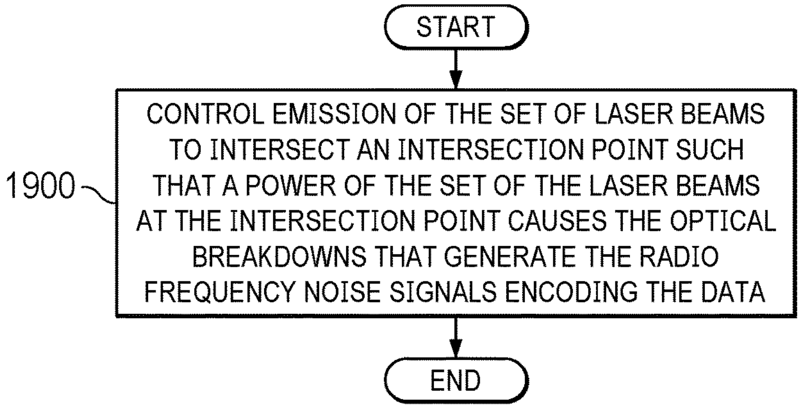
FIG. 19 is an illustration of a flowchart for controlling the emission of laser beams in points in accordance with an illustrative embodiment.

In FIG. 19, an illustration of a flowchart for controlling the emission of laser beams is depicted in points with an illustrative embodiment. The process illustrated in FIG. 19 is yet another example of an implementation for operation 1602 in FIG. 16.

The process controls emission of the set of laser beams to intersect an intersection point such that a power of the set of the laser beams at the intersection point causes the optical breakdowns that generate the radio frequency noise signals encoding the data (operation 1900). The process terminates thereafter.

Figure 20:
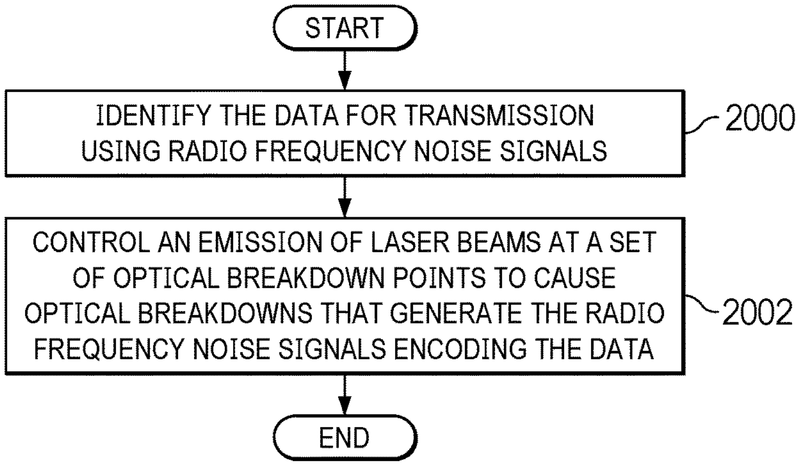
FIG. 20 is an illustration of a flowchart of a process for transmitting data in accordance with an illustrative embodiment.

Turning next to FIG. 20, a flowchart of a process for transmitting data is depicted in accordance with an illustrative embodiment. The process in FIG. 20 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying the data for transmission using radio frequency noise signals (operation 2000). The process controls an emission of laser beams at a set of optical breakdown points to cause optical breakdowns that generate the radio frequency noise signals encoding the data (operation 2002). The process terminates thereafter.

In this example, the set of optical breakdown points can be at different physical locations when more than one optical breakdown point is present in the set of optical breakdown points. In one example, radio frequency transmissions can be transmitted from multiple physical locations when the set of optical breakdowns is caused by the set of lasers being directed at more than one optical breakdown point.

Figure 21:
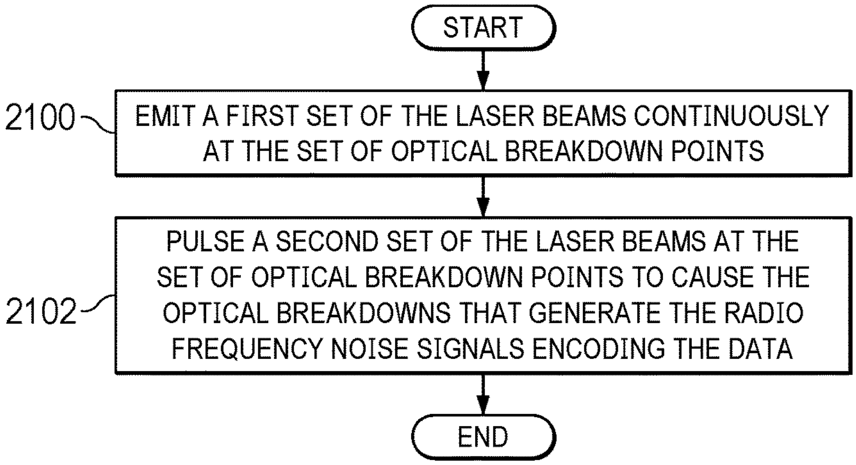
FIG. 21 is an illustration of a flowchart for controlling the emission of laser beams in points in accordance with an illustrative embodiment.

In FIG. 21, an illustration of a flowchart for controlling the emission of laser beams is depicted in points with an illustrative embodiment. The process illustrated in FIG. 21 is yet another example of an implementation for operation 2002 in FIG. 20.

The process begins by emitting a first set of the laser beams continuously at the set of optical breakdown points (operation 2100). The process pulses a second set of the laser beams at the set of optical breakdown points to cause the optical breakdowns that generate the radio frequency noise signals encoding the data (operation 2102). The process terminates thereafter.

In operation 2102, the pulsing can occur by turning the second set of laser beams on and off. In other examples, the pulsing can provide increasing decreasing the power to the second set of laser beams. In this example, the optical breakdowns occur in response to sufficient power in the laser beams at the set of optical breakdown points. In this example, the pulsing can control the timing of when radio frequency noise signals are transmitted.

Further in operation 2102, a power of a laser beam at the optical breakdown point can be controlled at by at least one of a shutter, a lens, a deformable lens, a microelectromechanical systems mirror, an attenuator, a controlling optics, an optical filter, an amplitude modulator in a laser beam generator, or other suitable components.

Figure 22:
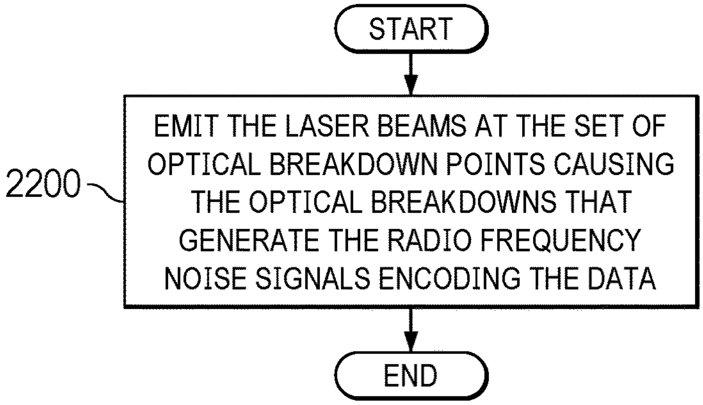
FIG. 22 is an illustration of a flowchart for controlling the emission of the laser beams in points in accordance with an illustrative embodiment.

With reference now to FIG. 22, an illustration of a flowchart for controlling the emission of the laser beams is depicted in points with an illustrative embodiment. The process illustrated in FIG. 21 is yet another example of an implementation for operation 2002 in FIG. 20.

The process emits the laser beams at the set of optical breakdown points causing the optical breakdowns that generate the radio frequency noise signals encoding the data (operation 2200). The process terminates thereafter.

Figure 23:
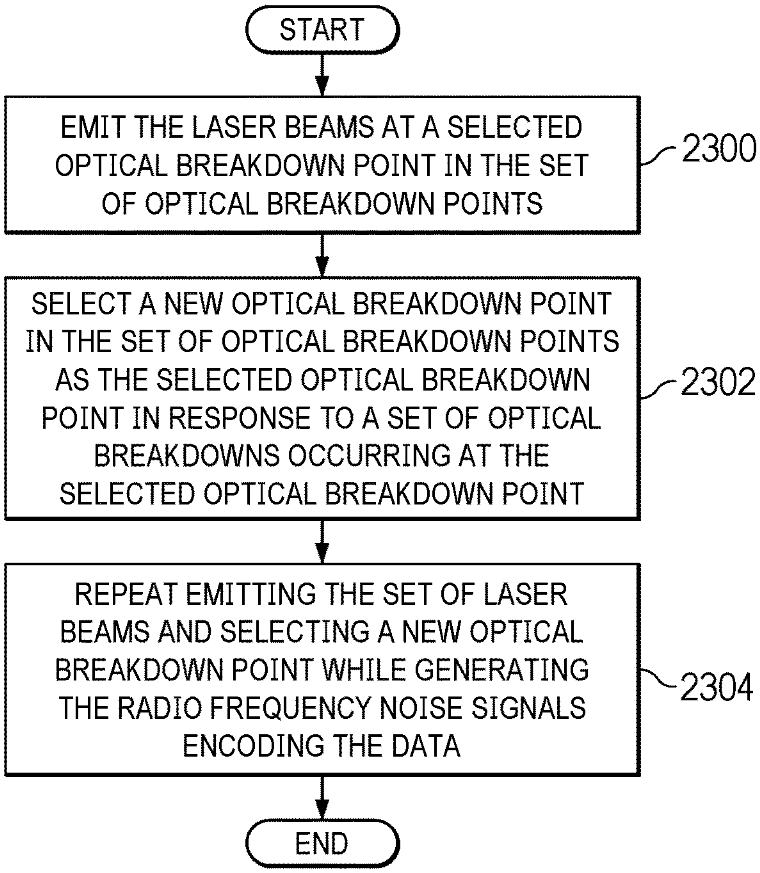
FIG. 23 is an illustration of a flowchart for controlling the emission of laser beams in points in accordance with an illustrative embodiment.

Turning next to FIG. 23, an illustration of a flowchart for controlling the emission of laser beams is depicted in points with an illustrative embodiment. The process illustrated in FIG. 23 is example of an implementation for operation 2200 in FIG. 22.

The process begins by emitting the laser beams at a selected optical breakdown point in the set of optical breakdown points (operation 2300). The process selects a new optical breakdown point in the set of optical breakdown points as the selected optical breakdown point in response to a set of optical breakdowns occurring at the selected optical breakdown point (operation 2302).

The process repeats emitting the set of laser beams and selecting a new optical breakdown point while generating the radio frequency noise signals encoding the data (operation 2304) the process terminates thereafter. In operation 2304, the process repeats operations 2300 and operation 2302 any number of times while transmitting the radio frequency noise signals. Operation at 2304 enables transmitting the radio frequency signals from different physical locations through the selection of different optical breakdown points. As result, identifying the origination of the radio frequency signals can be made more difficult.

Figure 24:
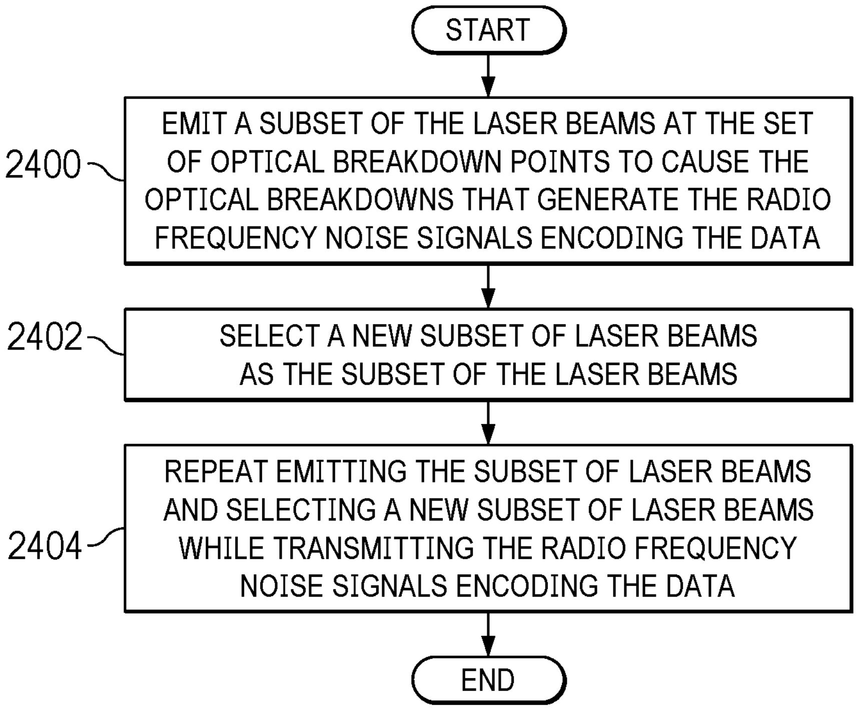
FIG. 24 is an illustration of a flowchart for controlling the emission of laser beams in points in accordance with an illustrative embodiment.

With reference next to FIG. 24, an illustration of a flowchart for controlling the emission of laser beams is depicted in points with an illustrative embodiment. The process illustrated in FIG. 24 is another example of an implementation for operation 2002 in FIG. 20.

The process begins by emitting a subset of the laser beams at the set of optical breakdown points to cause the optical breakdowns that generate the radio frequency noise signals encoding the data (operation 2400). The process selects a new subset of laser beams as the subset of the laser beams (operation 2402).

The process repeats emitting the subset of laser beams and selecting a new subset of laser beams while transmitting the radio frequency noise signals encoding the data (operation 2404). The process terminates thereafter. By using different subsets of the laser beams, identifying a physical location from which the laser beams originate can be made more difficult when the laser beams are emitted from different physical locations.

Figure 25:
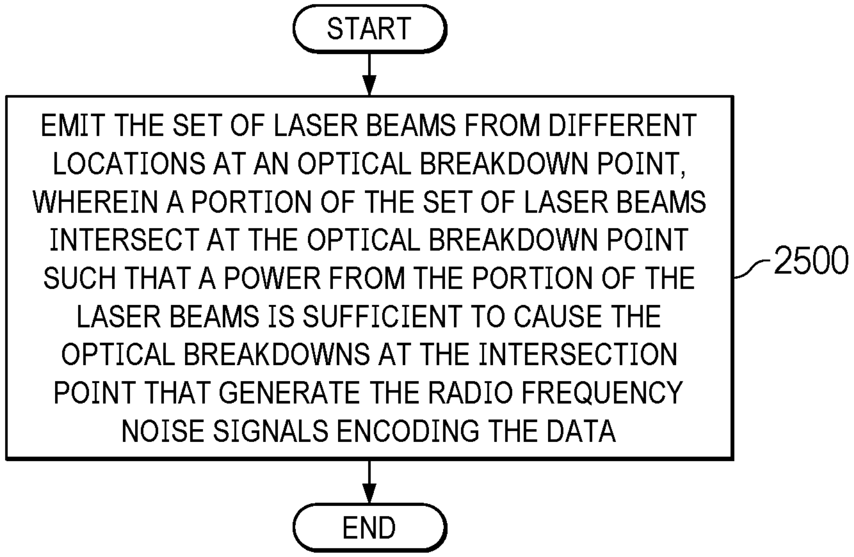
FIG. 25 is an illustration of a flowchart for controlling the emission of laser beams in points in accordance with an illustrative embodiment.

In FIG. 25, an illustration of a flowchart for controlling the emission of laser beams is depicted in points with an illustrative embodiment. The process illustrated in FIG. 25 is an example of an implementation for operation 2002 in FIG. 20.

The process emits the set of laser beams from different physical locations at an optical breakdown point, wherein a portion of the set of laser beams intersect at the optical breakdown point such that a power from the portion of the laser beams is sufficient to cause the optical breakdowns at the intersection point that generate the radio frequency noise signals encoding the data (operation 2500). The process terminates thereafter.

Figure 26:
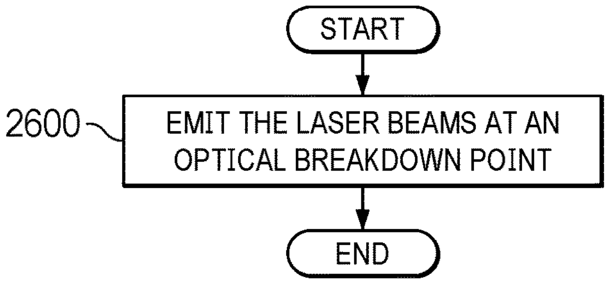
FIG. 26 is an illustration of a flowchart for controlling the emission of laser beams in points in accordance with an illustrative embodiment.

With reference to FIG. 26, an illustration of a flowchart for controlling the emission of laser beams is depicted in points with an illustrative embodiment. The process illustrated in FIG. 26 is an example of an implementation for operation 2002 in FIG. 20.

The process emits the laser beams at an optical breakdown point (operation 2600). The process terminates thereafter. In operation 2600, the optical breakdowns occur in response to all of the laser beams intersecting at the optical breakdown point.

Figure 27:
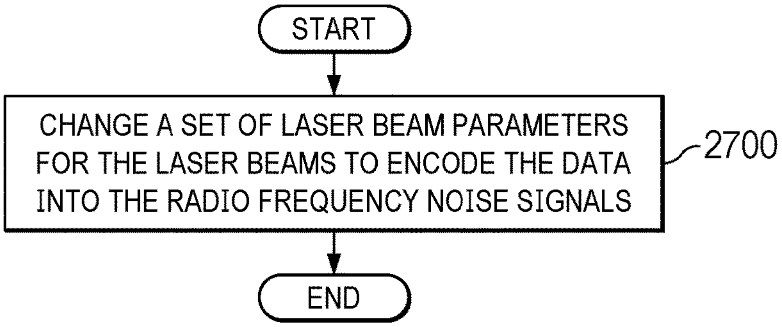
FIG. 27 is an illustration a flowchart for controlling laser beams in accordance with an illustrative embodiment.

With reference now to FIG. 27, an illustration a flowchart for controlling laser beams is depicted in accordance with an illustrative embodiment. The process illustrated in this figure is an example of an additional operation that can be performed with the operations in FIG. 20.

The process changes a set of laser beam parameters for the laser beams to encode the data into the radio frequency noise signals (operation 2700). The process terminates thereafter. In operation of 2700, changing the set of laser beam parameters changes a set of radio frequency characteristics for the radio frequency noise signals. The set of radio frequency characteristics is selected from at least one of a timing, an optical breakdown point, an amplitude of the radio frequency noise signals, or other characteristics of the radio frequency noise signals.

Figure 28:
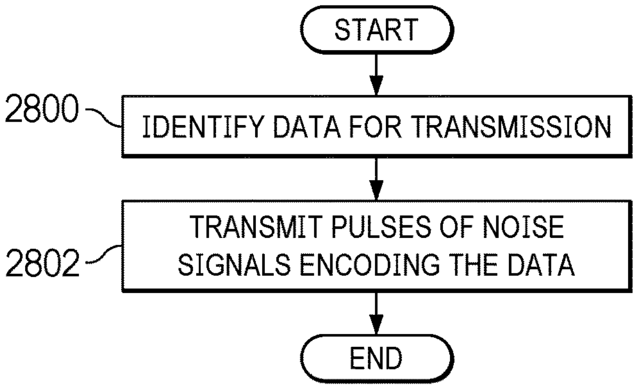
FIG. 28 is an illustration of a flowchart for communicating data in accordance with an illustrative embodiment.

In this illustrative example, FIGS. 28-35 are flowcharts illustrating operations that can be performed to encode data in noise signals. Turning first to FIG. 28, an illustration of a flowchart for communicating data is depicted in accordance with an illustrative embodiment. The process in FIG. 28 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 2800). The process transmits pulses of noise signals encoding the data (operation 2802). The process terminates thereafter. The pulses of noise signals can be selected from at least one of electromagnetic frequency signals, radio frequency signals, microwave frequency signals, audio frequency signals, ultrasonic frequency signals, ultra-low frequency signals, very low frequency signals, underwater frequency signals, or optical frequency signals.

In operation 2802, the pulses of radio frequency noise signals can be transmitted in a number of different ways. For example, these pulses of noise signals can be radio frequency noise signals transmitted from a physical antenna. In another illustrative example, the pulses of noise signals can be transmitted using optical breakdowns generated by laser beams. The optical breakdowns can be controlled to generate pulses of noise signals in the form of radio frequency noise signals.

The noise signals can be generated using at least one of a laser generation system that emits lasers to cause optical breakdown that generates the noise signal or an electric noise generator. The noise in the noise signal can be selected from at least one of nondeterministic noise or pseudo random noise.

Figure 29:
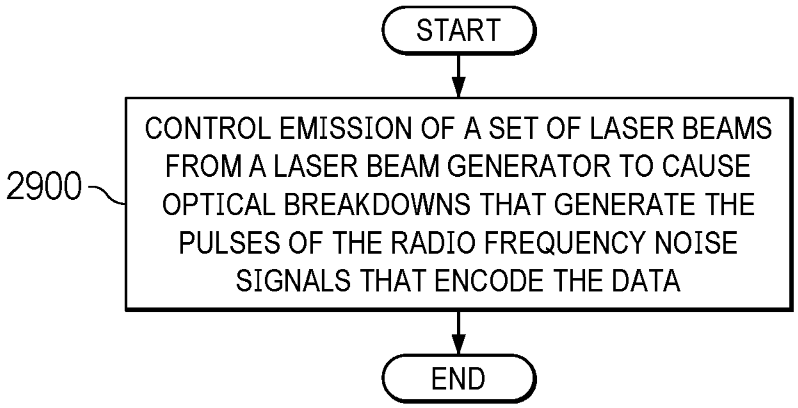
FIG. 29 is an illustration of a flowchart for transmitting pulses of noise signals in accordance with an illustrative embodiment.

Turning to FIG. 29, an illustration of a flowchart for transmitting pulses of noise signals is depicted in accordance with an illustrative embodiment. This flowchart is an example of an implementation for operation 2802 in FIG. 28. In this example, the pulses of noise signals can be pulses of radio frequency noise signals.

The process controls emission of a set of laser beams from a laser beam generator to cause optical breakdowns that generate the pulses of the radio frequency noise signals that encode the data (operation 2900). The process terminates thereafter.

Figure 30:
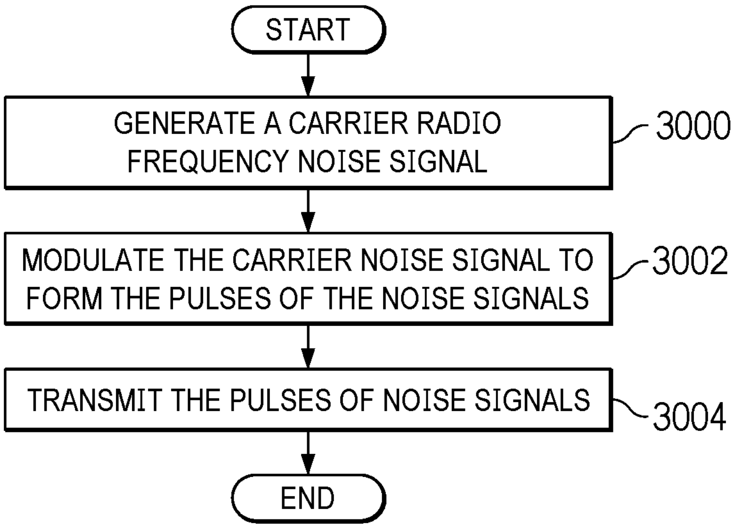
FIG. 30 is another illustration of a flowchart for transmitting pulses of noise signals in accordance with an illustrative embodiment.

With reference next to FIG. 30, another illustration of a flowchart for transmitting pulses of noise signals is depicted in accordance with an illustrative embodiment. This flowchart is an example of an implementation for operation 2802 in FIG. 28.

The process begins by generating a carrier radio frequency noise signal (operation 3000). The process modulates or digitally "shift keys" the carrier noise signal to form the pulses of the noise signals (operation 3002). In operation 3002, the pulses encode the data.

The process transmits the pulses of noise signals (operation 3004). The process terminates thereafter.

Figure 31:
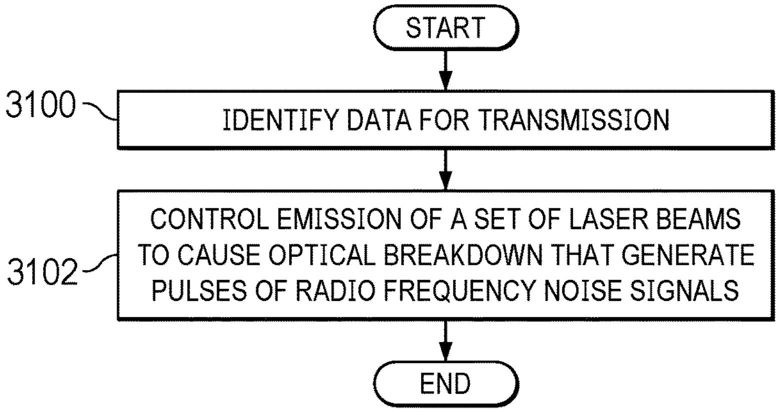
FIG. 31 is an illustration of a flowchart for communicating data in accordance with an illustrative embodiment.

Turning now to FIG. 31, an illustration of a flowchart for communicating data is depicted in accordance with an illustrative embodiment. The process in FIG. 31 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 3100). The process controls emission of a set of laser beams to cause optical breakdown that generate pulses of radio frequency noise signals (operation 3102). The process terminates thereafter. In operation 3100, the data can be encoded in the pulses of the radio frequency noise signals.

Figure 32:
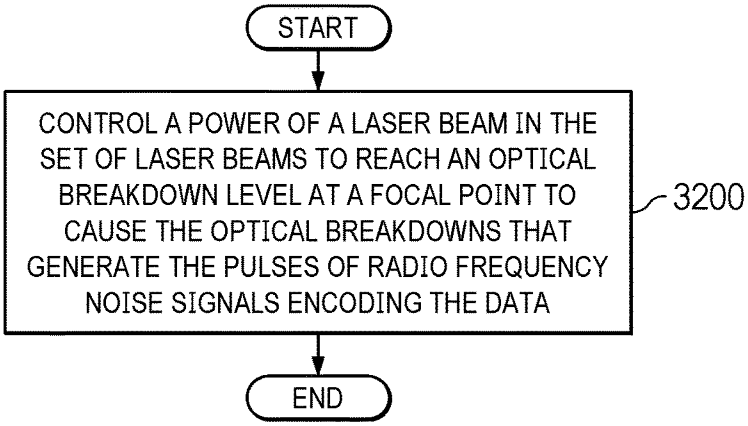
FIG. 32 is an illustration of a flowchart of a process for controlling the emission of a set of one or more beams in accordance with an illustrative embodiment.

With reference to FIG. 32, an illustration of a flowchart of a process for controlling the emission of a set of laser beams is depicted in accordance with an illustrative embodiment. The process in this flowchart is an example of an implementation for operation 3102 in FIG. 31.

The process controls a power of a laser beam in the set of laser beams to reach an optical breakdown level at a focal point to cause the optical breakdowns that generate the pulses of radio frequency noise signals encoding the data (operation 3200). The process terminates thereafter.

Figure 33:
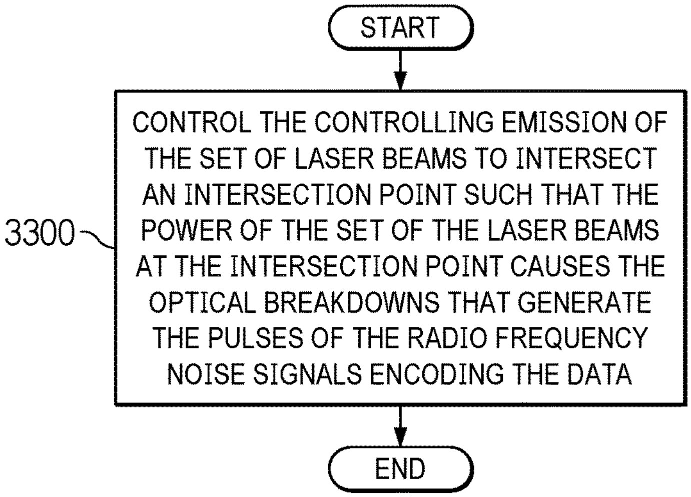
FIG. 33 is an illustration of a flowchart of a process for controlling the emission of a set of one or more beams in accordance with an illustrative embodiment.

Turning next to FIG. 33, an illustration of a flowchart of a process for controlling the emission of a set of laser beams is depicted in accordance with an illustrative embodiment. The process in this flowchart is an example of an implementation for operation 3102 in FIG. 31.

The process controls the controlling emission of the set of laser beams to intersect an intersection point such that the power of the set of the laser beams at the intersection point causes the optical breakdowns that generate the pulses of the radio frequency noise signals encoding the data (operation 3300). The process terminates thereafter.

Figure 34:
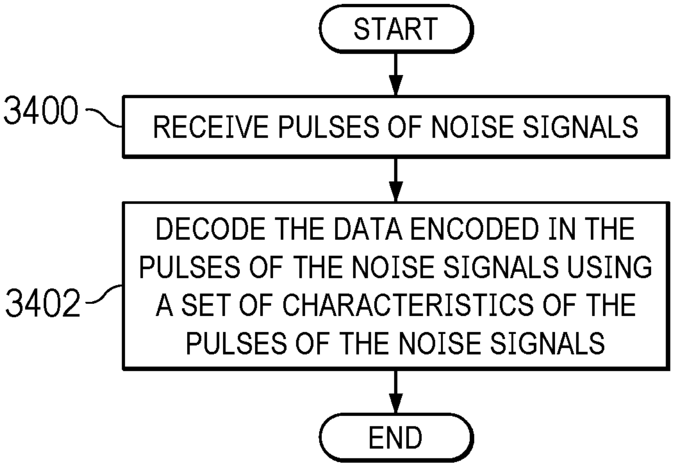
FIG. 34 is an illustration of a flowchart for communicating data in accordance with an illustrative embodiment.

In FIG. 34, an illustration of a flowchart for communicating data is depicted in accordance with an illustrative embodiment. The process in FIG. 34 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by receiving pulses of noise signals (operation 3400). In operation 3400, data is encoded in the pulses of noise signals.

The process decodes the data encoded in the pulses of the noise signals using a set of characteristics of the pulses of the noise signals (operation 3402). The process terminates thereafter. In operation 3402, the set of characteristics comprises at least one of a timing of the pulses of noise, an amplitude of the pulses of noise, a duration of the pulses of noise, or some other characteristic.

Figure 35:
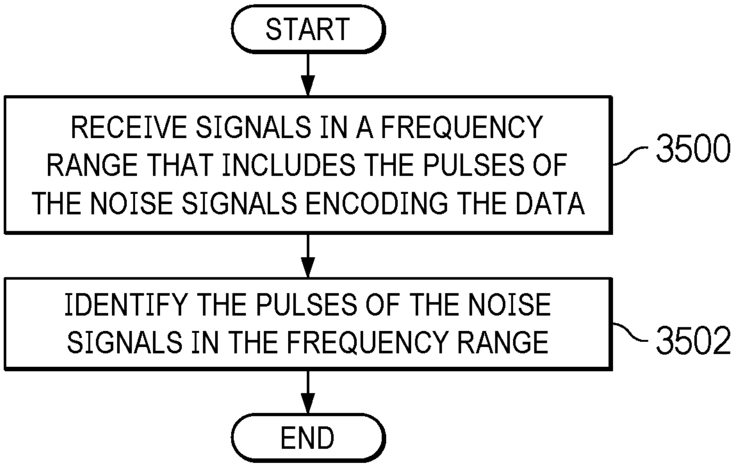
FIG. 35 is an illustration of a flowchart for decoding data in accordance with an illustrative embodiment.

With reference now to FIG. 35, an illustration of a flowchart for decoding data is depicted in accordance with an illustrative embodiment. The process depicted in this flowchart is an example of an implementation for operation 3402 in FIG. 34.

The process begins by receiving signals in a frequency range that includes the pulses of the noise signals encoding the data (operation 3500). In operation 3500, the signals in the frequency range can be received using at least one of a bandpass filter, a notch filter, a band reject filter, a low-pass filter, or a high-pass filter.

The process identifies the pulses of the noise signals in the frequency range (operation 3502). The process terminates thereafter. In operation 3502, the pulses of the noise signals in the frequency range can be identified using an envelope detector.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative examples provide a method, apparatus, and system for transmitting radio frequency signals using a transmission system in which a physical antenna is absent. Optical breakdowns are generated by laser beams in which the optical breakdowns create plasma. The plasma results in radio frequency noise signals. The optical breakdowns can be controlled to encode data in the radio frequency noise signals. The physical locations of these optical breakdowns are radio frequency source emitters in the depicted examples.

Further, these radio frequency source emitters can be moved to different physical locations by repositioning the laser beams such that the laser beams point at different optical breakdown points. Attacks at these physical locations are in essence attacks at the optical breakdown points where the plasma is generated.

As a result, kinetic attacks against these physical locations are useless because no physical infrastructure is present at the physical locations. Further, the laser modulation sources are remote from the physical locations of these radio frequency source emitters. These optical breakdowns can occur at a physical location that is remote from the laser source.

Further, the illustrative examples can encode data using noise signals. The use of noise signals is in contrast to the use of sinusoidal signals as a carrier signal to encode data. With the encoding of data in pulses of noise signals, issues with detection and interference in transmitting data encoded using sinusoidal carriers can be reduced.

In other illustrative examples, other types of modulation can be performed to encode and transmit information. In one or more illustrative examples, multiple techniques can be used to generate and modulate information using optical breakdowns or light patterns to at least one of communicate, signal, transmit, encode, or receive information. The optical breakdowns can generate radio frequency signals at different positions. Further, these optical breakdowns can also generate lights at different positions.

In the illustrative examples, lasers can be used to generate these optical breakdowns to transmit information using at least one of space, time, position, or movement. With this type of transmission, a receiver can at least one of observe, detect, and decode information from at least one of the space, time, position, or movement of optical breakdowns.

In one illustrative example, a laser generation system can create moveable optical breakdowns at a remote physical distance from the laser generation system. The optical breakdowns can generate at least one of radio frequency signals or light in positions that can be detected. Information may be encoded by at least one of position, timing, color, frequency, amplitude, pulsation, phase, or movement of optical breakdowns. In the different illustrative examples, these optical breakdowns can occur in a number of different locations including at least one of air, under water, or on an object surface.

In another illustrative example, the laser generation system can be movable or reconfigurable to generate different patterns that at least one of change or move in physical space over time to encode the information. This laser generation system can be used in at least one of air, under water, on an object, or in the vacuum of space. As a result, the illustrative example can be similar to dynamically moving quick response (QR) codes or semaphores.

The illustrative examples can modulate information by at least one of positioning or moving at least one of optical or radio frequency events. For example, these types of events can be generated by laser generation system emitting lasers in a manner that causes optical breakdowns. The plasma generated from the optical breakdowns can be the source of at least one of optical or radiofrequency events that are modulated in a manner that encodes information. Further, with these events further modulation can be performed for at least one of amplitude, frequency, color, phase, or other characteristics.

Position Modulation Communications

Figure 36:
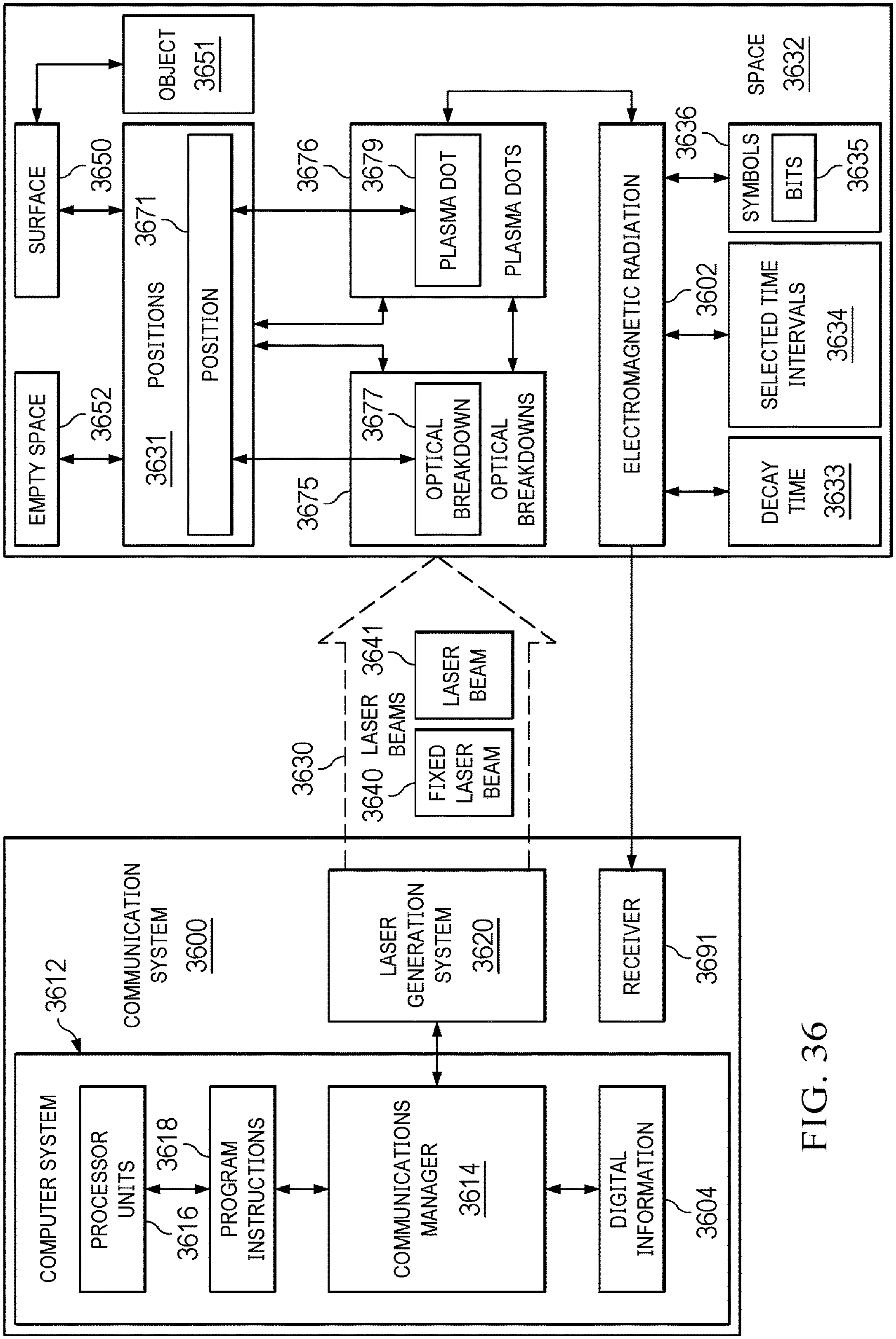
FIG. 36 is an illustration of a block diagram of a communication system in accordance with an illustrative embodiment.

With reference next to FIG. 36, an illustration of a block diagram of a communication system is depicted in accordance with an illustrative embodiment. In this illustrative example, communication system 3600 operates to generate electromagnetic radiation 3602 in a manner that encodes digital information 3604. In this illustrative example, positions 3631 of electromagnetic radiation 3602 are selected to encode digital information 3604.

In this illustrative example, communication system 3600 comprises laser generation system 3620, computer system 3612, and communications manager 3614. As depicted, communications manager 3614 is located in computer system 3612.

In this illustrative example, laser generation system 3620 can be implemented using laser generation systems as depicted in FIGS. 2-7 as well as other suitable laser generation systems. In this illustrative example, laser generation system 3620 emits a set of laser beams 3630. Laser generation system 3620 can emit a set of laser beams 3630 as fixed laser beam 3640 at each position in positions 3631 to generate electromagnetic radiation 3602. In another example, laser generation system 3620 can move laser beam 3641 in the set of laser beams 3630 from position to position in positions 3631 to generate electromagnetic radiation 3602.

These positions in positions 3631 can take a number of different forms. For example, positions 3631 can be on surface 3650 of object 3651 in space 3632. Object 3651 can take a number of different forms. For example, object 3651 can be a satellite, an aircraft, a building, a wall, or some other suitable object.

In another example, space 3632 can be empty space 3652. Empty space 3652 can be, for example, in the atmosphere, a vacuum, outer space, or some other location.

In this example, communications manager 3614 is configured to control the operation of laser generation system 3620. Communications manager 3614 can be implemented in software, hardware, firmware, or a combination thereof. When software is used, the operations performed by communications manager 3614 can be implemented in program instructions configured to run on hardware, such as a processor unit. When firmware is used, the operations performed by communications manager 3614 can be implemented in program instructions and data can be stored in persistent memory to run on a processor unit. When hardware is employed, the hardware can include circuits that operate to perform the operations in communications manager 3614.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, computer system 3612 is a physical hardware system and includes one or more data processing systems. When more than one data processing system is present in computer system 3612, those data processing systems are in communication with each other using a communications medium. The communications medium can be a network. The data processing systems can be selected from at least one of a computer, a server computer, a tablet computer, or some other suitable data processing system.

As depicted, computer system 3612 includes a number of processor units 3616 that is capable of executing program instructions 3618 implementing processes in the illustrative examples. In other words, program instructions 3618 are computer-readable program instructions.

As used herein, a processor unit in the number of processor units 3616 is a hardware device and is comprised of hardware circuits such as those on an integrated circuit that respond to and process instructions and program code that operate a computer. When the number of processor units 3616 executes program instructions 3618 for a process, the number of processor units 3616 can be one or more processor units that are in the same computer or in different computers. In other words, the process can be distributed between the number of processor units 3616 on the same or different computers in computer system 3612.

Further, the number of processor units 3616 can include the same type or different types of processor units. For example, the number of processor units 3616 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, the number of processor units 3616 can also include other components in addition to the processor units or processing circuitry. For example, the number of processor units 3616 can also include a cache or other components used with processor units or other processing circuitry.

In this illustrative example, communications manager 3614 is configured to perform a number of different operations in communicating digital information 3604. For example, communications manager 3614 identifies digital information 3604 for transmission. Communications manager 3614 controls an emission of the set of laser beams 3630 by laser generation system 3620 to generate electromagnetic radiation 3602 at positions 3631 in space 3632 that encode digital information 3604. A position in positions 3631 in space 3632 can be described by three-dimensional coordinates.

In the illustrative example, electromagnetic radiation 3602 is energy that propagates through space 3632 in the form of electric fields and magnetic fields. Electromagnetic radiation 3602 can be within a spectrum of wavelengths or frequencies. In this illustrative example, electromagnetic radiation 3602 can be generated by optical breakdowns 3675 at positions 3631. These optical breakdowns result in plasma dots 3676.

A plasma dot is plasma that includes free electrons, positively charged ions, and neutral atoms or molecules. This plasma dot has a three-dimensional shape that can be any shape, e.g., a spherical shape, an ellipsoidal shape, a toroid shape, or some other suitable shape. In this example, a toroid shape can occur when the laser beam interacts with the surface of an object when generating an optical breakdown.

For example, optical breakdown 3677 at position 3671 in positions 3631 can result in plasma dot 3679 in plasma dots 3676 at position 3671. Plasma dots 3676 are electromagnetic radiation 3602 generated by optical breakdowns 3675. Thus, a number of optical breakdowns 3675 at positions 3631 in space 3632 generated by the set of laser beams 3630 results in a number of plasma dots 3676 at positions 3631 in space 3632.

In these examples, electromagnetic radiation 3602 from plasma dots 3676 can be at least one of visible light, ultraviolet light, infrared light, radio frequencies, or x-rays. For example, plasma dots 3676 can generate radio frequency signals as electromagnetic radiation 3602. As another example, plasma dots 3676 can include visible light in electromagnetic radiation 3602. These and other types of electromagnetic radiation 3602 generated by plasma dots 3676 can be detected at positions 3631.

Further in this example, communications manager 3614 can generate electromagnetic radiation 3602 at positions 3631 in space 3632 that encode digital information 3604 without waiting for a decay time 3633 of electromagnetic radiation 3602 to elapse between positions 3631. For example, electromagnetic radiation 3602 can be generated in a first position. Electromagnetic radiation 3602 can also be generated in a second position prior to the electromagnetic radiation 3602 in the first position reducing or decaying to some lower level. This reduction is a decrease in a number of characteristics for electromagnetic radiation 3602 that can be selected from at least one of intensity, amplitude, or some other characteristics of electromagnetic radiation 3602. This reduced level can be for electromagnetic radiation 3602 to completely dissipate at the first position or reach some other level.

Further, as part of controlling the emissions of the set of laser beams 3630, communications manager 3614 can generate electromagnetic radiation 3602 at positions in space 3632 at selected time intervals 3634. With this example, electromagnetic radiation 3602 generated in each time interval in selected time intervals 3634 at positions 3631 in space represents a group of symbols 3636. As used herein, a "group of" when used with reference to items means one or more items. For example, a group of symbols is one or more symbols.

The group of symbols 3636 can be, for example, a group of bits 3635. This group of bits is an example of symbols 3636. A symbol can be one or more bits. In the different illustrative examples, symbols can take a number of different forms. For example, symbols can be selected from at least one of a bit, an alphanumeric character, a letter, a number, a control character, a graphic symbol, an icon, a mathematical symbol, or other types of symbols.

For example, as part of controlling the emission of the set of laser beams 3630, communications manager 3614 controls the emission of the set of laser beams 3630 between a first position and a second position in positions 3631. In this depicted example, electromagnetic radiation 3602 at the first position is a first logic value and the electromagnetic radiation 3602 at the second position is a second logic value. For example, the first logic value is a "1" and the second logic value is a "0," or the first logic value is the "0" and the second logic value is the "1."

As another example, communications manager 3614 generates electromagnetic radiation 3602 at positions 3631. With this example, a presence of electromagnetic radiation 3602 at a position in positions 3631 is a first logic value and an absence of electromagnetic radiation 3602 at the position in positions 3631 is a second logic value. For example, the first logic value is a 1 and the second logic value is a 0 or the first logic value is the 0 and the second logic value is the 1.

In yet another illustrative example, as part of controlling the emission of the set of laser beams 3630, communications manager 3614 controls the emission of the set of laser beams 3630 at an array of positions 3631 in which each position in the array of positions 3631 represents a symbol in the group of symbols 3636. In this example, the array can be selected from a group consisting of a one-dimensional array, a two-dimensional array, and a three-dimensional array. A one-dimensional array can be on a straight or curved line. A two-dimensional array can be on a surface that is planar or curved.

As depicted, receiver 3691 can detect electromagnetic radiation 3602. Receiver 3691 is a hardware system and can include software. Receiver 3691 can take a number of forms. For example, receiver 3691 can be at least one of a camera, a radio receiver, or other suitable types of procedures. With radio frequency signals the detector in receiver 3691 operates in the radio frequency spectrum. An antenna that performs positional determination can be used, for example, stereo antennas, or a single antenna that can determine the time or phase of the radio frequency signal that is arriving.

This receiver can detect electromagnetic radiation 3602. Receiver 3691 can determine digital information 3604 from positions 3631 at which electromagnetic radiation 3602 is detected.

In the different illustrative examples in FIGS. 37-42 described below, the presence or absence of plasma dots at different positions represent "on" or "off" for the plasma dots, respectively, in determining symbols. The plasma dots resulting from optical breakdowns generate electromagnetic radiation in positions that can be identified for decoding information.

In this illustrative example, a determination of a symbol is performed for a time interval. In other words, a series of time intervals can be used to determine a series of symbols. The generation of electromagnetic radiation in these examples can be formed using one or more lasers that are stationary in which each laser beam is a position. In other examples, the laser beam scans to the different positions within a time interval.

Figure 37:
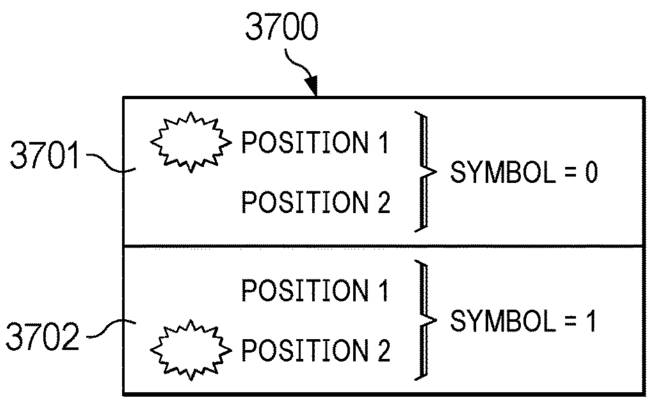
FIG. 37 is an illustration of symbols for different electromagnetic radiation positions in accordance with an illustrative embodiment.

Next in FIG. 37, an illustration of symbols for different electromagnetic radiation positions is depicted in accordance with an illustrative embodiment. In this example, position key 3700 identifies symbols that are represented by positions of electromagnetic radiation. In this illustrative example, the symbols are examples of symbols 3636 in FIG. 36. More specifically, these symbols represent bits such as bits 3635 in FIG. 36.

As depicted, electromagnetic radiation can be generated in position 1 and position 2. Electromagnetic radiation takes the form of plasma dots in this example. For example, in entry 3701 in position key 3700, a plasma dot is present at position 1 and a plasma dot is absent at position 2 within a time interval. This positioning of the plasma dot results in a symbol that is "0" in this example. In entry 3702, the absence of a plasma dot in position 1 and the presence of a plasma dot in position 2 indicates that the symbol is "1."

Figure 38:
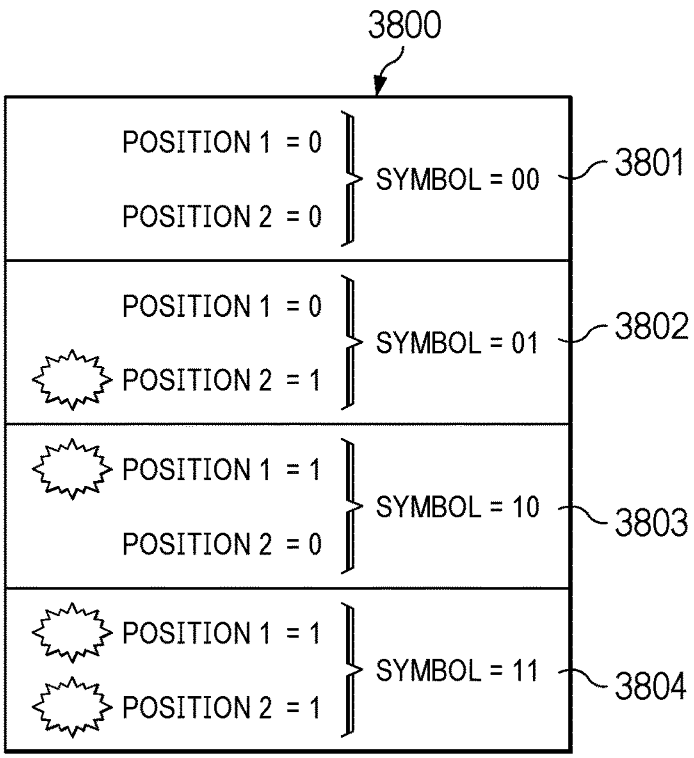
FIG. 38 is an illustration of symbols for electromagnetic radiation positions in accordance with an illustrative embodiment.

Turning to FIG. 38, an illustration of symbols for electromagnetic radiation positions is depicted in accordance with an illustrative embodiment. This type of array can also be referred to as a positional framework.

In this example, position key 3800 identifies symbols that are represented by positions of electromagnetic radiation. In this illustrative example, the symbols are examples of symbols 3636 in FIG. 36. More specifically, these symbols represent bits such as bits 3635 in FIG. 36.

In entry 3801, the symbol is "00" when a plasma dot is absent in both position 1 and position 2. With this example, plasma dots are absent in both positions in a time interval for determining a symbol. In other words, an absence of plasma in both positions occurs during a time interval.

As depicted in entry 3802, in this example, the symbol is "01" when a plasma dot is absent in position 1 and a plasma dot is present in position 2. Next in entry 3803, a plasma dot is present in position 1 and a plasma dot is absent in position 2. This positioning of plasma dots results in a symbol that is "10" in this example. A plasma dot present at position 1 and at position 2 represents a symbol that is "11" in entry 3804.

Figure 39:
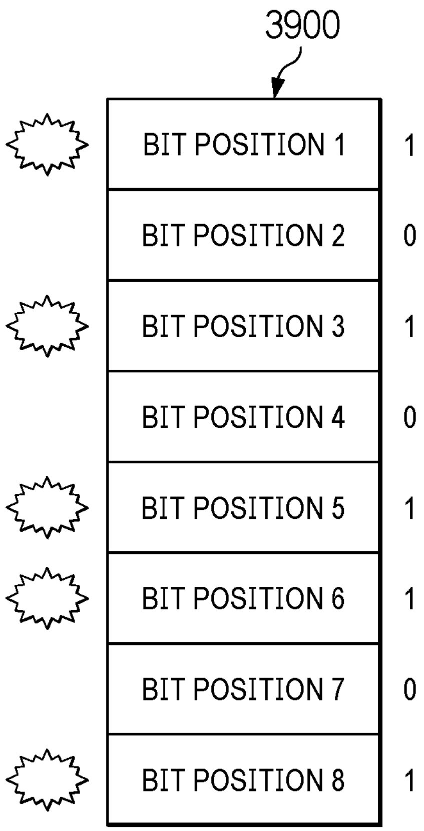
FIG. 39 is an illustration of a one-dimensional array of positions for plasma dots in accordance with an illustrative embodiment.

With reference now to FIG. 39, an illustration of a one-dimensional array of positions for plasma dots is depicted in accordance with an illustrative embodiment. In this example, array 3900 is a one dimensional array of bit positions in a line. This type of array can also be referred to as a positional framework.

As depicted, array 3900 comprises eight bit positions in which a plasma dot can be present or absent in each of these bit positions. The presence and absence of plasma dots in these bit positions within the time interval is used to determine a symbol comprising bits. In this example, the presence of the plasma dot represents a "1" and the absence of a plasma dot represents a "0."

In this example, a plasma dot is present in bit position 1; a plasma dot is absent in bit position 2; a plasma dot is present in bit position 3; a plasma dot is absent in bit position 4; a plasma dot is present in bit position 5; a plasma dot is present in bit position 6; a plasma dot is absent in bit position 7; and a plasma dot is present in bit position 8. This presence and absence of plasma dots in array 3900 within a time interval results in a symbol comprising a group of bits "10101101" in this example.

Next in FIG. 40, an illustration of a two-dimensional array of positions for plasma dots is depicted in accordance with an illustrative embodiment. As depicted, array 4000 is a two-dimensional array. This type of array can also be referred to as a positional framework.

As depicted, array 4000 comprises 64 bit positions in an 8 by 8 array in which a plasma dot can be present or absent in each of these bit positions. The presence and absence of plasma dots in these bit positions within the time interval is used to determine a symbol comprising 64 bits. In this example, the presence of the plasma dot represents a "1" and the absence of a plasma dot represents a "0."

In this example, the plasma dots generated within array 4000 is for a symbol with 64 bits. The symbol can also be referred to as a word. These plasma dots are generated within a particular time interval such as t1.

In FIG. 41, an illustration of a two-dimensional array of positions for plasma dots is depicted in accordance with an illustrative embodiment. In this figure, array 4000 comprises positions in which plasma dots are present and absent in these positions. As depicted, the positions with plasma dots in array 4000 are for a time interval t2 that is subsequent to time interval t1 depicted in FIG. 40. As shown, the positioning of the presence and absence of plasma dots has changed from that shown for time interval t1 in FIG. 40. Thus, a different group of bits for the symbol is present at time t2. This generation of plasma dots for array 4000 can continue over different time periods to transmit digital information.

Figure 42:
FIG. 42 is an illustration of a two-dimensional array of positions for plasma dots in accordance with an illustrative embodiment.

With reference next to FIG. 42, an illustration of a two-dimensional array of positions for plasma dots is depicted in accordance with an illustrative embodiment. In this illustrative example, array 4200 is a two-dimensional array of positions in which electromagnetic radiation can be generated. In this example, the two-dimensional array in the form of a square comprises different positions within the array that can be referred to as a pixel or voxel. In this example, the presence or absence of electromagnetic radiation in these positions can be, for example, radio frequency signals, light, or other types of electromagnetic radiation generated by plasma dots from optical breakdowns.

As depicted, positions with white represent an absence of plasma dots. Positions with black represent the presence of electromagnetic radiation. For example, position 4210 does not have a plasma dot. As another example, position 4211 is a position in which a plasma dot is present. Alternatively, positions with white may represent a plasma dot while positions with black represent the absence of electromagnetic radiation.

Further, corner indicators are present. In this example, corner indicator 4221, corner indicator 4222, and corner indicator 4223 indicate quarters of array 4100 for use in identifying positions. In addition to using black and white for the presence or absence of plasma dots, different colors can also be used when plasma dots are present.

The illustration of plasma dot positions and arrays in FIGS. 37-42 are presented as an example of some implementations for positions of electromagnetic radiation. These illustrations are not meant to limit the manner in which other illustrative examples can be implemented. For example, array 4000 in FIGS. 40 and 41 comprises 64-bits. In other illustrative examples, other numbers of bits can be present such as 4 bits, 16 bits, 100 bits, 144 bits, or some other number of bits. As another example, array 4000 in FIGS. 40 and 41 and array 4200 in FIG. 42 are shown in the shape of a square. In other illustrative examples, the arrays have other shapes such as a rectangle, circle, a wheel, a diamond, an irregular shape, or other suitable shape.

Figure 43:
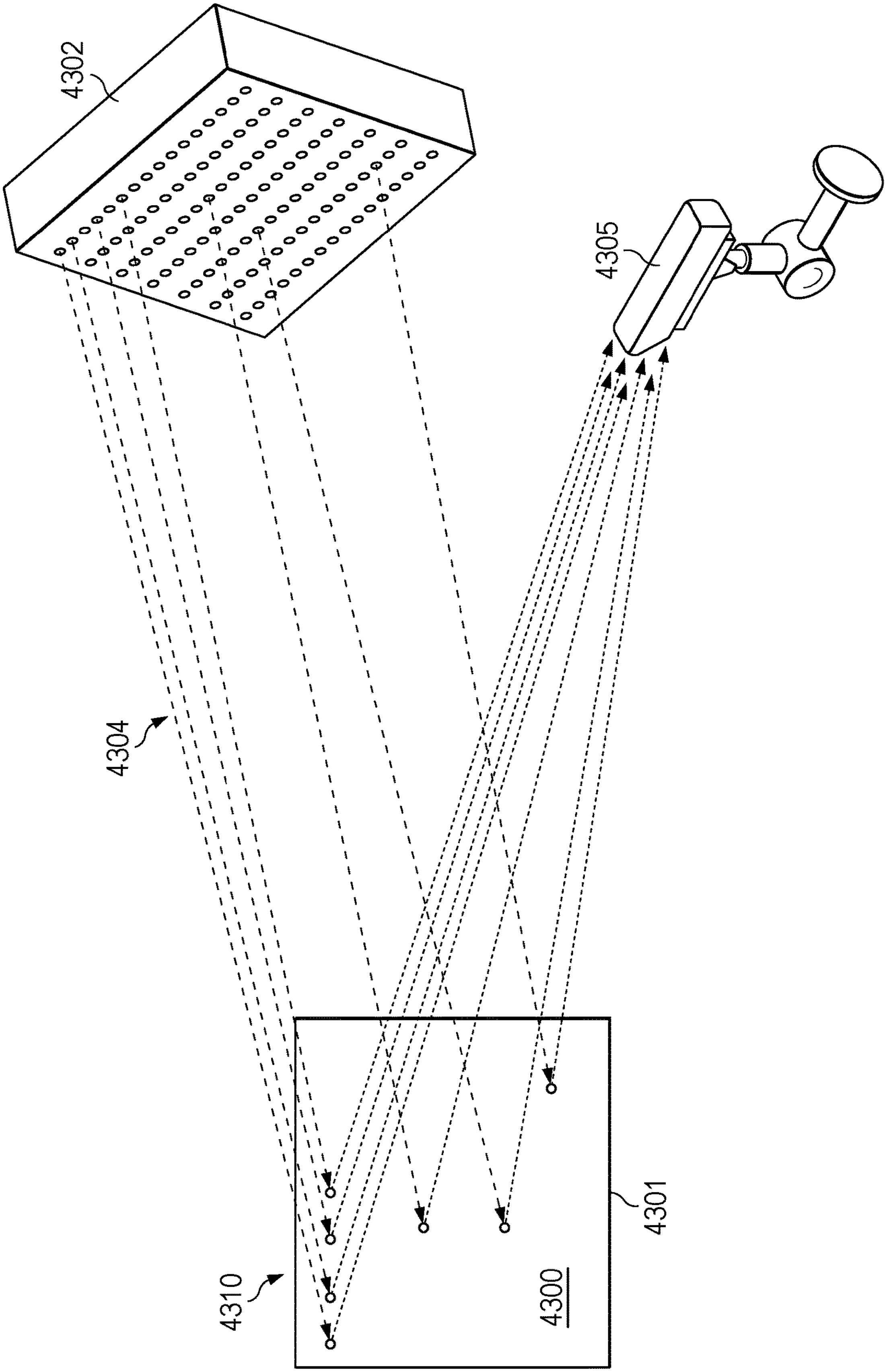
FIG. 43 is an illustration of the positioning of electromagnetic radiation on a surface of an object in accordance with an illustrative embodiment.

With reference now to FIG. 43, an illustration of the positioning of electromagnetic radiation on a surface of an object is depicted in accordance with an illustrative embodiment. In this illustrative example, surface 4300 of object 4301 is a location for positioning of electromagnetic radiation. Object 4301 can take a number of different forms. For example, object 4301 can be a satellite, an aircraft, a building, a wall, or some other object. As depicted, laser beam generator 4302 transmits laser beams 4304 at different positions on surface 4300 of object 4301. These positions can be a positional framework in which the presence or absence of electromagnetic radiation is used to encode digital information.

Receiver 4305 detects electromagnetic radiation at these positions to decode information. In this example, the electromagnetic radiation is in the form of light. This light can be a visible light, an ultraviolet light, or infrared light. Receiver 4305 is a camera or other sensor that can detect the light at the different positions on surface 4300. In this illustrative example, electromagnetic radiation can be light from plasma dots 4310 occurring from optical breakdowns at different positions on surface 4300 of object 4301.

Figure 44:
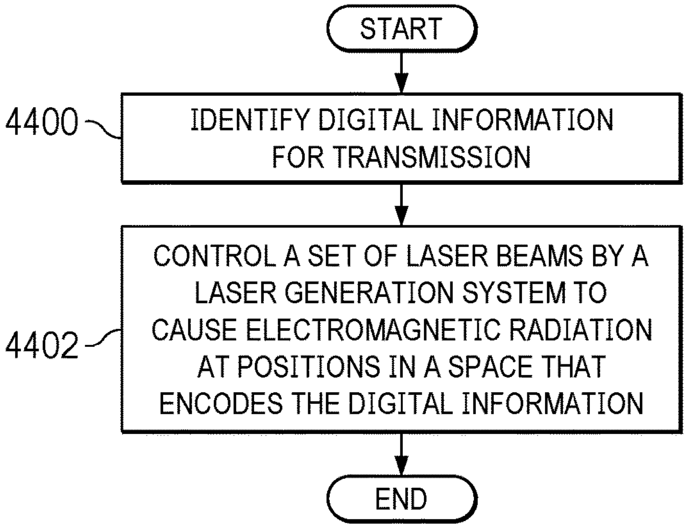
FIG. 44 is an illustration of a flowchart of a process for communicating digital information in accordance with an illustrative embodiment.

Turning next to FIG. 44, an illustration of a flowchart of a process for communicating digital information is depicted in accordance with an illustrative embodiment. The process in FIG. 44 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 for communication system 3600 in FIG. 36.

The process identifies digital information for transmission (operation 4400). The process controls a set of laser beams by a laser generation system to cause electromagnetic radiation at positions in a space that encodes the digital information (operation 4402). The process terminates thereafter.

Figure 45:
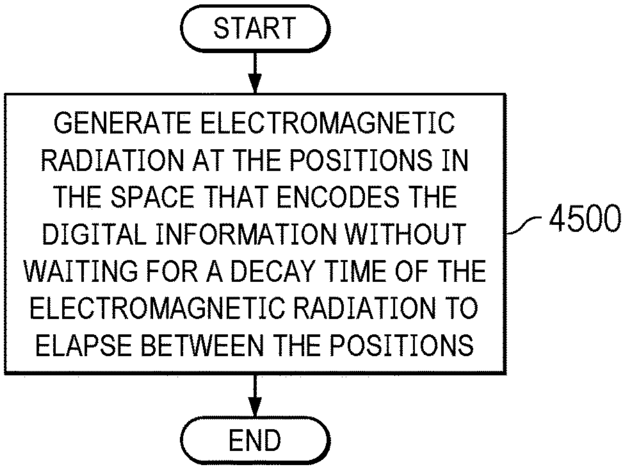
FIG. 45 is an illustration of a flowchart of a process for emitting a set of laser beams in accordance with an illustrative embodiment.

With reference to FIG. 45, an illustration of a flowchart of a process for emitting a set of laser beams is depicted in accordance with an illustrative embodiment. The process in this flowchart is an example of an implementation for operation 4402 in FIG. 44.

The process generates electromagnetic radiation at the positions in the space that encodes the digital information without waiting for a decay time of the electromagnetic radiation to elapse between the positions (operation 4500). The process terminates thereafter.

Figure 46:
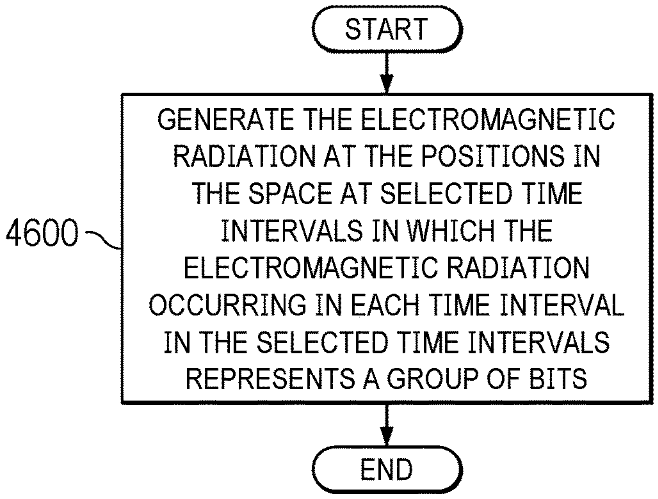
FIG. 46 is an illustration of a flowchart of a process for emitting a set of laser beams in accordance with an illustrative embodiment.

Next in FIG. 46, an illustration of a flowchart of a process for emitting a set of laser beams is depicted in accordance with an illustrative embodiment. The process in this flowchart is an example of an implementation for operation 4402 in FIG. 44.

The process generates the electromagnetic radiation at the positions in the space at selected time intervals in which the electromagnetic radiation occurring in each time interval in the selected time intervals represents a group of bits (operation 4600). The process terminates thereafter.

Figure 47:
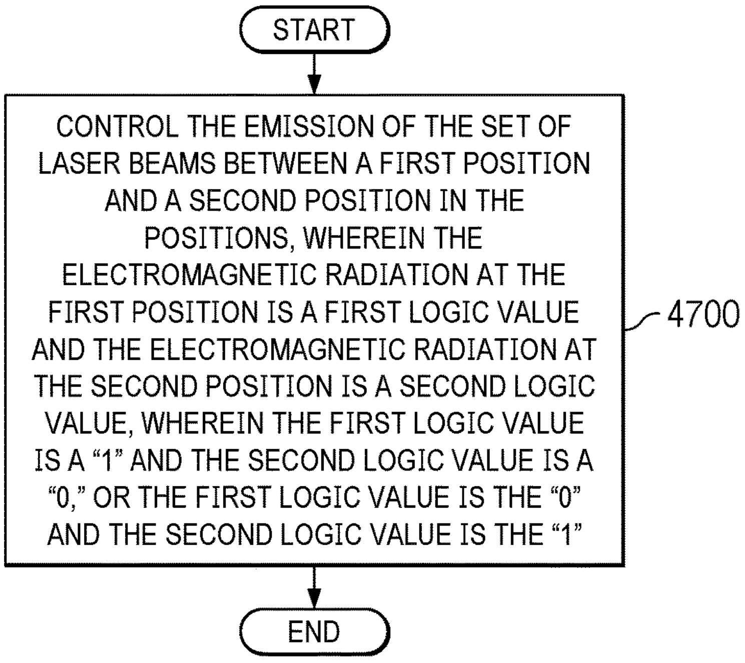
FIG. 47 is an illustration of a flowchart of a process for emitting a set of laser beams in accordance with an illustrative embodiment.

With reference to FIG. 47, an illustration of a flowchart of a process for emitting a set of laser beams is depicted in accordance with an illustrative embodiment. The process in this flowchart is an example of an implementation for operation 4402 in FIG. 44.

The process controls the emission of the set of laser beams between a first position and a second position in the positions, wherein the electromagnetic radiation at the first position is a first logic value and the electromagnetic radiation at the second position is a second logic value, wherein the first logic value is a "1" and the second logic value is a "0," or the first logic value is the "0" and the second logic value is the "1" (operation 4700). The process terminates thereafter.

Figure 48:
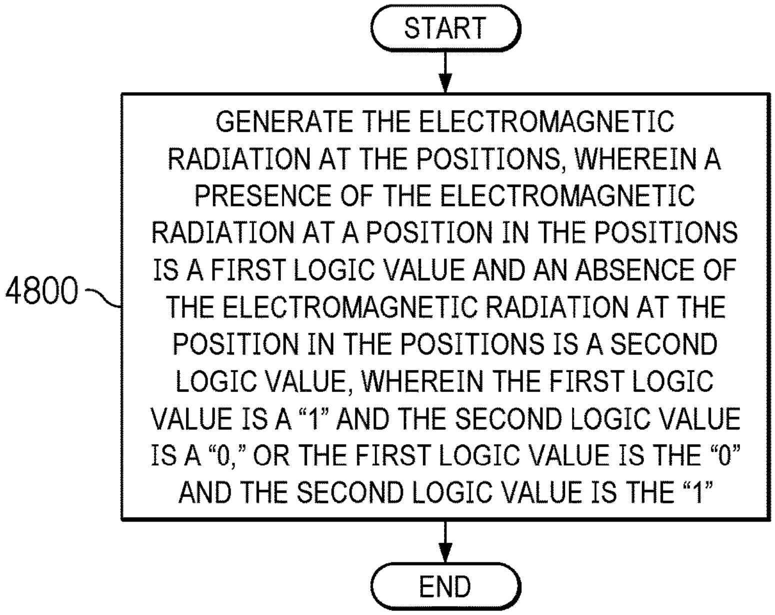
FIG. 48 is an illustration of a flowchart of a process for emitting a set of laser beams in accordance with an illustrative embodiment.

Turning next to FIG. 48, an illustration of a flowchart of a process for emitting a set of laser beams is depicted in accordance with an illustrative embodiment. The process in this flowchart is an example of an implementation for operation 4402 in FIG. 44.

The process generates the electromagnetic radiation at the positions, wherein a presence of the electromagnetic radiation at a position in the positions is a first logic value and an absence of the electromagnetic radiation at the position in the positions is a second logic value, wherein the first logic value is a "1" and the second logic value is a "0," or the first logic value is the "0" and the second logic value is the "1" (operation 4800). The process terminates thereafter.

Figure 49:
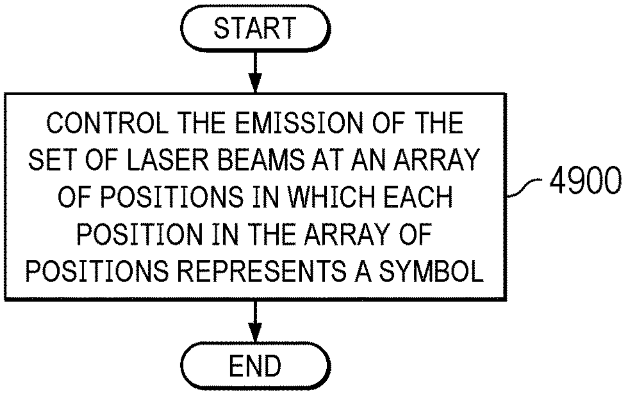
FIG. 49 is an illustration of a flowchart of a process for emitting a set of laser beams in accordance with an illustrative embodiment.

Next in FIG. 49, an illustration of a flowchart of a process for emitting a set of laser beams is depicted in accordance with an illustrative embodiment. The process in this flowchart is an example of an implementation for operation 4402 in FIG. 44.

The process controls the emission of the set of laser beams at an array of positions in which each position in the array of positions represents a symbol (operation 4900). The process terminates thereafter. In operation 4900, the array of positions is selected from a group consisting of a one-dimensional array, a two-dimensional array, and a three-dimensional array.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Motion Modulation Communications

Figure 50:
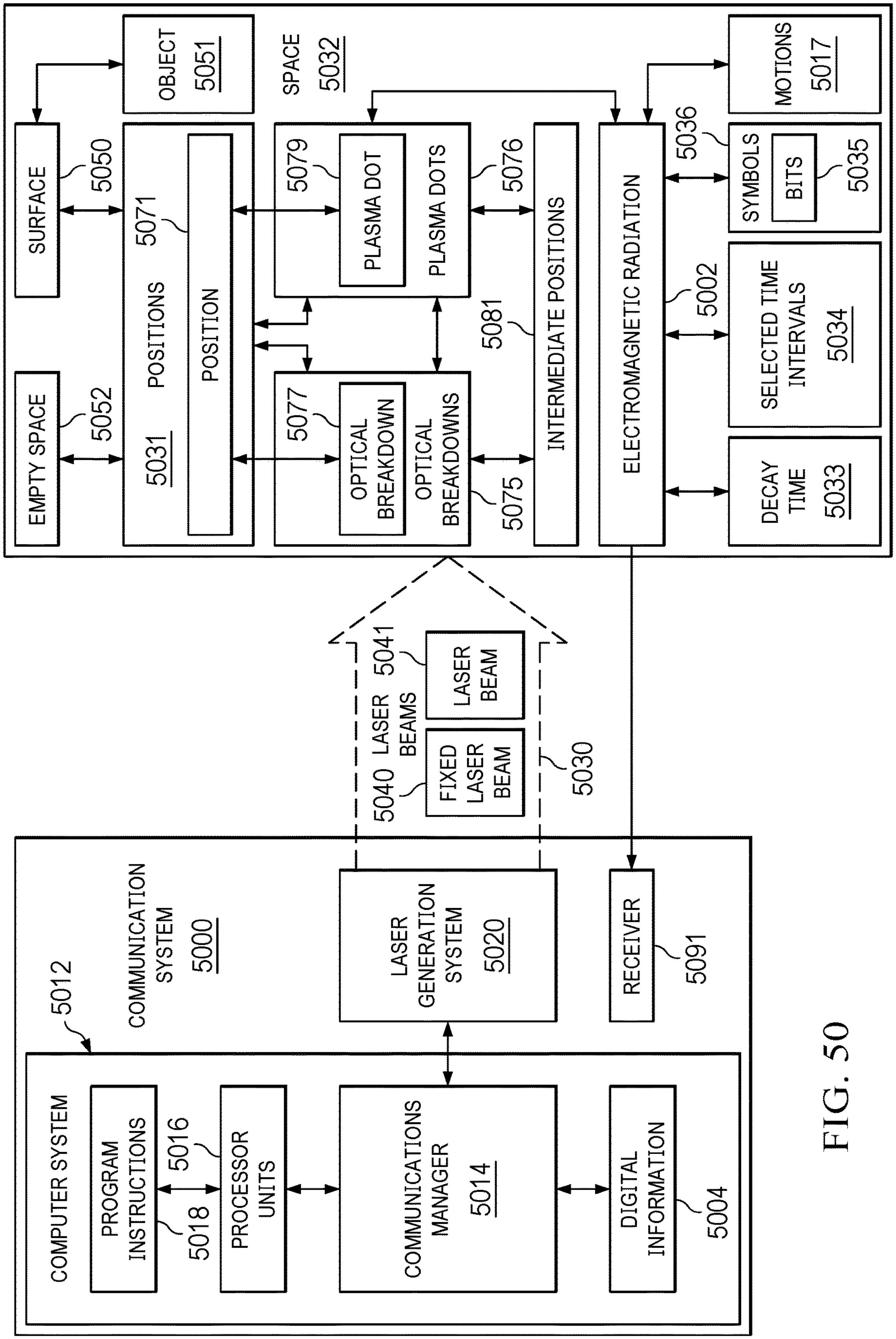
FIG. 50 is an illustration of a block diagram of a communication system in accordance with an illustrative embodiment.

With reference next to FIG. 50, an illustration of a block diagram of a communication system is depicted in accordance with an illustrative embodiment. In this illustrative example, communication system 5000 operates to generate electromagnetic radiation 5002 in a manner that encodes digital information 5004. In this illustrative example, positions 5031 of electromagnetic radiation 5002 are selected to encode digital information 5004. Electromagnetic radiation 5002 can be selected from at least one of a visible light, an ultraviolet light, an infrared light, radio frequencies, x-rays, or other types of electromagnetic radiation 5002.

In this illustrative example, communication system 5000 comprises laser generation system 5020, computer system 5012, and communications manager 5014. As depicted, communications manager 5014 is located in computer system 5012.

In this illustrative example, laser generation system 5020 can be implemented using laser generation systems as depicted in FIGS. 2-7 as well as other suitable laser generation systems. In this illustrative example, laser generation system 5020 emits a set of laser beams 5030. Laser generation system 5020 can emit a set of laser beams 5030 as fixed laser beam 5040 at each position in positions 5031 to generate electromagnetic radiation 5002. In another example, laser generation system 5020 can move laser beam 5041 in the set of laser beams 5030 from position to position in positions 5031 to generate electromagnetic radiation 5002 with motions 5017 from position to position in positions 5031.

These positions in positions 5031 can take a number of different forms. For example, positions 5031 can be on surface 5050 of object 5051 in space 5032. Object 5051 can take a number of different forms. For example, object 5051 can be a satellite, an aircraft, a building, a wall, or some other suitable object.

In another example, space 5032 can be empty space 5052. Empty space 5052 can be, for example, in the atmosphere, a vacuum, outer space, or some other location.

In this example, communications manager 5014 is configured to control the operation of laser generation system 5020. Communications manager 5014 can be implemented in software, hardware, firmware, or a combination thereof. When software is used, the operations performed by communications manager 5014 can be implemented in program instructions configured to run on hardware, such as a processor unit. When firmware is used, the operations performed by communications manager 5014 can be implemented in program instructions and data can be stored in persistent memory to run on a processor unit. When hardware is employed, the hardware can include circuits that operate to perform the operations in communications manager 5014.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, computer system 5012 is a physical hardware system and includes one or more data processing systems. When more than one data processing system is present in computer system 5012, those data processing systems are in communication with each other using a communications medium. The communications medium can be a network. The data processing systems can be selected from at least one of a computer, a server computer, a tablet computer, or some other suitable data processing system.

As depicted, computer system 5012 includes a number of processor units 5016 that is capable of executing program instructions 5018 implementing processes in the illustrative examples. In other words, program instructions 5018 are computer-readable program instructions.

As used herein, a processor unit in the number of processor units 5016 is a hardware device and is comprised of hardware circuits such as those on an integrated circuit that respond to and process instructions and program code that operate a computer. When the number of processor units 5016 executes program instructions 5018 for a process, the number of processor units 5016 can be one or more processor units that are in the same computer or in different computers. In other words, the process can be distributed between the number of processor units 5016 on the same or different computers in computer system 5012.

Further, the number of processor units 5016 can include the same type or different types of processor units. For example, the number of processor units 5016 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, the number of processor units 5016 can also include other components in addition to the processor units or processing circuitry. For example, the number of processor units 5016 can also include a cache or other components used with processor units or other processing circuitry.

In this illustrative example, communications manager 5014 is configured to perform a number of different operations in communicating digital information 5004. For example, communications manager 5014 can identify digital information 5004 for transmission. Communications manager 5014 can control an emission of the set of laser beams 5030 by laser generation system 5020 to generate electromagnetic radiation 5002 with motions 5017 between positions in a space to thereby encode the digital information 5004.

In the illustrative example, electromagnetic radiation 5002 is energy that propagates through space 5032 in the form of electric fields and magnetic fields. Electromagnetic radiation 5002 can be within a spectrum of wavelengths or frequencies. In this illustrative example, electromagnetic radiation 5002 can be generated by optical breakdowns 5075 at positions 5031. These optical breakdowns result in plasma dots 5076.

For example, optical breakdown 5077 at position 5071 in positions 5031 can result in plasma dot 5079 in plasma dots 5076 at position 5071. Plasma dots 5076 are electromagnetic radiation 5002 generated by optical breakdowns 5075. Thus, a number of optical breakdowns 5075 at positions 5031 in space 5032 generated by the set of laser beams 5030 results in a number of plasma dots 5076 at positions 5031 in space 5032.

Further in this illustrative example, communications manager 5014 can move the set of laser beams 5030 to generate the electromagnetic radiation 5002 at a number of intermediate positions 5081 while moving the set of laser beams 5030 from one position to another position in positions 5031. Thus, in these illustrative examples, motions 5017 between positions 5031 can be indicated by optical breakdowns 5075 resulting in plasma dots 5076 in intermediate positions 5081 between positions 5031. In other words, optical breakdowns 5075 at intermediate positions 5081 resulting in plasma dots 5076 at intermediate positions 5081 can be present between positions 5031 to indicate motions 5017.

In these examples, electromagnetic radiation 5002 from plasma dots 5076 can be at least one of, visible light, ultraviolet light, infrared light, radio frequencies, or x-rays. For example, plasma dots 5076 can generate radio frequency signals as electromagnetic radiation 5002. As another example, plasma dots 5076 can include visible light in electromagnetic radiation 5002. These and other types of electromagnetic radiation 5002 generated by plasma dots 5076 can be detected at positions 5031 and at intermediate positions 5081.

Further in this example, communications manager 5014 can generate electromagnetic radiation 5002 without waiting for decay time 5033 of electromagnetic radiation 5002 to elapse at positions 5031. Further communications manager 5014 can generate electromagnetic radiation without waiting for decay time 5033 to elapse in intermediate positions 5081. For example, electromagnetic radiation 5002 can be generated in a first position. Electromagnetic radiation 5002 can also be generated at an intermediate position and in a second position prior to the electromagnetic radiation 5002 in the first position being reduced to some lower level or disappearing. In this example, the reduction is a decrease in a number of characteristics for electromagnetic radiation 5002 that can be selected from at least one of intensity, amplitude, or some other characteristics of electromagnetic radiation 5002. This level can be for electromagnetic radiation 5002 to completely dissipate at the first position or reach some other level.

Further, as part of controlling the emissions of the set of laser beams 5030, communications manager 5014 can generate electromagnetic radiation 5002 at positions in space 5032 at selected time intervals 5034. With this example, electromagnetic radiation 5002 generated in each time interval in selected time intervals 5034 with motions 5017 at positions 5031 in space 5032 represents a group of symbols 5036 in digital information 5004. In one example, the group of symbols can be a group of bits 5035 in which each symbol in symbols 5036 can be one or more of bits 5035.

In this illustrative example, communication system 5000 can also include receiver 5091. Receiver 5091 is a hardware system and can include software. Receiver 5091 can take a number of forms. For example, receiver 5091 can be at least one of a camera, a radio receiver, or other suitable types of procedures.

In this example, receiver 5091 can detect electromagnetic radiation 5002. Receiver 5091 can determine digital information 5004 from motions 5017 between positions 5031 from which electromagnetic radiation 5002 is detected. In these examples, this digital information can be a group of symbols 5036, such as a group of bits 5035.

Figure 51:
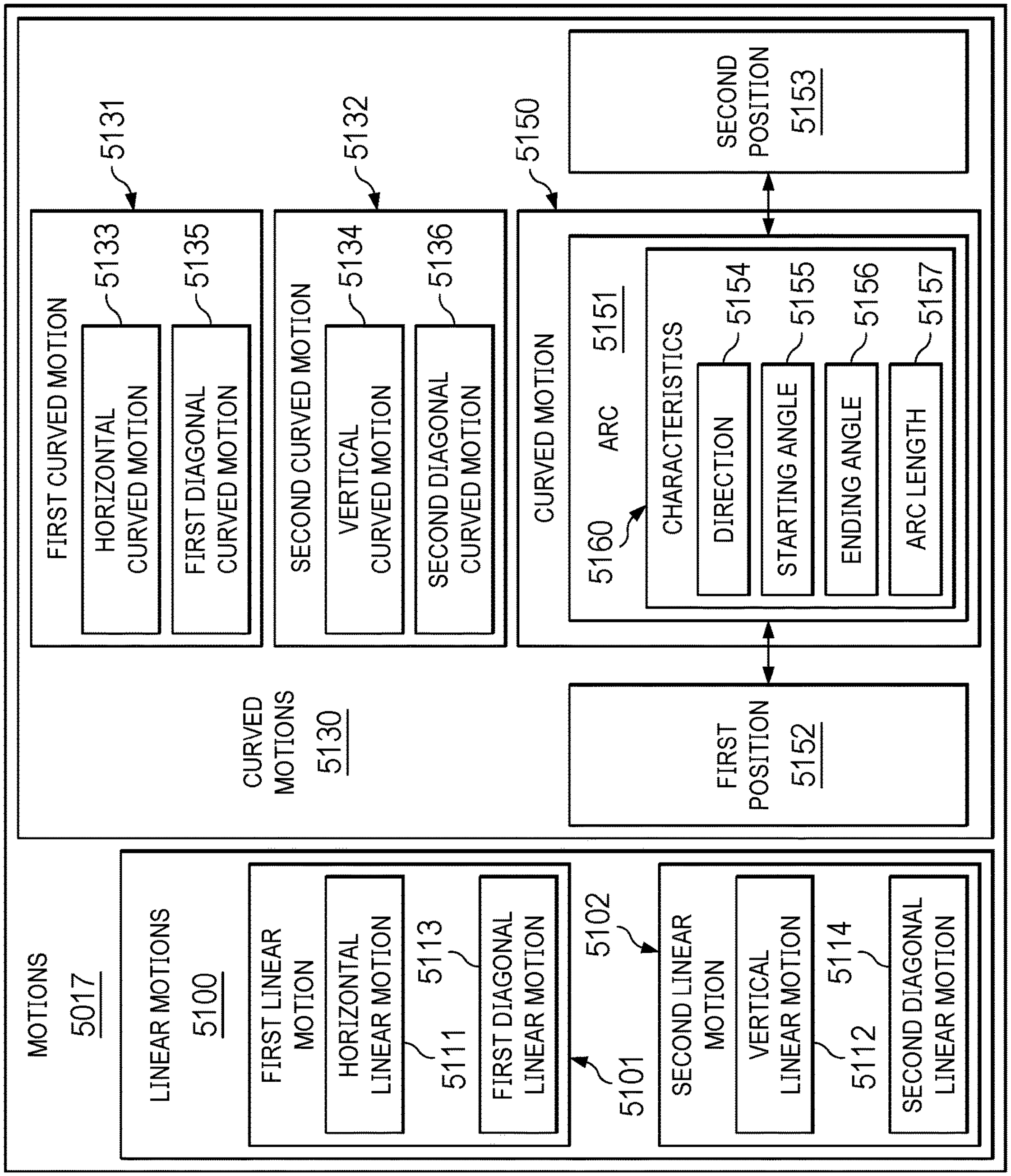
FIG. 51 is an illustration of types of motions in accordance with an illustrative embodiment.

Turning next to FIG. 51, an illustration of types of motions is depicted in accordance with an illustrative embodiment. In this illustrative example, examples of motions 5017 in FIG. 50 are shown in which these different motions can be used to encode digital information 5004. These motions can be detected by receiver 5091 to identify symbols 5036 in electromagnetic radiation 5002.

In another illustrative example, communications manager 5014 can control the emission of the set of laser beams 5030 with linear motions 5100 between positions 5031. In this example, linear motions 5100 is a type of motions 5017 and comprises at least one of first linear motion 5101 or second linear motion 5102. Electromagnetic radiation 5002 with first linear motion 5101 is a first symbol and the electromagnetic radiation with second linear motion 5102 is a second symbol.

With this example, first linear motion 5101 can be horizontal linear motion 5111. Second linear motion 5102 can be vertical linear motion 5112. In this example, horizontal linear motion 5111 and vertical linear motion 5112 are motions relative to each other. For example, horizontal linear motion 5111 can be perpendicular or 90 degrees from vertical linear motion 5112.

In another example, first linear motion 5101 can be first diagonal linear motion 5113. Second linear motion 5102 can be second diagonal linear motion 5114. In this illustrative example, first diagonal linear motion 5113 and second diagonal linear motion 5114 are relative to horizontal linear motion 5111 and vertical linear motion 5112. These diagonal linear motions can be at least one of ascending or descending.

In another illustrative example, communications manager 5014 can control the emission of the set of laser beams 5030 to generate electromagnetic radiation 5002 with curved motions 5130 between positions 5031. In this example, curved motions 5130 comprises at least one of first curved motion 5131 or second curved motion 5132. Electromagnetic radiation 5002 with first curved motion 5131 is a first symbol and electromagnetic radiation 5002 with second curved motion 5132 is a second symbol.

In these illustrative examples, positions 5031 are starting and stopping points for the curved motions 5130. Intermediate positions 5081 between positions 5031 identify the curve for a curved motion. Further, the particular symbol for curved motion 5150 in curved motions 5130 can be based on arc 5151 between first position 5152 and second position 5153. In this example, arc 5151 can be a smooth curve, a nonsmooth curve, a triangle curve, a sawtooth curve, an irregular curve, or some other type of curve.

Further, the number of characteristics 5160 of arc 5151 can be used to define or determine the symbol for curved motion 5150. Direction 5154 is one characteristic in the number of characteristics 5160 of arc 5151 and can also be used to indicate the symbol. For example, a first symbol can be present with arc 5151 having direction 5154 from first position 5152 to second position 5153. A different symbol can be present with arc 5151 having direction 5154 from second position 5153 to first position 5152. Examples of other characteristics in the number of characteristics 5160 can be starting angle 5155 and ending angle 5156 for arc 5151. Either or both of these angles can be used to define the symbol in addition to or in place of direction 5154.

Thus, communications manager 5014 can control emissions of the set of laser beams 5030 to generate electromagnetic radiation 5002 with curved motions 5130 between positions 5031 in which curved motion 5150 between a pair of positions 5031 has direction 5154 and at least one of starting angle 5155 or ending angle 5156 that is a symbol. In yet another example, another characteristic in the number of characteristics 5160 that can be used to define the symbol is arc length 5157 of arc 5151.

Thus, curved motions 5130 can be at least one of direction 5154, starting angle 5155, ending angle 5156, or arc length 5157 that defines the symbol. These characteristics of curved motion 5150 can be used in combination with whether curved motion 5150 is first curved motion 5131 or second curved motion 5132 to define the symbol.

With this example, first curved motion 5131 is a horizontal curved motion 5133 and second curved motion 5132 is a vertical curved motion 5134. In another example, first curved motion 5131 is first diagonal curved motion 5135 and second curved motion 5132 is second diagonal curved motion 5136. These diagonal curved motions can be at least one of ascending or descending.

In another example, the emission of the set of laser beams 5030 with motions 5017 can be selected from at least one of linear motions 5100 between positions 5031 or curved motions 5130 between positions 5031, wherein a direction of a respective motion is a symbol. This and other characteristics of motions 5017 can be used to determine symbols encoded by these motions.

FIGS. 52-64 are examples of motions 5017. These different figures are examples of implementations for motions 5017 in FIG. 50 and FIG. 51.

Figure 52:
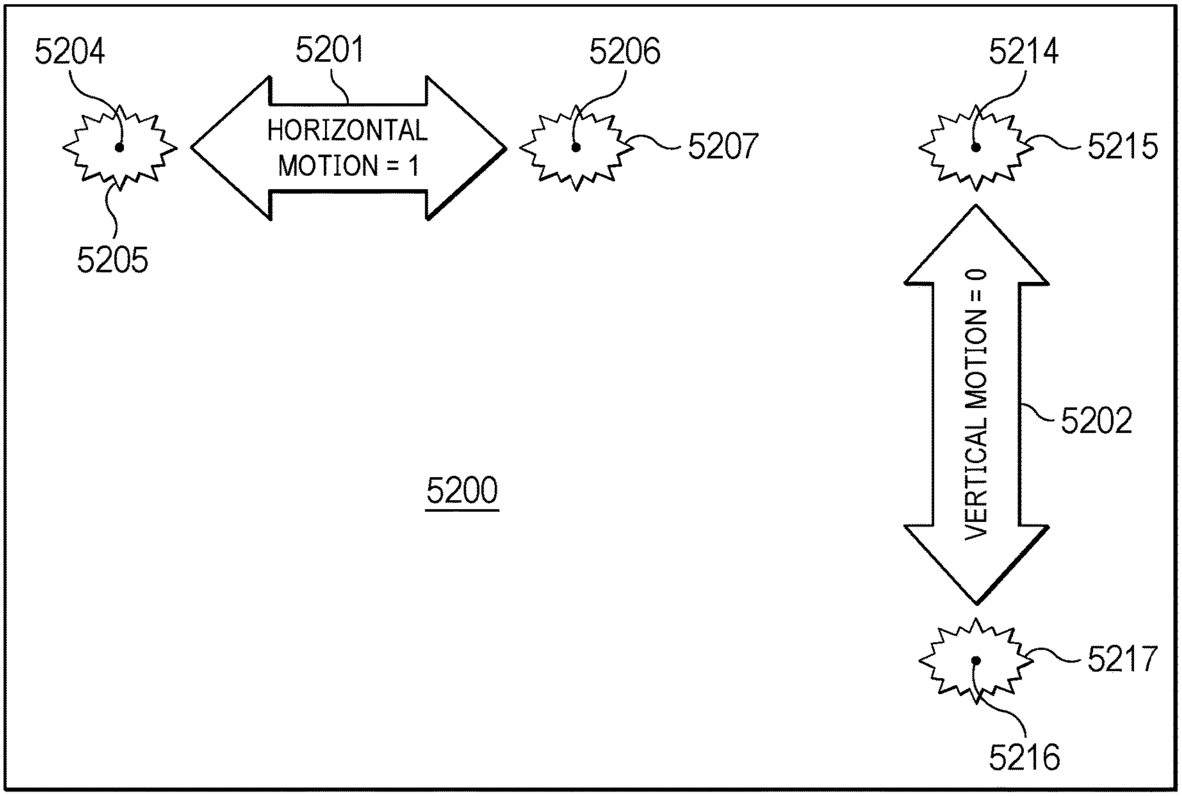
FIG. 52 is an illustration of linear motions in accordance with an illustrative embodiment.

Turning next to FIG. 52, an illustration of linear motions is depicted in accordance with an illustrative embodiment. In this example, linear motions 5200 are an example of an implementation for linear motions 5100 in FIG. 51. As depicted, linear motions 5200 include horizontal motion 5201 and vertical linear motion 5202. In this example, horizontal motion 5201 is an example of horizontal linear motion 5111 in FIG. 51 and is a logic “1.” Vertical linear motion 5202 is an example of vertical linear motion 5112 in FIG. 51 and is a logic “0.”

In this example, horizontal motion 5201 is between position 5204 identified by plasma dot 5205 and position 5206 identified by plasma dot 5207. As depicted, vertical linear motion 5202 is between position 5214 identified by plasma dot 5215 and position 5216 identified by plasma dot 5217.

Figure 53:
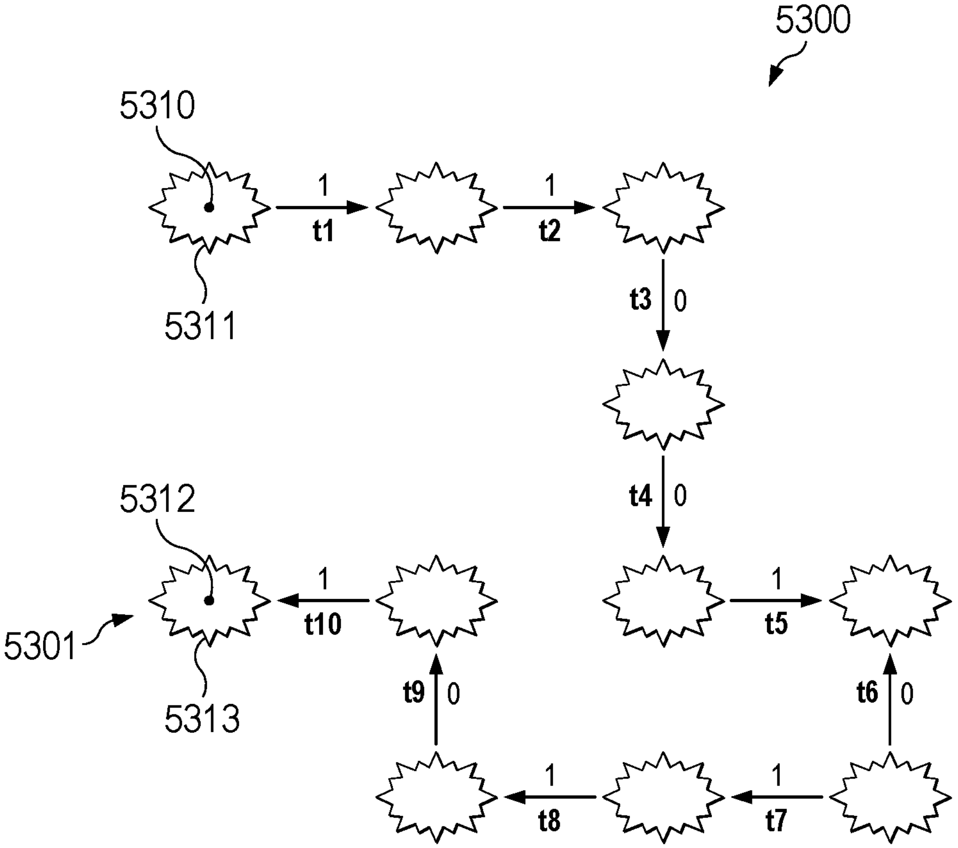
FIG. 53 is an illustration of digital data encoded using linear motions in accordance with an illustrative embodiment.

Turning next to FIG. 53, an illustration of digital data encoded using linear motions is depicted in accordance with an illustrative embodiment. In this illustrative example, the digital data takes the form of a 10-bit string, 1100101101, encoded using linear motions 5300 between positions identified by plasma dots resulting from optical breakdowns. As depicted, horizontal linear motions in linear motions 5300 are a “1,” while vertical linear motions in linear motions 5300 are a “0” in this depicted example. In this example, motions are assumed to be between the different positions and intermediate positions are not needed to indicate linear motions 5300.

In this example, linear motions 5300 from electromagnetic radiation generated by plasma dots 5301 occur during time periods t1, t2, t3, t4, t5, t6, t7, t8, t9, and t10. In this example, position 5310 for plasma dot 5311 in plasma dots 5301 is the start position from which linear motions 5300 occur. Position 5312 for plasma dot 5313 in plasma dots 5301 is the end position for linear motions 5300.

Linear motions 5300 occurring during time periods t1, t2, t5, t7, t8, and t10 are horizontal motions that are each a “1” in this example. Linear motions 5300 occurring during time periods t3, t4, t6, and t9 are vertical linear motions that are each a “0” in this example. The resulting bit string is 1100101101. In these examples, no overlap is present between the different plasma dots prior to the decay for the plasma dots occurring. With this example, the limits for position modulation with decay times are not present using linear motions 5300 when a motion to a prior position is not used before the decay for the plasma dot occurs for that prior position. As a result, increased speed in transmitting digital data can be achieved using linear motions 5300.

Figure 54:
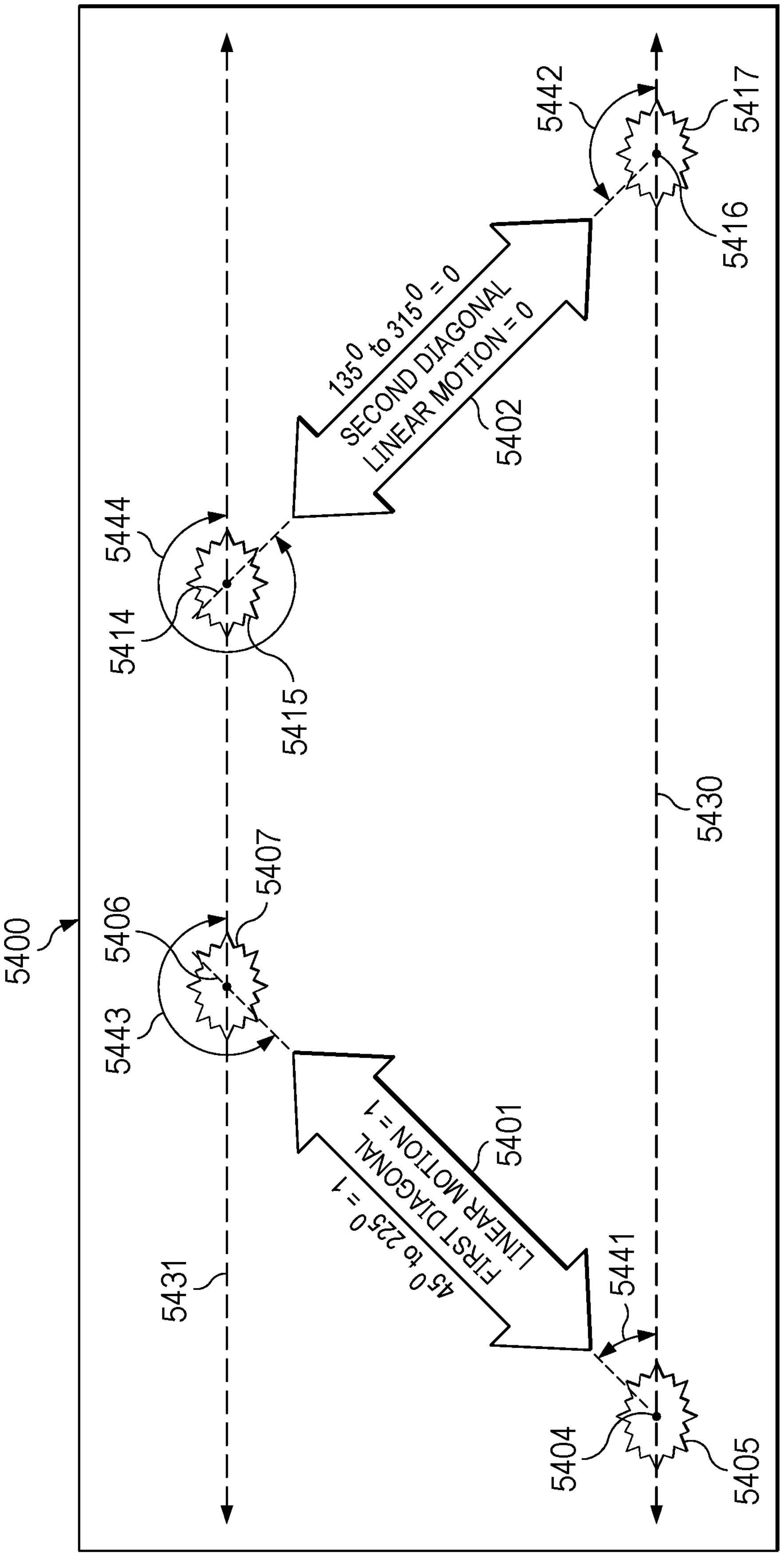
FIG. 54 is another illustration of linear motions in accordance with an illustrative embodiment.

Next in FIG. 54, another illustration of linear motions is depicted in accordance with an illustrative embodiment. In this example, linear motions 5400 are an example of an implementation for linear motions 5100 in FIG. 51. As depicted, linear motions 5400 include first diagonal linear motion 5401 and second diagonal linear motion 5402. In this example, first diagonal linear motion 5401 can be ascending or descending. First diagonal linear motion 5401 is an example of first diagonal linear motion 5113 in FIG. 51 and is a logic “1.” Second diagonal linear motion 5402 can be ascending or descending. Second diagonal linear motion 5402 is an example of second diagonal linear motion 5114 in FIG. 51 and is a logic “0.” Both of these linear diagonal linear motions can be ascending and descending but in a different diagonal direction from each other.

In this example, first diagonal linear motion 5401 is between position 5404 identified by plasma dot 5405 and position 5406 identified by plasma dot 5407. As depicted, second diagonal linear motion 5402 is between position 5414 identified by plasma dot 5415 and position 5416 identified by plasma dot 5417.

In this example, the determination of the presence of ascending diagonal linear motions and descending diagonal linear motions can be based on the starting angle of the motion. The starting angle can be relative to one of reference line 5430 and reference line 5431. The references lines are horizontal lines. For example, first diagonal linear motion 5401 can have starting angle 5441 that is 45 degrees from reference line 5430 as an ascending diagonal linear motion. In another example, first diagonal linear motion 5401 can have starting angle 5443 that is 225 degrees from reference line 5431 as a descending diagonal linear motion.

In a similar manner, second diagonal linear motion 5402 can have starting angle 5444 that is 315 degrees from reference line 5431 as a descending linear motion. As another example, second diagonal linear motion 5402 can have starting angle 5442 that is 135 degrees from reference line 5430 as an ascending diagonal linear motion.

In this these examples, the starting angles are measured from the starting point of the motions. For example, starting angle 5441 is used when first diagonal linear motion 5401 starts at position 5404. As another example, starting angle 5443 is used when first diagonal linear motion 5401 starts at position 5406. Further, with this example, starting angle 5444 is used when second diagonal linear motion 5402 starts at position 5414. Starting angle 5442 is used when second diagonal linear motion 5402 starts at position 5416.

Figure 55:
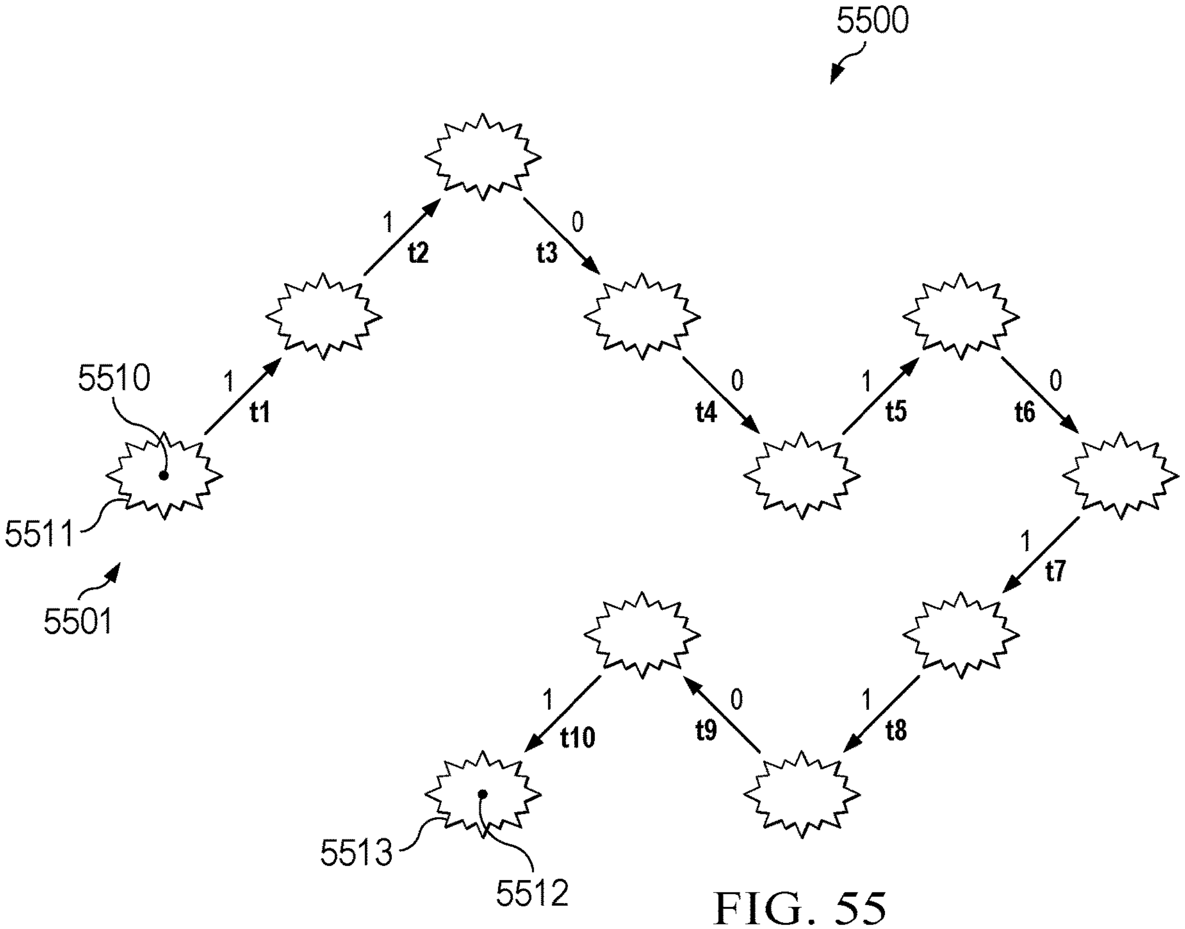
FIG. 55 is an illustration of digital data encoded using diagonal linear motions in accordance with an illustrative embodiment.

Turning next to FIG. 55, an illustration of digital data encoded using diagonal linear motions is depicted in accordance with an illustrative embodiment. In this illustrative example, the digital data takes the form of a 10-bit string, 1100101101, encoded using diagonal linear motions 5500 between positions identified by plasma dots resulting from optical breakdowns. As depicted, ascending 45 degree diagonal linear motions in diagonal linear motions 5500 are a “1,” and descending 225 degree diagonal linear motions are a “1,” while descending 315 degree diagonal linear motions in diagonal linear motions 5500 are a “0” and ascending 135 degree diagonal linear motions in diagonal linear motions 5500 are “0” in this depicted example. In this example, motions are assumed to be between the different positions and intermediate positions are not needed to indicate diagonal linear motions 5500.

In this example, diagonal linear motions 5500 from electromagnetic radiation generated by plasma dots 5501 occur during time periods t1, t2, t3, t4, t5, t6, t7, t8, t9, and t10. In this example, position 5510 for plasma dot 5511 in plasma dots 5501 is the start position from which diagonal linear motions 5500 occur. Position 5512 for plasma dot 5513 in plasma dots 5501 is the end position for diagonal linear motions 5500.

Diagonal linear motions 5500 occurring during time periods t1, t2, t5, t7, t8, and t10 are ascending or descending diagonal linear motions that are each a "1" in this example. Diagonal linear motions 5500 occurring during time periods t3, t4, t6, and t9 are descending or ascending diagonal linear motions and are each a "0" in this example. The resulting bit string is 1100101101. In these examples, no overlap is present between the different plasma dots prior to the decay for the plasma dots occurring.

With this example, the limits for position modulation with decay times are not present using diagonal linear motions 5500 when a motion to a prior position is not used before the decay for the plasma dot occurs for that prior position. As a result, increased speed in transmitting digital data can be achieved using diagonal linear motions 5500.

Figure 56:
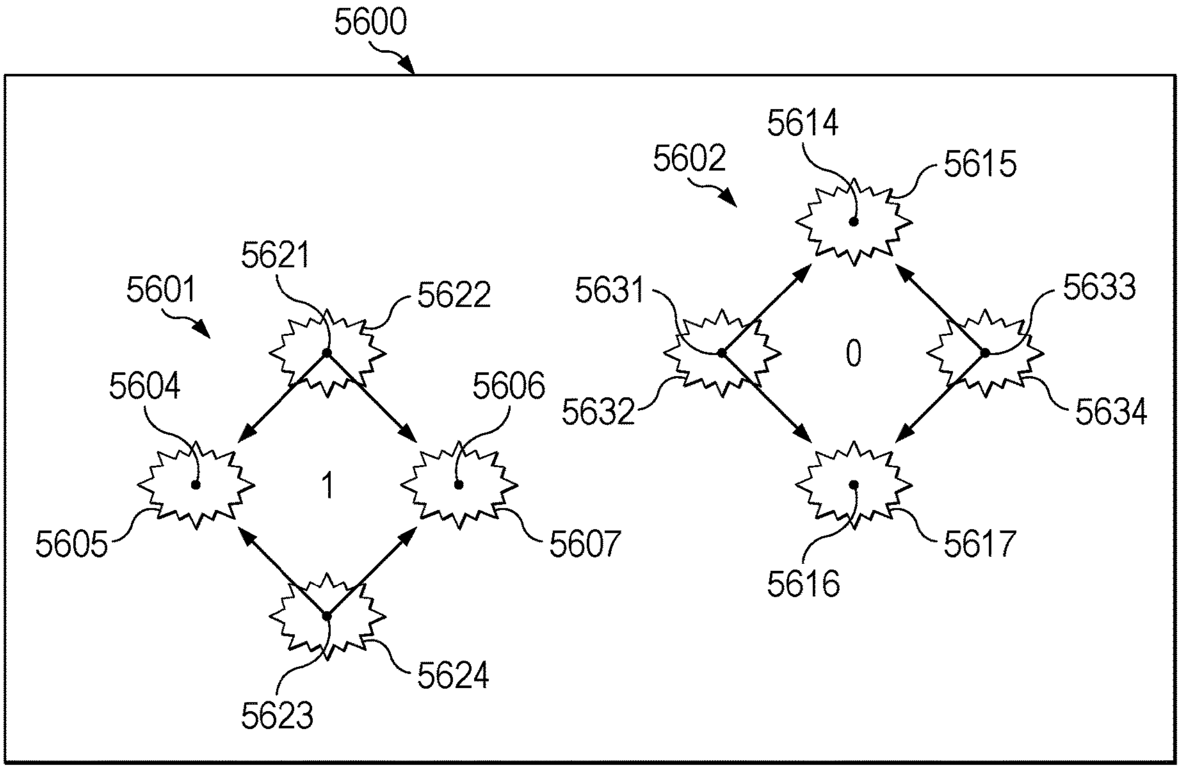
FIG. 56 is an illustration of diagonal linear motions in accordance with an illustrative embodiment.

Turning next to FIG. 56, an illustration of diagonal curved motions is depicted in accordance with an illustrative embodiment. In this example, curved motions 5600 are an example of an implementation for curved motions 5130 in FIG. 51. As depicted, curved motions 5600 include horizontal curved motion 5601 and vertical curved motion 5602. In this example, horizontal curved motion 5601 is an example of horizontal curved motion 5133 in FIG. 51 and is a logic "1." Vertical curved motion 5602 is an example of vertical curved motion 5134 in FIG. 51 and is a logic "0."

In this example, horizontal curved motion 5601 is between position 5604 identified by plasma dot 5605 and position 5606 identified by plasma dot 5607. As depicted, vertical curved motion 5602 is between position 5614 identified by plasma dot 5615 and position 5616 identified by plasma dot 5617.

In this example, a set of intermediate positions is present to identify a curved motion. For example, intermediate position 5621 identified using plasma dot 5622 indicates a curve is present between position 5604 and position 5606.

As another example, intermediate position 5623 identified using plasma dot 5624 indicates that the curve is present between position 5604 and position 5606. One or both of these intermediate positions can be present to indicate horizontal curved motion 5601. In other examples, one or more additional intermediate positions identified using plasma dots can also be present.

In a similar fashion, another set of intermediate positions is present to identify a curved motion. For example, intermediate position 5631 identified using plasma dot 5632 indicates a curve is present between position 5614 and position 5616. As another example, intermediate position 5633 identified using plasma dot 5634 indicates that the curve is present between position 5614 and position 5616. One or both of these intermediate positions can be present to indicate vertical curved motion 5602. In other examples, one or more additional intermediate positions identified using plasma dots can also be present.

Figure 57:
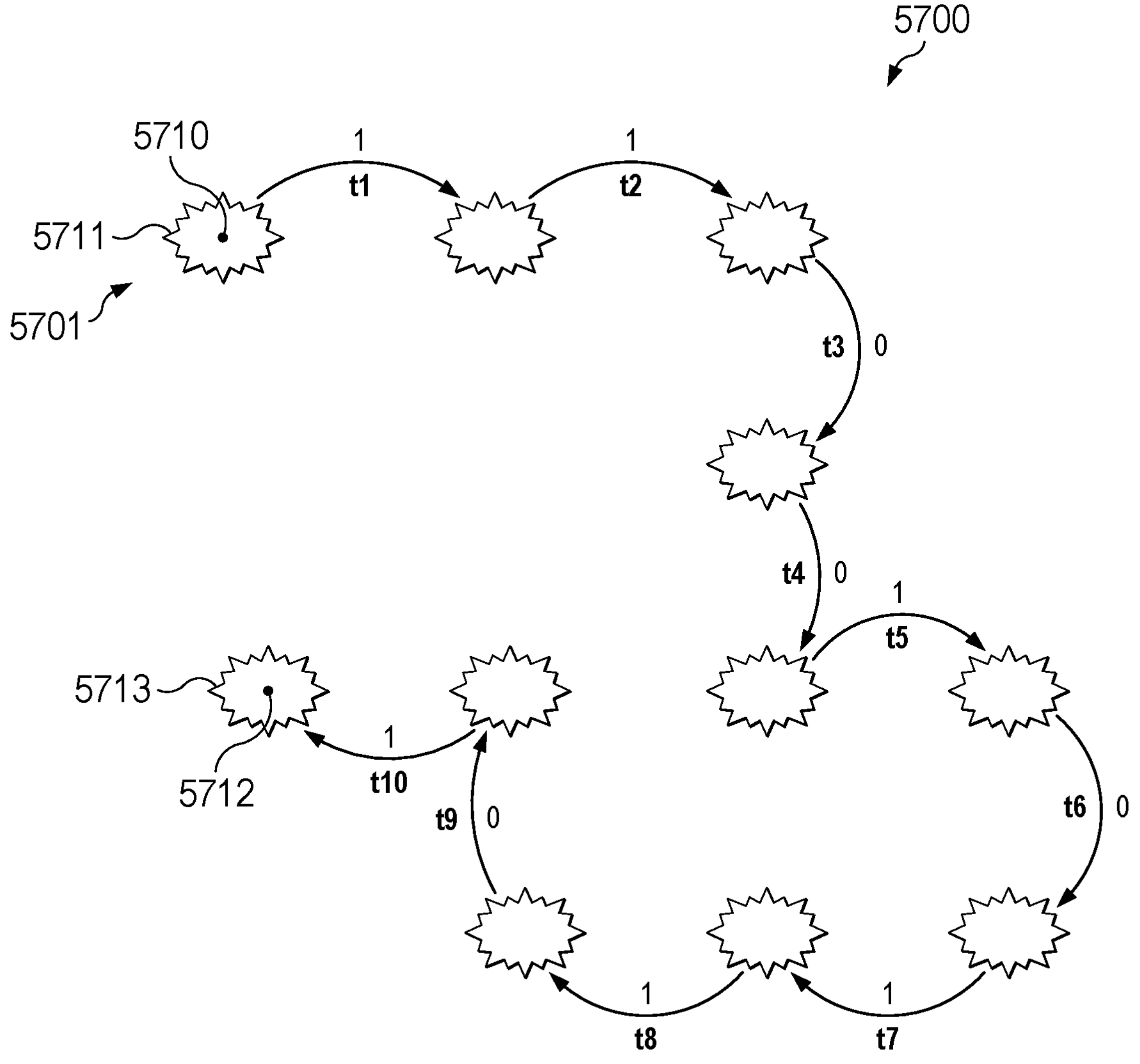
FIG. 57 is an illustration of digital data encoded using curved motions in accordance with an illustrative embodiment.

Turning next to FIG. 57, an illustration of digital data encoded using horizontal and vertical curved motions is depicted in accordance with an illustrative embodiment. In this illustrative example, the digital data takes the form of a 10-bit string, 1100101101, encoded using curved motions 5700 between positions identified by plasma dots resulting from optical breakdowns. As depicted, horizonal curved motions in curved motions 5700 are a "1," while vertical curved motions in motions 5700 are a "0" in this depicted example.

In this illustrative example, the presence of curved motions 5700 are identified using intermediate positions between the positions for curved motions 5700. In these examples, one or more intermediate positions are present between the pair positions for curved motion. These different intermediate positions are not shown in this figure to avoid obscuring illustration of the curved motions in this figure.

In this example, curved motions 5700 from electromagnetic radiation generated by plasma dots 5701 occur during time periods t1, t2, t3, t4, t5, t6, t7, t8, t9, and t10. In this example, position 5710 for plasma dot 5711 in plasma dots 5701 is the start position from which curved motions 5700 occur. Position 5712 for plasma dot 5713 in plasma dots 5701 is the end position for curved motions 5700.

Curved motions 5700 occurring during time periods t1, t2, t5, t7, t8, and t10 are horizontal curved motions that are each a "1" in this example. Curved motions 5700 occurring during time periods t3, t4, t6, and t9 are vertical curved motions that are each a "0" in this example. The resulting bit string is 1100101101. In these examples, no overlap is present between the different plasma dots prior to the decay for the plasma dots occurring. With this example, the limits for position modulation with decay times are not present using curved motions 5700 when a motion to a prior position is not used before the decay for the plasma dot occurs for that prior position. As a result, increased speed in transmitting digital data can be achieved using curved motions 5700.

Figure 58:
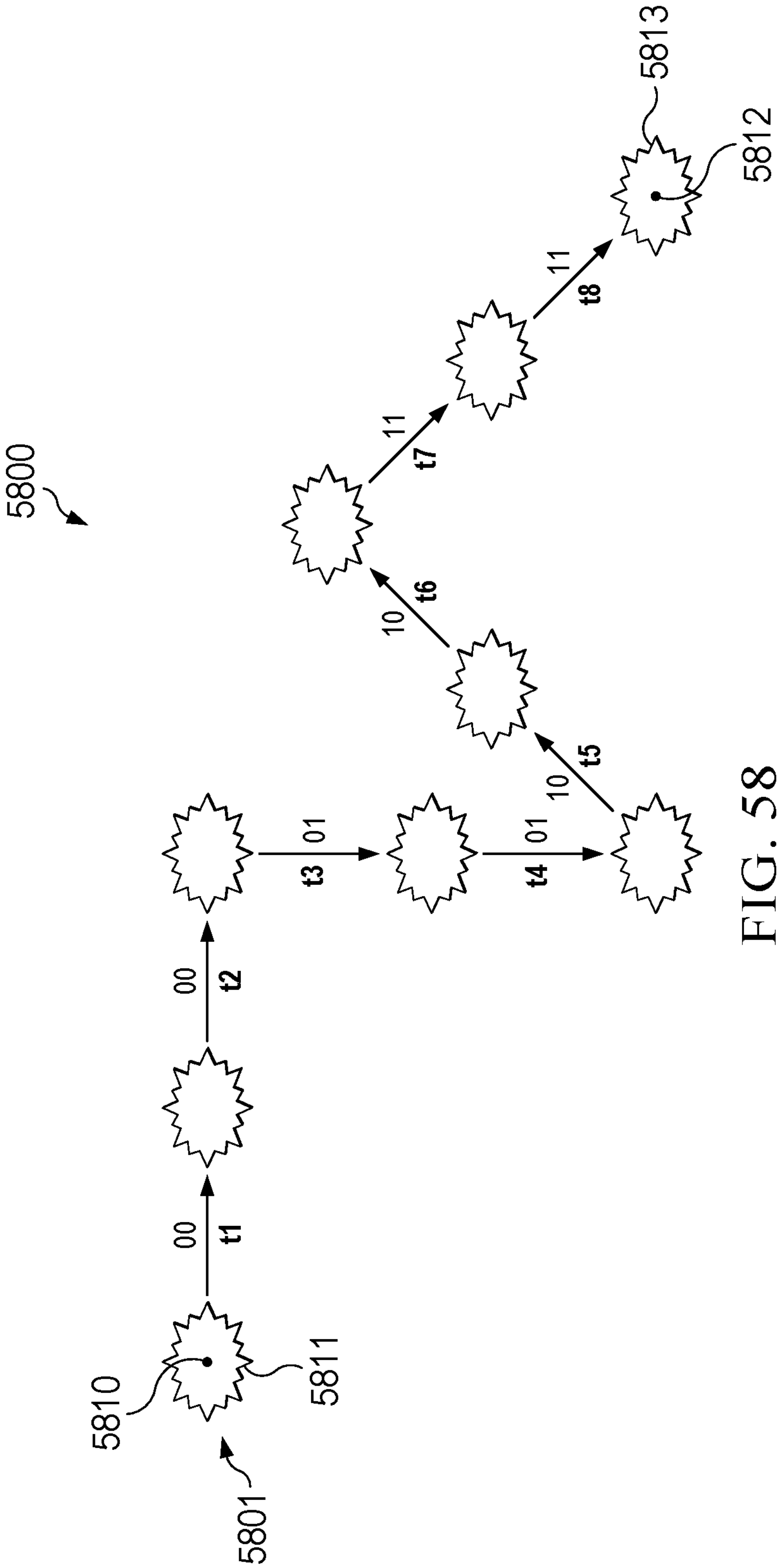
FIG. 58 is an illustration of digital data encoded using linear motions in accordance with an illustrative embodiment.

Turning next to FIG. 58, an illustration of digital data encoded using linear motions is depicted in accordance with an illustrative embodiment. In this illustrative example, horizontal linear motions, vertical linear motions, first diagonal linear motions, and second diagonal linear motions are used to encode data. In this example, the digital data takes the form of a 16-bit string, 0000010110101111, encoded using linear motions 5800 between positions identified by plasma dots resulting from optical breakdowns.

In this illustrative example, the 16-bit string can be encoded in six linear motions. As depicted, a horizonal linear motion in linear motions 5800 is a "00;" a vertical linear motion in linear motions 5800 is a "01;" a first linear motion in linear motions 5800 is a "10;" and a second linear motion in linear motions 5800 is a "11."

As depicted, linear motions 5800 from electromagnetic radiation generated by plasma dots 5801 occur during time periods t1, t2, t3, t4, t5, t6, t7, and t8. In this example, position 5810 for plasma dot 5811 in plasma dots 5801 is the start position from which linear motions 5800 occur. Position 5812 for plasma dot 5813 in plasma dots 5801 is the end position for linear motions 5800.

Horizonal linear motions occur during time periods t1 and t2. Vertical linear motions occur during time periods t3 and t4. First diagonal linear motions occur during time periods t5 and t6, and second diagonal linear motions occur during time periods t7 and t8. The resulting bit string is 0000010110101111.

Figure 59:
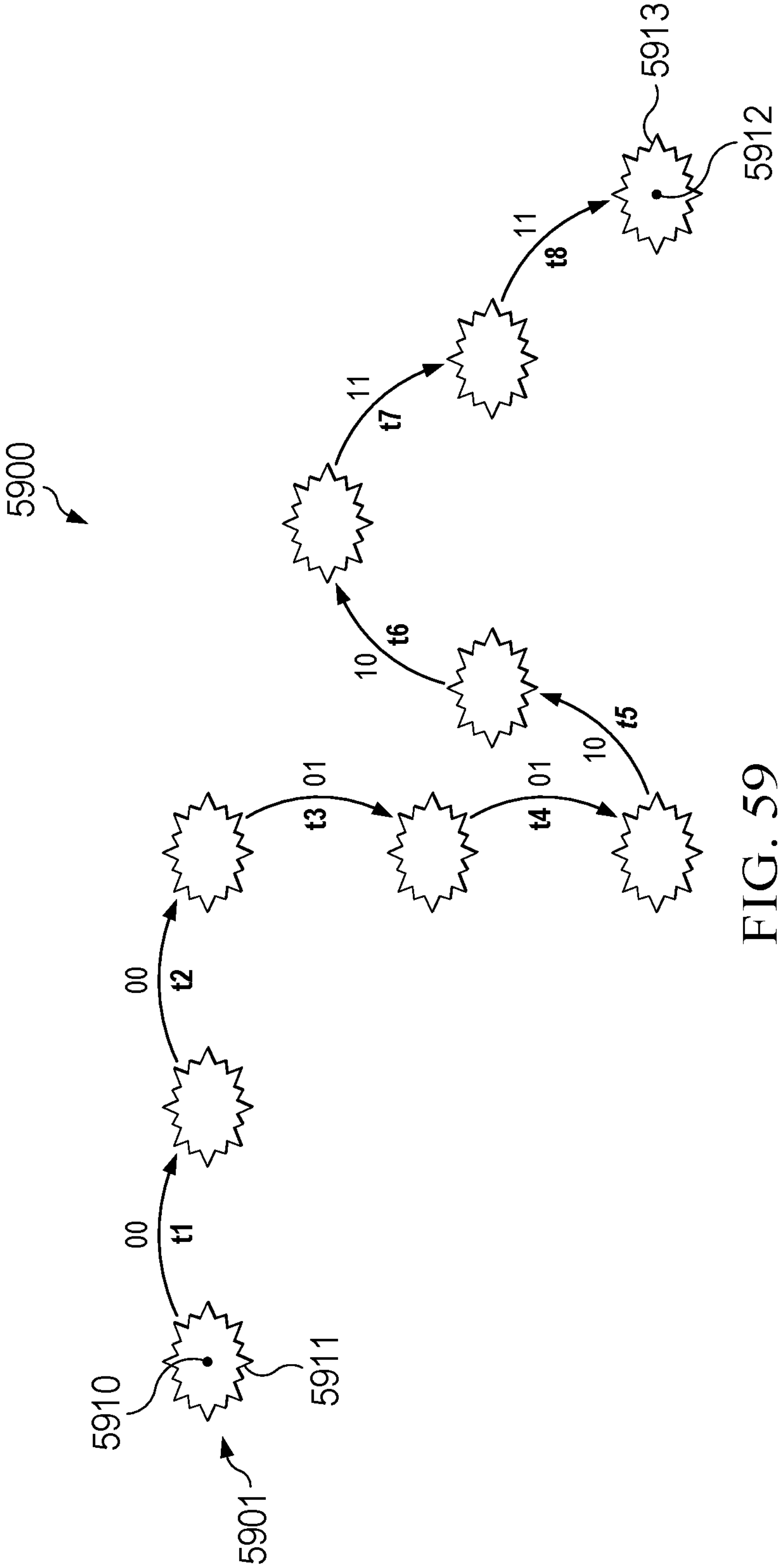
FIG. 59 is an illustration of digital data encoded using curved motions in accordance with an illustrative embodiment.

With reference now to FIG. 59, an illustration of digital data encoded using curved motions is depicted in accordance with an illustrative embodiment. In this illustrative example, horizontal curved motions, vertical curved motions, first diagonal curved motions, and second diagonal curved motions are used to encode data.

In this illustrative example, the presence of curved motions 5900 are identified using intermediate positions between the positions for curved motions 5900. In these examples, one or more intermediate positions are present between the pair of positions for curved motion. These different intermediate positions are not shown in this figure to avoid obscuring illustration of the curved motions in this figure.

In this example, the digital data takes the form of a 16-bit string, 0000010110101111, encoded using curved motions 5900 between positions identified by plasma dots resulting from optical breakdowns. In this illustrative example, the 16-bit string can be encoded in eight curved linear motions. As depicted, a horizonal curved motion in curved motions 5900 is a "00;" a vertical curved motion in curved motions 5900 is a "01;" a first diagonal curved motion in curved motions 5900 is a "10;" and a second curved motion in curved motions 5900 is a "11."

As depicted, curved motions 5900 from electromagnetic radiation generated by plasma dots 5901 occur during time periods t1, t2, t3, t4, t5, t6, t7, and t8. In this example, position 5910 for plasma dot 5911 in plasma dots 5901 is the start position from which curved motions 5900 occur. Position 5912 for plasma dot 5913 in plasma dots 5901 is the end position for curved motions 5900.

Horizonal curved motions occur during time periods t1 and t2. Vertical curved motions occur during time periods t3 and t4. First diagonal curved motions occur during time periods t5 and t6, and second diagonal curved motions occur during time periods t7 and t8. The resulting bit string is 0000010110101111.

Figure 60:
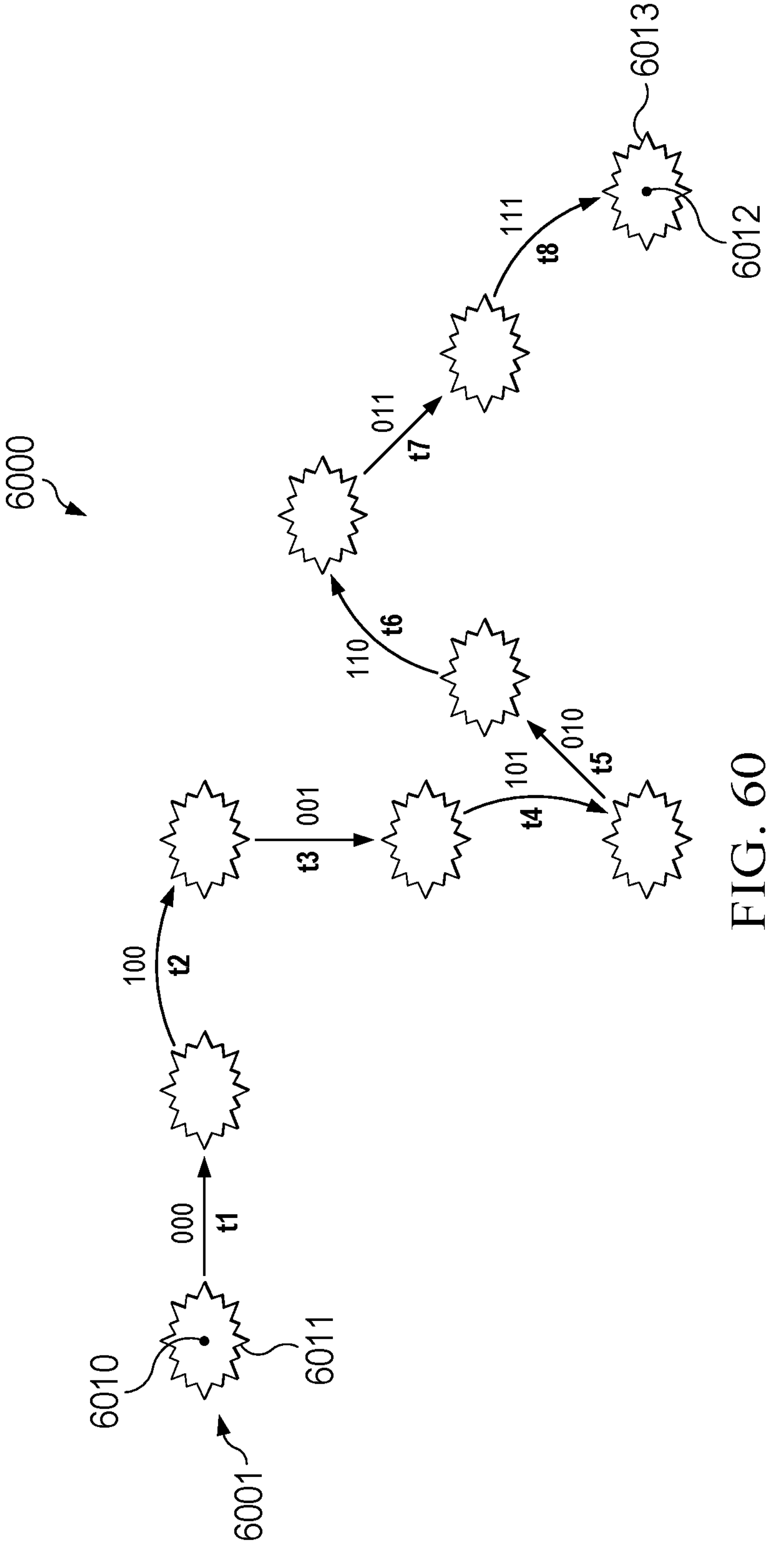
FIG. 60 is an illustration of digital data encoded using linear motions and curved motions in accordance with an illustrative embodiment.

Next with reference to FIG. 60, an illustration of digital data encoded using linear motions and curved motions is depicted in accordance with an illustrative embodiment. As depicted, motions 6000 include both linear and curved motions for encoding digital data.

In this illustrative example, motions 6000 include horizontal linear motions, vertical linear motions, first diagonal linear motions, second diagonal linear motions, horizontal curved motions, vertical curved motions, first diagonal curved motions, and second diagonal curved motions and are used to encode data. The curved motions also include intermediate positions between the positions to identify the curved motions. In these examples, one or more intermediate positions are present between the pair of positions for curved motion. These different intermediate positions are not shown in this figure to avoid obscuring illustration of the curved motions in this figure.

In this example, the digital data takes the form of a 24-bit string, 000100001101010110011111, encoded using motions 6000 between positions identified by plasma dots resulting from optical breakdowns. The encoding of this 24-bit string is performed using eight motions in this illustrative example.

As depicted, a horizonal linear motion is a "000;" a vertical linear motion is a "001;" a first diagonal linear motion is a "010;" and a second diagonal linear motion is a "011." Further in this example, a horizonal curved motion is a "100;" a vertical curved motion is a "101;" a first diagonal curved motion is a "110;" and a second diagonal curved motion is a "111."

As depicted, motions 6000 from electromagnetic radiation generated by plasma dots 6001 occur during time periods t1, t2, t3, t4, t5, t6, t7, and t8. In this example, position 6010 for plasma dot 6011 in plasma dots 6001 is the start position from which motions 6000 occur. Position 6012 for plasma dot 6013 in plasma dots 6001 is the end position for motions 6000.

A horizonal linear motion occurs during time period t1, and horizonal curved motion occurs during time period t2. A vertical horizonal linear motion occurs at time period t3, and a vertical curve motion occurs during time period t4. A first diagonal linear motion occurs during time period t5, and a first diagonal curved motion occurs during time period t6. In this example, a second diagonal linear motion occurs during time period t7, and a second diagonal curved motion occurs during time period t8. The resulting bit string is 000100001101010110011111.

FIGS. 61-64 illustrate combinations of linear and curved motions that can be used to encode digital data. These motions can be used to encode numbers from 0 to 71.

Figure 61:
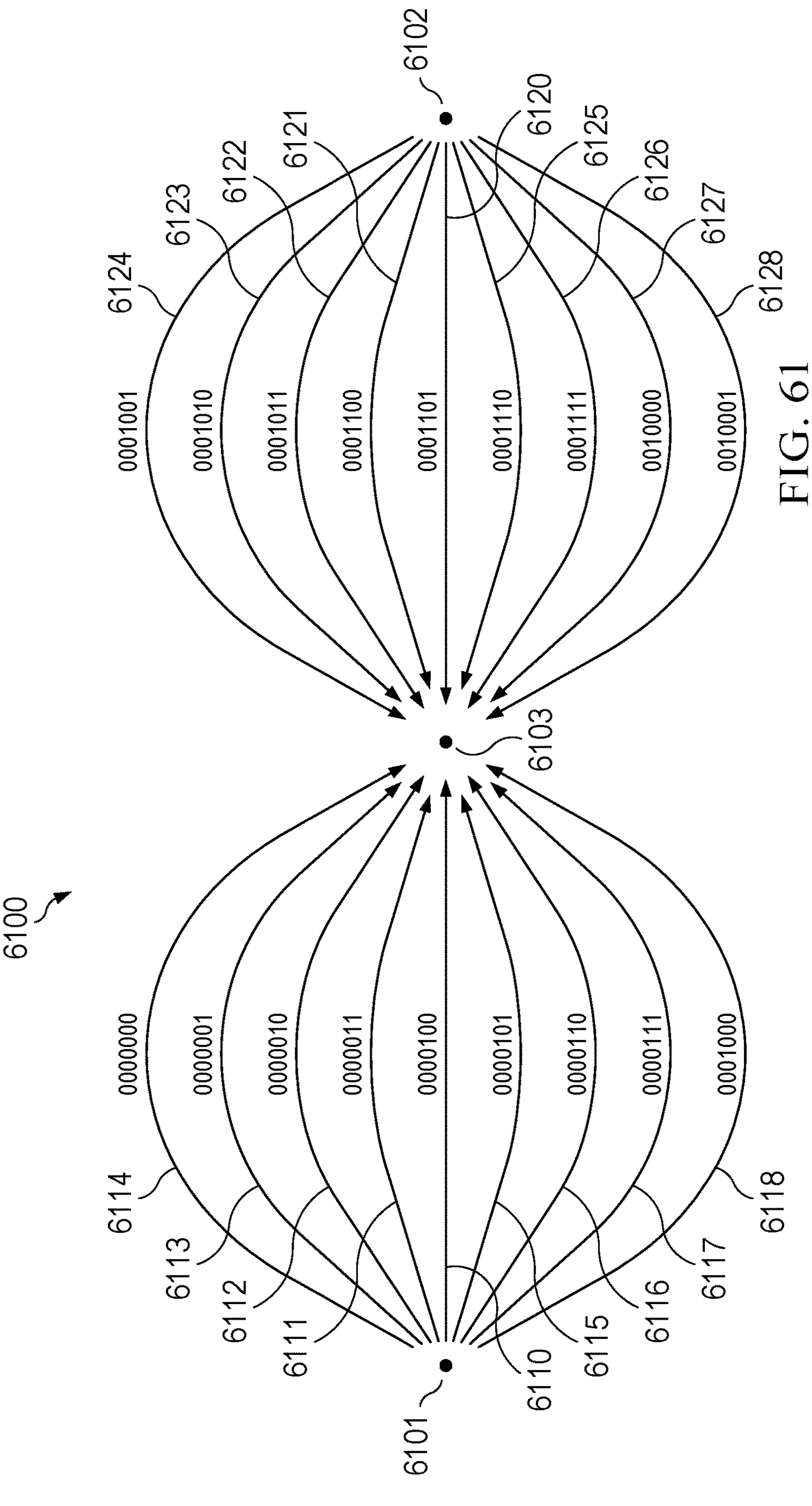
FIG. 61 is an illustration of horizontal linear and curved motions in accordance with an illustrative embodiment.

With reference to FIG. 61, an illustration of linear and curved motions is depicted in accordance with an illustrative embodiment. In this illustrative example, horizontal motions 6100 include horizontal linear motions and horizontal curved motions that represent symbols. Horizontal motions 6100 begin at start position 6101 and at start position 6102. These motions end at end position 6103 in this example. Direction and arc length are also used to represent symbols. In this example, these motions represent symbols in the form of bits for numbers 0-17.

In this example, horizontal motions 6100 includes nine horizontal motions in a direction starting at start position 6101 and ending at end position 6103. The nine horizontal motions in this direction comprises horizontal linear motion 6110 that represents 0000100; horizontal curved motion 6111 that represents 0000011; horizontal curved motion 6112 that represents 0000010; horizontal curved motion 6113 that represents 0000001; horizontal curved motion 6114 that represents 0000000; horizontal curved motion 6115 that represents 0000101; horizontal curved motion 6116 that represents 0000110; horizontal curved motion 6117 that represents 0000111; and horizontal curved motion 6118 that represents 0001000.

Further, horizontal motions 6100 also include nine horizontal motions starting at start position 6102 and ending at end position 6103. These horizontal curved motions comprise horizontal linear motion 6120 that represents 0001101; horizontal curved motion 6121 that represents 0001100; horizontal curved motion 6122 that represents 0001011; horizontal curved motion 6123 that represents 0001010; horizontal curved motion 6124 that represents 0001001; horizontal curved motion 6125 that represents 0001110; horizontal curved motion 6126 that represents 0001111; horizontal curved motion 6127 that represents 0010000; and horizontal curved motion 6128 that represents 0010001. Thus, horizontal motions 6100 encode different symbols based on characteristics that include arc length, starting angle, and ending angle.

Figure 62:
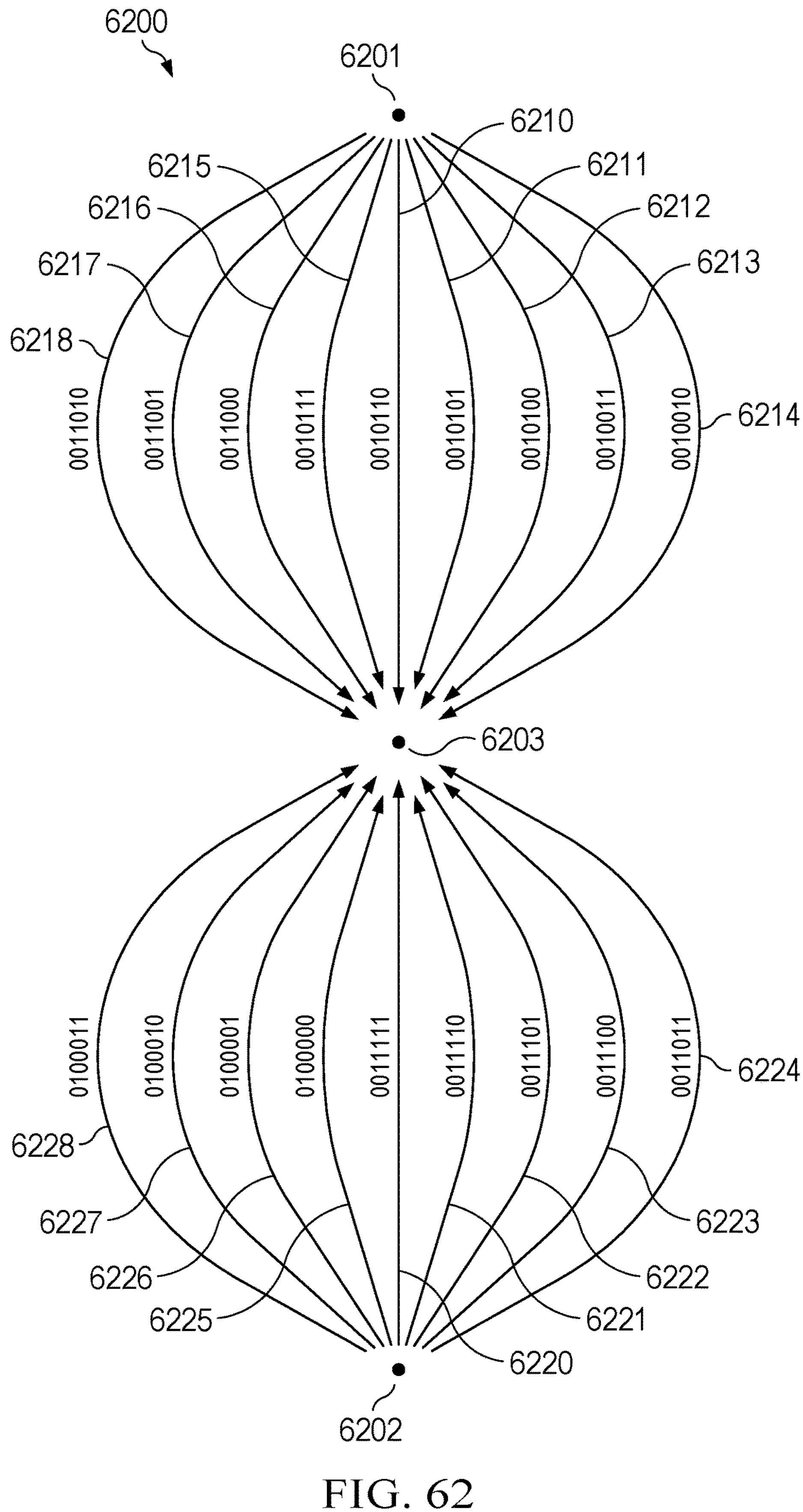
FIG. 62 is an illustration of vertical linear and curved motions in accordance with an illustrative embodiment.

Turning to FIG. 62, an illustration of linear and curved vertical motions is depicted in accordance with an illustrative embodiment. In this illustrative example, vertical motions 6200 include vertical linear motions and vertical curved motions that represent symbols. Vertical motions 6200 begin at start position 6201 and at start position 6202. These motions end at end position 6203 in this example. Direction and arc length are also used to represent symbols. In this depicted example, vertical motions 6200 represent symbols in the form of bits for numbers 18-35.

In this example, vertical motions 6200 includes nine vertical motions in a direction starting at start position 6201 and ending at end position 6203. The nine vertical motions in this direction comprises vertical linear motion 6210 that represents 0010110; vertical curved motion 6211 that represents 0010101; vertical curved motion 6212 that represents 0010100; vertical curved motion 6213 that represents 0010011; vertical curved motion 6214 that represents 0010010; vertical curved motion 6215 that represents 0010111; vertical curved motion 6216 that represents 0011000; vertical curved motion 6217 that represents 0011001; and vertical curved motion 6218 that represents 0011010.

Further, vertical motions 6200 also include nine vertical motions starting at start position 6202 and ending at end position 6203. These vertical curved motions comprises vertical linear motion 6220 that represents 0011111; vertical curved motion 6221 that represents 0011110; vertical curved motion 6222 that represents 0011101; vertical curved motion 6223 that represents 0011100; vertical curved motion 6224 that represents 0011011; vertical curved motion 6225 that represents 0100000; vertical curved motion 6226 that represents 0100001; vertical curved motion 6227 that represents 0100010; and vertical curved motion 6228 that represents 0100011. In this example, vertical motions 6200 encode different symbols based on characteristics that include arc length, starting angle, and ending angle.

Figure 63:
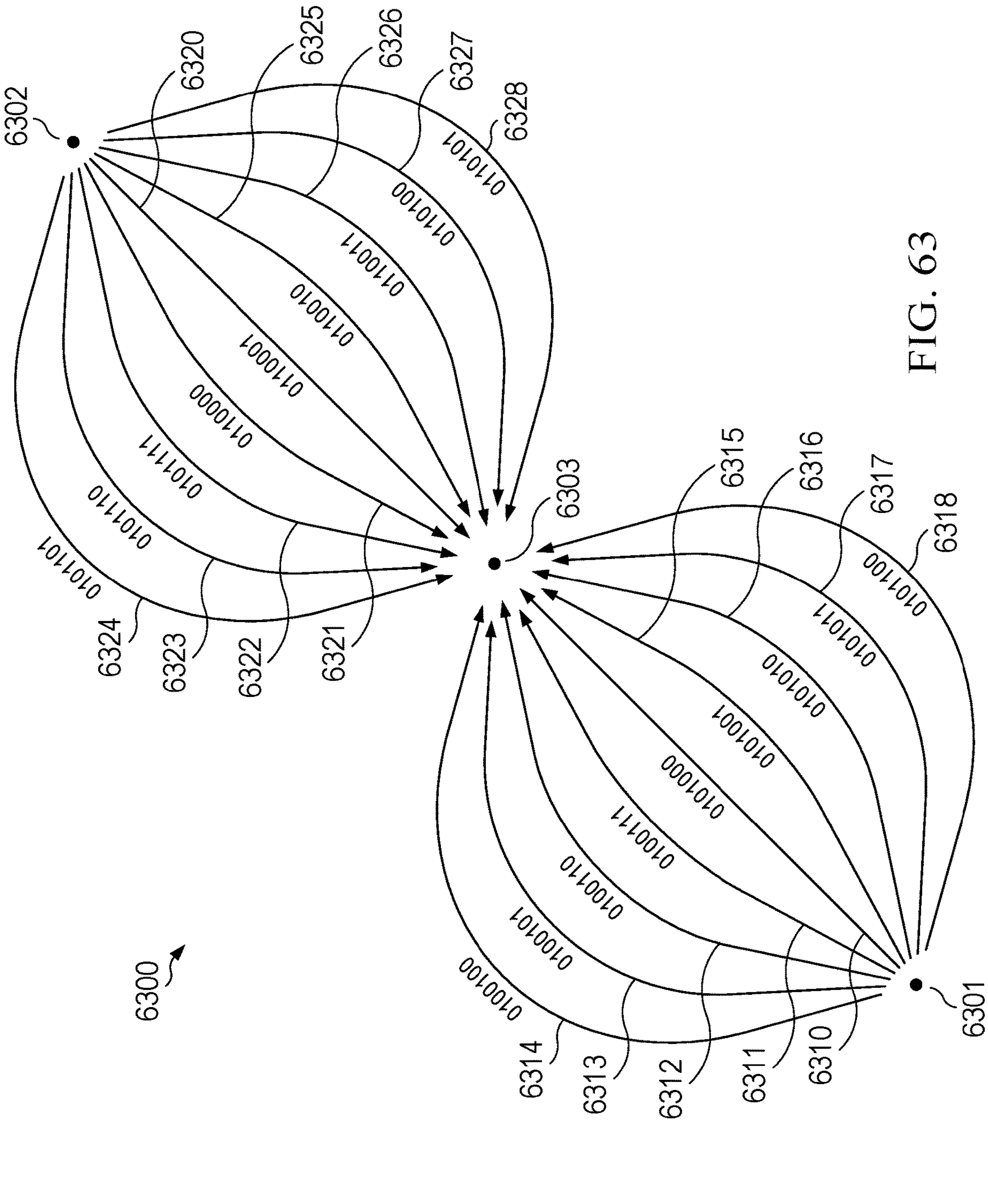
FIG. 63 is an illustration of first linear and curved diagonal motions in accordance with an illustrative embodiment.

In FIG. 63, an illustration of first linear and curved diagonal motions is depicted in accordance with an illustrative embodiment. In this illustrative example, first diagonal motions 6300 include first diagonal linear motions and first diagonal curved motions that represent symbols. First diagonal motions 6300 begin at start position 6301 and at start position 6302. These first diagonal motions end at end position 6303 in this example. Direction and arc length are also used to represent symbols. In this example, first diagonal motions 6300 represent symbols in the form of bits for numbers 36-53.

In this example, first diagonal motions 6300 includes nine first diagonal motions in a direction starting at start position 6301 and ending at end position 6303. The nine ascending diagonal motions in this direction comprises first diagonal linear motion 6310 that represents 0101000; first diagonal curved motion 6311 that represents 0100111; first diagonal curved motion 6312 that represents 0100110; first diagonal curved motion 6313 that represents 0100101; first diagonal curved motion 6314 that represents 0100100; first diagonal curved motion 6315 that represents 0101001; first diagonal curved motion 6316 that represents 0101010; first diagonal curved motion 6317 that represents 0101011; and first diagonal curved motion 6318 that represents 0101100.

Further, first diagonal motions 6300 also includes nine first diagonal motions starting at start position 6302 and ending at end position 6303. In this example, the first diagonal curved motions comprises first diagonal linear motion 6320 that represents 0110001; first diagonal curved motion 6321 that represents 0110000; first diagonal curved motion 6322 that represents 0101111; first diagonal curved motion 6323 that represents 0101110; first diagonal curved motion 6324 that represents 0101101; first diagonal curved motion 6325 that represents 0110010; first diagonal curved motion 6326 that represents 0110011; first diagonal curved motion 6327 that represents 0110100; and first diagonal curved motion 6328 that represents 0110101.

Thus, first diagonal motions 6300 encode different symbols based on characteristics that include arc length, starting angle, and ending angle. Different diagonal curved motions can have different starting angles.

Figure 64:
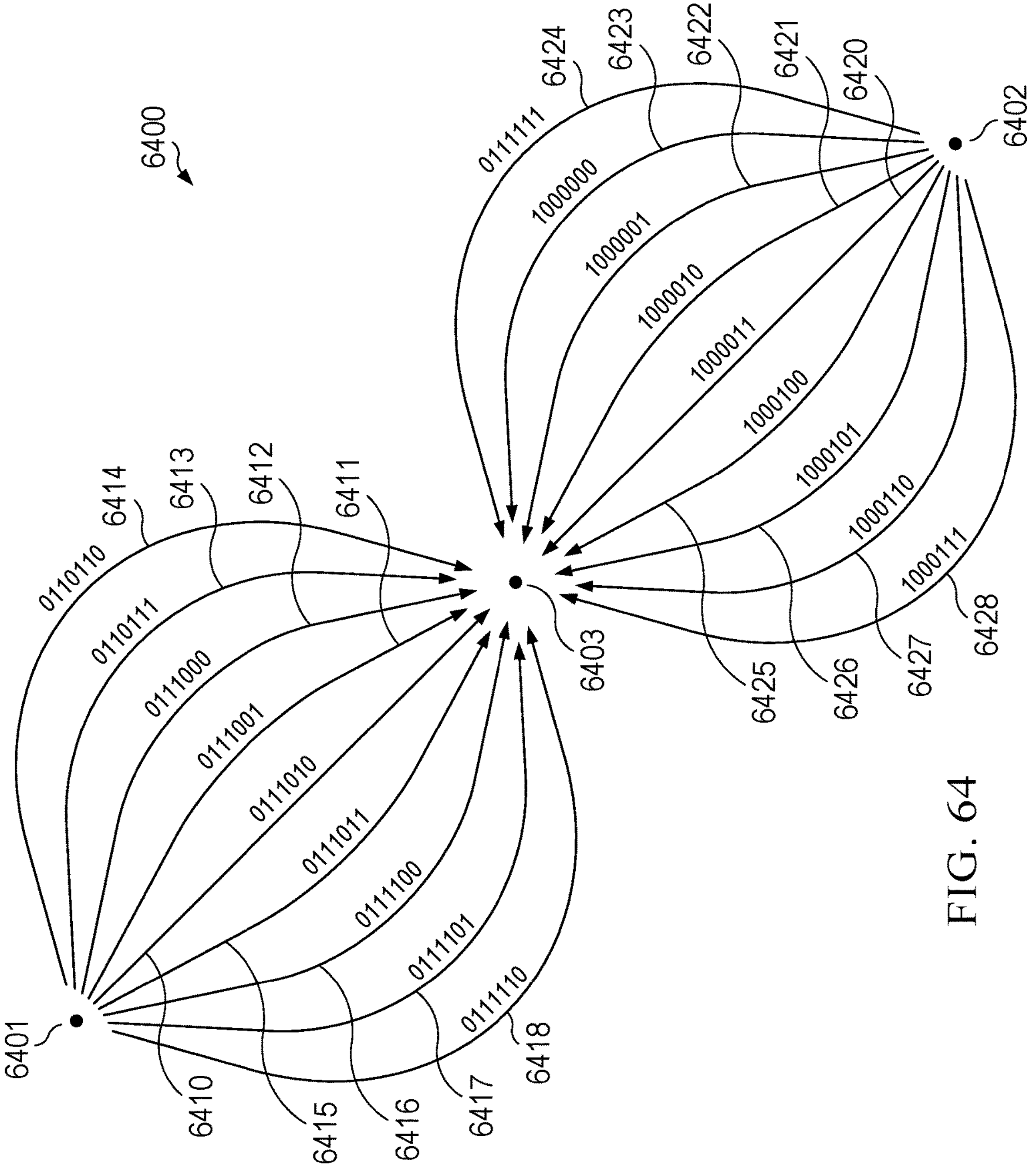
FIG. 64 is an illustration of second diagonal motions in accordance with an illustrative embodiment.

Next in FIG. 64, an illustration of second diagonal motions is depicted in accordance with an illustrative embodiment. In this illustrative example, second diagonal motions 6400 include second diagonal linear motions and second diagonal curved motions that represent symbols. Second diagonal motions 6400 begin at start position 6401 and at start position 6402. These diagonal motions end at end position 6403 in this example. Direction and arc length are also used to represent symbols. In this illustrative example, second diagonal motions 6400 represent symbols in the form of bits for numbers 54-71.

In this example, second diagonal motions 6400 includes nine second diagonal motions that move in a direction starting at start position 6401 and ending at end position 6403.

The nine second diagonal motions in this direction comprises second diagonal linear motion 6410 that represents 0111010; second diagonal curved motion 6411 that represents 0111001; second diagonal curved motion 6412 that represents 0111000; second diagonal curved motion 6413 that represents 0110111; second diagonal curved motion 6414 that represents 0110110; second diagonal curved motion 6415 that represents 0111011; second diagonal curved motion 6416 that represents 0111100; second diagonal curved motion 6417 that represents 0111101; and second diagonal curved motion 6418 that represents 0111110.

Further, second diagonal motions 6400 also include nine second diagonal motions starting at start position 6402 and ending at end position 6403.

These second diagonal motions comprises second diagonal linear motion 6420 that represents 1000011; second diagonal curved motion 6421 that represents 1000010; second diagonal curved motion 6422 that represents 1000001; second diagonal curved motion 6423 that represents 1000000; second diagonal curved motion 6424 that represents 0111111; second diagonal curved motion 6425 that represents 1000100; second diagonal curved motion 6426 that represents 1000101; second diagonal curved motion 6427 that represents 1000110; and second diagonal curved motion 6428 that represents 1000111. Thus, second diagonal motions 6400 encode different symbols based on characteristics that include arc length, starting angle, and ending angle. The starting or ending angle of each diagonal motion can be used to determine the symbol represented by the diagonal motion.

Illustration of motions in FIGS. 52-64 have been presented as examples of implementations for motions 5017 in FIG. 50 and FIG. 51. These examples are meant to limit the manner in which other motions can be implemented. For example, other combinations or numbers of motions can be used to represent symbols. For example, linear motions can be omitted in examples using both linear and curved motions. As another example, FIGS. 61-64 use 16 curved motions and 2 linear motions. In other illustrative examples, a curved motion, 24 curved motions, or other numbers of first motions can be used in place of the 16 curved motions. The representation of symbols using curved and linear motions may not include direction.

Figure 65:
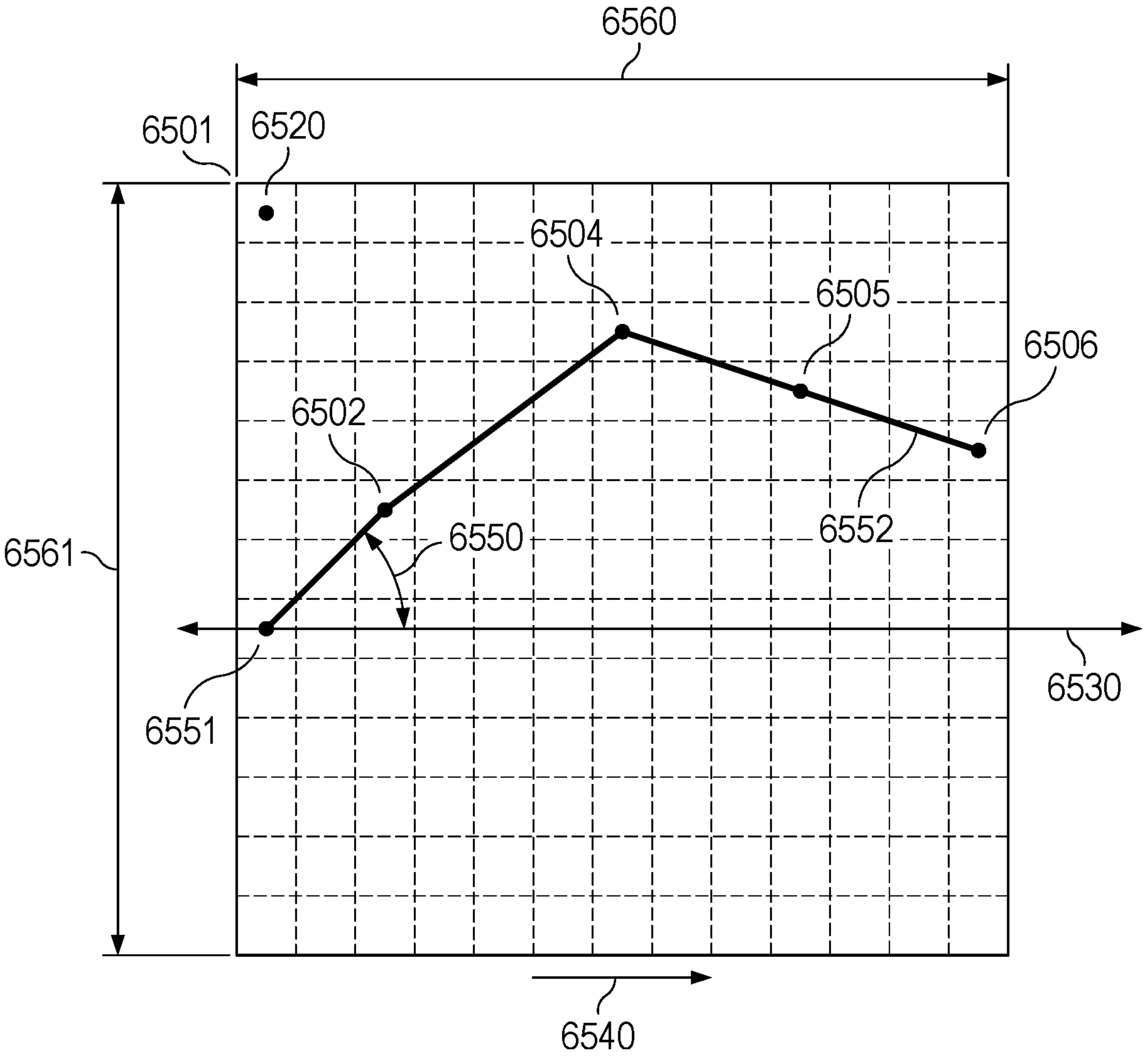
FIG. 65 is an illustration of a position grid for determining motion in accordance with an illustrative embodiment.

With reference next to FIG. 65, an illustration of a position grid for determining motion is depicted in accordance with an illustrative embodiment. In this illustrative example, position grid 6501 is defined in space where optical breakdowns occur to generate plasma dots for communicating digital information. In this example, position grid 6501 is a Cartesian coordinate grid having columns 6560 and rows 6561. Position grid 6501 can be used to determine characteristics of a motion for use in identifying the symbol represented by the motion.

As depicted, position grid 6501 is used to track plasma dots to determine motion such as linear motion and curves. The position of the grid can be determined based on using reference plasma dot 6551, which identifies a corner of position grid 6501.

In this example, plasma dot 6551 is a start position and is the first plasma dot generated. Plasma dot 6502, plasma dot 6504, plasma dot 6505 are intermediate plasma dots with plasma dot 6506 being the ending plasma dot. These plasma dots can be used to identify at least one of a direction, starting angle, and ending angle for a curved motion 6552.

In this example, the motion is curved motion 6552 which is in left-to-right direction 6540 based on the progression of plasma dots from plasma dot 6551 to plasma dot 6506. Starting angle 6550 is determined using the position of plasma dot 6551 and plasma dot 6502 relative to reference line 6530 within position grid 6501.

The use of position grid 6501 is an example of one manner in which motions can be identified. For example, position grid 6501 can be used to determine whether a direct motion is ascending or descending as well as the direction of a direct motion. These characteristics can then be used to determine symbols for the different motions. In other examples, other types of grids or positioning mechanisms can be used. In this example, position grid 6501 is based on Cartesian coordinates. In other examples, a position grid can be implemented using polar coordinates. In this example, position grid 6501 is shown as a two-dimensional grid. In other illustrative examples, a three-dimensional grid can be used.

Figure 66:
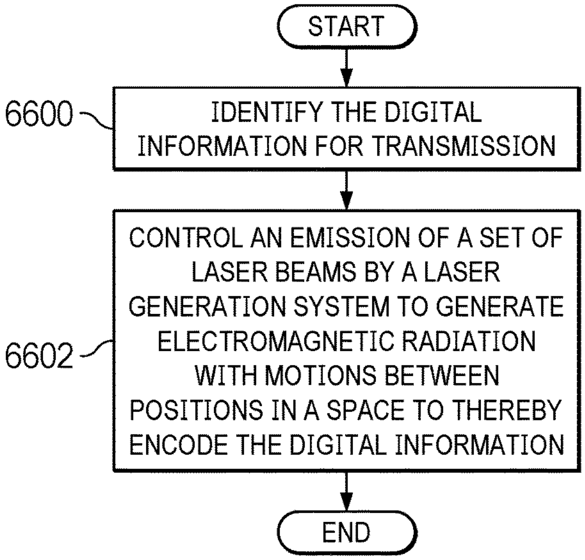
FIG. 66 is an illustration of a flowchart of a process for communicating digital information in accordance with an illustrative embodiment.

Turning next to FIG. 66, an illustration of a flowchart of a process for communicating digital information is depicted in accordance with an illustrative embodiment. The process in FIG. 66 can be implemented in hardware, software, or both. When implemented in software, the process can take the form of program instructions that are run by one of more processor units located in one or more hardware devices in one or more computer systems. For example, the process can be implemented in communications manager 5014 in computer system 5012 for communication system 5000 in FIG. 50.

The process begins by identifying the digital information for transmission (operation 6600). The process controls an emission of a set of laser beams by a laser generation system to generate electromagnetic radiation with motions between positions in a space to thereby encode the digital information (operation 6602). The process terminates thereafter.

Figure 67:
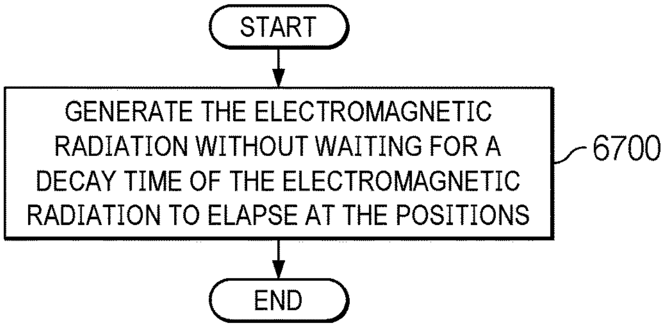
FIG. 67 is an illustration of a flowchart of a process for controlling the emission of a set of laser beams in accordance with an illustrative embodiment.

Next in FIG. 67, an illustration of a flowchart of a process for controlling the emission of a set of laser beams is depicted in accordance with an illustrative embodiment. The process in this flowchart is an example of an implementation for operation 6602 in FIG. 66.

The process generates the electromagnetic radiation without waiting for a decay time of the electromagnetic radiation to elapse at the positions (operation 6700). The process terminates thereafter.

Figure 68:
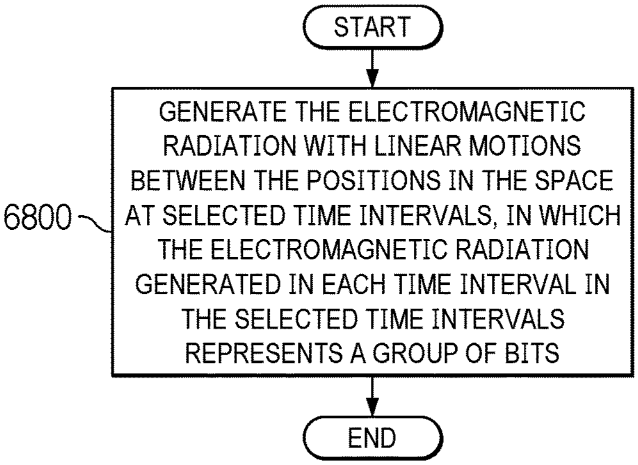
FIG. 68 is an illustration of a flowchart of a process for controlling the emission of a set of laser beams in accordance with an illustrative embodiment.

With reference to FIG. 68, an illustration of a flowchart of a process for controlling the emission of a set of laser beams is depicted in accordance with an illustrative embodiment. The process in this flowchart is an example of an implementation for operation 6602 in FIG. 66.

The process generates the electromagnetic radiation with linear motions between the positions in the space at selected time intervals, in which the electromagnetic radiation generated in each time interval in the selected time intervals represents a group of bits (operation 6800). The process terminates thereafter.

Figure 69:
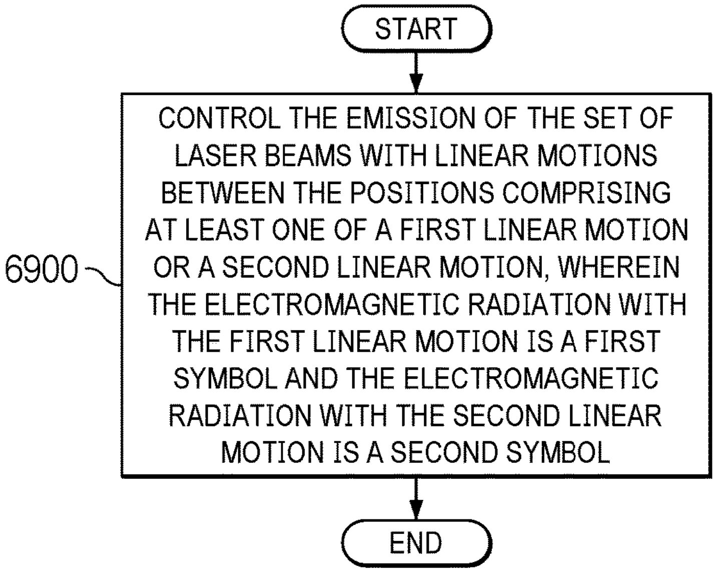
FIG. 69 is an illustration of a flowchart of a process for controlling the emission of a set of laser beams in accordance with an illustrative embodiment.

Turning now to FIG. 69, an illustration of a flowchart of a process for controlling the emission of a set of laser beams is depicted in accordance with an illustrative embodiment. The process in this flowchart is an example of an implementation for operation 6602 in FIG. 66.

The process controls the emission of the set of laser beams with linear motions between the positions comprising at least one of a first linear motion or a second linear motion, wherein the electromagnetic radiation with the first linear motion is a first symbol and the electromagnetic radiation with the second linear motion is a second symbol (operation 6900). The process terminates thereafter.

In operation 6900, the first linear motion can be a horizontal motion and the second linear motion can be a vertical linear motion. In another example, the first linear motion can be a first diagonal linear motion and the second linear motion can be a second diagonal linear motion.

Figure 70:
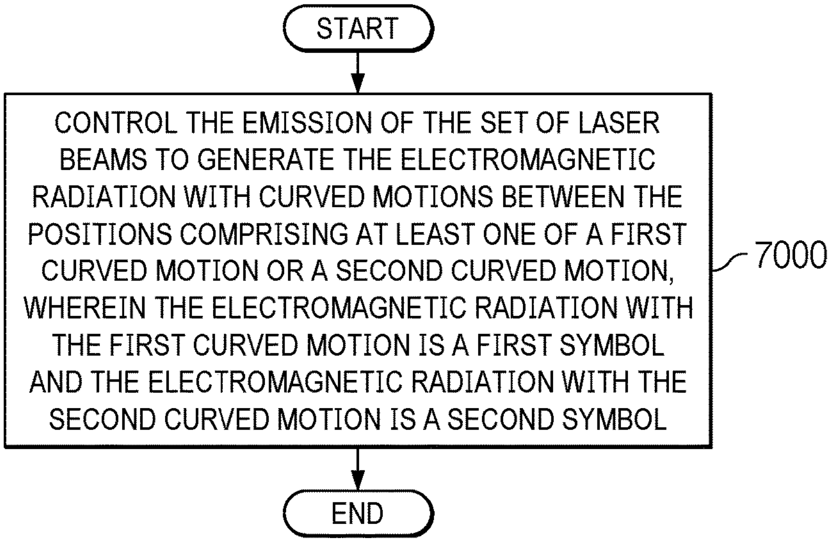
FIG. 70 is an illustration of a flowchart of a process for controlling the emission of a set of laser beams in accordance with an illustrative embodiment.

With reference to FIG. 70, an illustration of a flowchart of a process for controlling the emission of a set of laser beams is depicted in accordance with an illustrative embodiment. The process in this flowchart is an example of an implementation for operation 6602 in FIG. 66.

The process controls the emission of the set of laser beams to generate the electromagnetic radiation with curved motions between the positions comprising at least one of a first curved motion or a second curved motion, wherein the electromagnetic radiation with the first curved motion is a first symbol and the electromagnetic radiation with the second curved motion is a second symbol (operation 7000). The process terminates thereafter.

In operation 7000, the first curved motion can be a horizontal curved motion and the second curved motion can be vertical curved motion. In another example, the first curved motion can be a first diagonal curved motion and the second curved motion can be a second diagonal curved motion.

Figure 71:
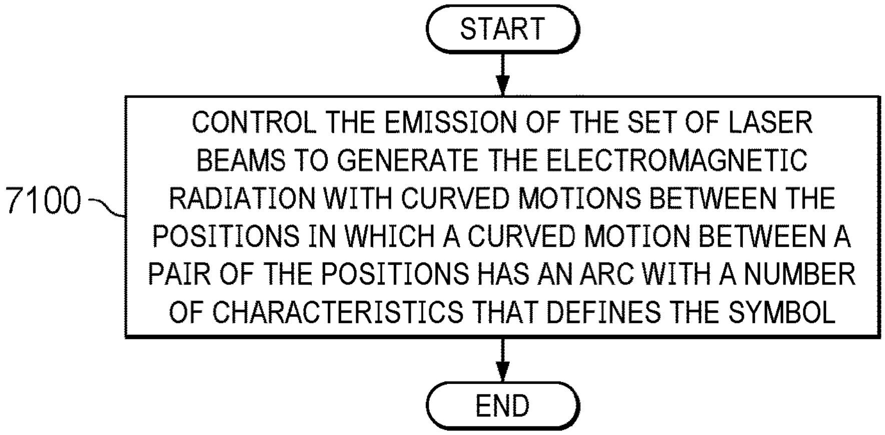
FIG. 71 is an illustration of a flowchart of a process for controlling the emission of a set of laser beams in accordance with an illustrative embodiment.

Turning next to FIG. 71, an illustration of a flowchart of a process for controlling the emission of a set of laser beams is depicted in accordance with an illustrative embodiment. The process in this flowchart is an example of an implementation for operation 6602 in FIG. 66.

The process controls the emission of the set of laser beams to generate the electromagnetic radiation with curved motions between the positions in which a curved motion between a pair of the positions has an arc with a number of characteristics that defines the symbol (operation 7100). The process terminates thereafter. In operation 7100, the number of characteristics for the arc comprises at least one of a direction, a starting angle, an ending angle, an arc length, or other suitable characteristics that can be used to define symbols.

Figure 72:
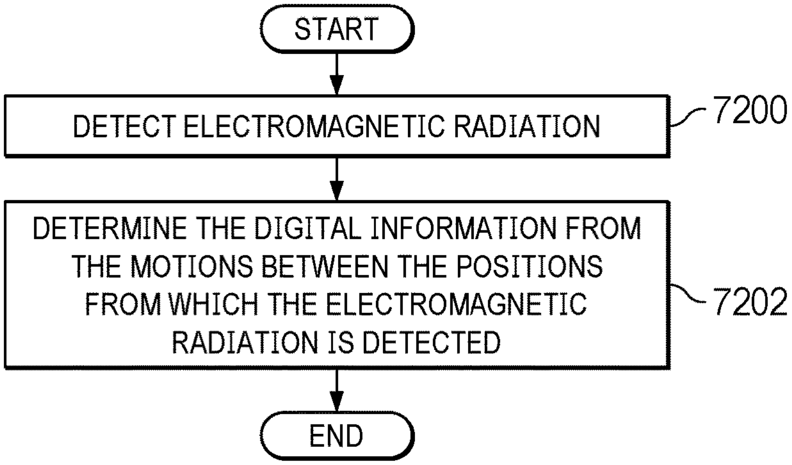
FIG. 72 is an illustration of a flowchart of a process for receiving digital information in accordance with an illustrative embodiment.

Next in FIG. 72, an illustration of a flowchart of a process for receiving digital information is depicted in accordance with an illustrative embodiment. The process in this flowchart can be implemented using receiver 5091 in FIG. 50.

The process begins by detecting electromagnetic radiation (operation 7100). The process determines the digital information from the motions between the positions from which the electromagnetic radiation is detected (operation 7102). The process terminates thereafter. In this example, the digital information can take the form of a symbol such as this or other types of symbols encoded using the electromagnetic radiation.

Position and Motion Modulation

Figure 73:
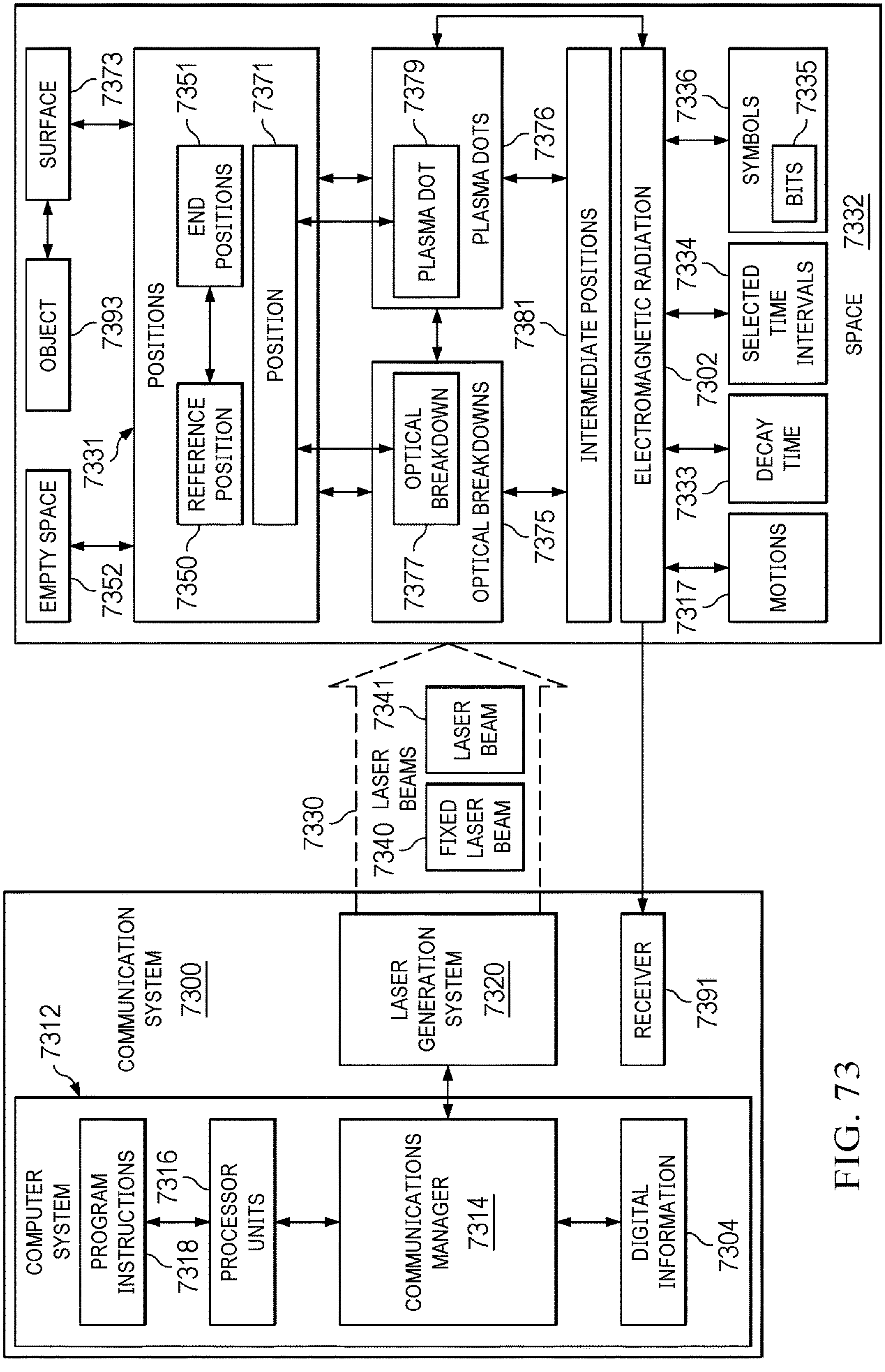
FIG. 73 is an illustration of a block diagram of a communication system in accordance with an illustrative embodiment.

With reference next to FIG. 73, an illustration of a block diagram of a communication system is depicted in accordance with an illustrative embodiment. In this illustrative example, communication system 7300 operates to generate electromagnetic radiation 7302 in a manner that encodes digital information 7304. In this illustrative example, positions 7331 of electromagnetic radiation 7302 are selected to encode digital information 7304. Electromagnetic radiation 7302 can be selected from at least one of a visible light, an ultraviolet light, an infrared light, radio frequencies, x-rays, or other types of electromagnetic radiation 7302.

In this illustrative example, communication system 7300 comprises laser generation system 7320, computer system 7312, and communications manager 7314. As depicted, communications manager 7314 is located in computer system 7312.

In this illustrative example, laser generation system 7320 can be implemented using laser generation systems as depicted in FIGS. 2-7 as well as other suitable laser generation systems. In this illustrative example, laser generation system 7320 emits a set of laser beams 7330. Laser generation system 7320 can emit a set of laser beams 7330 as fixed laser beam 7340 at each position in positions 7331 to generate electromagnetic radiation 7302. In another example, laser generation system 7320 can move laser beam 7341 in the set of laser beams 7330 from position to position in positions 7331 to generate electromagnetic radiation 7302 in positions 7331 with motions 7317.

These positions in positions 7331 can take a number of different forms. For example, positions 7331 can be on surface 7373 of object 7393 in space 7332. Object 7393 can take a number of different forms. For example, object 7393 can be a satellite, an aircraft, a building, a wall, or some other suitable object.

In another example, space 7332 can be empty space 7352. Empty space 7352 can be, for example, in the atmosphere, a vacuum, outer space, or some other location.

In this example, communications manager 7314 is configured to control the operation of laser generation system 7320. Communications manager 7314 can be implemented in software, hardware, firmware, or a combination thereof. When software is used, the operations performed by communications manager 7314 can be implemented in program instructions configured to run on hardware, such as a processor unit. When firmware is used, the operations performed by communications manager 7314 can be implemented in program instructions and data can be stored in persistent memory to run on a processor unit. When hardware is employed, the hardware can include circuits that operate to perform the operations in communications manager 7314.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, computer system 7312 is a physical hardware system and includes one or more data processing systems. When more than one data processing system is present in computer system 7312, those data processing systems are in communication with each other using a communications medium. The communications medium can be a network. The data processing systems can be selected from at least one of a computer, a server computer, a tablet computer, or some other suitable data processing system.

As depicted, computer system 7312 includes a number of processor units 7316 that are capable of executing program instructions 7318 implementing processes in the illustrative examples. In other words, program instructions 7318 are computer-readable program instructions.

As used herein, a processor unit in the number of processor units 7316 is a hardware device and is comprised of hardware circuits such as those on an integrated circuit that respond to and process instructions and program code that operate a computer. When the number of processor units 7316 executes program instructions 7318 for a process, the number of processor units 7316 can be one or more processor units that are in the same computer or in different computers. In other words, the process can be distributed between the number of processor units 7316 on the same or different computers in computer system 7312.

Further, the number of processor units 7316 can include the same type or different types of processor units. For example, the number of processor units 7316 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, the number of processor units 7316 can also include other components in addition to the processor units or processing circuitry. For example, the number of processor units 7316 can also include a cache or other components used with processor units or other processing circuitry.

In this illustrative example, communications manager 7314 is configured to perform a number of different operations in communicating digital information 7304. For example, communications manager 7314 can identify digital information 7304 for transmission. Communications manager 7314 can control an emission of the set of laser beams 7330 by laser generation system 7320 to generate electromagnetic radiation 7302 and control an emission of the set of laser beams 7330 by the laser generation system 7320 to generate electromagnetic radiation 7302 at positions 7331 in space 7332 with motions 7317 between positions 7331, with positions 7331 and motions 7317 between position 7331 thereby encoding digital information 7304.

In this example, motions 7317 between positions 7331 means that electromagnetic radiation 7302 can be generated at a first position.

In the illustrative example, electromagnetic radiation 7302 is energy that propagates through space 7332 in the form of electric fields and magnetic fields. Electromagnetic radiation 7302 can be within a spectrum of wavelengths or frequencies.

For example, optical breakdown 7377 at position 7371 in positions 7331 can result in plasma dot 7379 in plasma dots 7376 at position 7371. Plasma dots 7376 are electromagnetic radiation 7302 generated by optical breakdowns 7375. Thus, a number of optical breakdowns 7375 at positions 7331 in space 7332 generated by the set of laser beams 7330 results in a number of plasma dots 7376 at positions 7331 in space 7332.

Further in this illustrative example, communications manager 7314 can move the set of laser beams 7330 to generate the electromagnetic radiation 7302 at a number of intermediate positions 7381 while moving the set of laser beams 7330 from one position to another position in positions 7331. Thus, in these illustrative examples, motions 7317 between positions 7331 can be indicated by optical breakdowns 7375 resulting in plasma dots 7376 in intermediate positions 7381 between positions 7331.

In other words, optical breakdowns 7375 at intermediate positions 7381 resulting in plasma dots 7376 at intermediate positions 7381 can be present between positions 7331 to indicate motions 7317 of electromagnetic radiation 7302 between positions 7331.

In these examples, electromagnetic radiation 7302 from plasma dots 7376 can be at least one of a visible light, an ultraviolet light, an infrared light, radio frequencies, or x-rays. For example, plasma dots 7376 can generate radio frequency signals such as electromagnetic radiation 7302. As another example, plasma dots 7376 can include visible light in electromagnetic radiation 7302. These and other types of electromagnetic radiation 7302 generated by plasma dots 7376 can be detected at positions 7331 and at intermediate positions 7381.

Further in this example, communications manager 7314 can generate electromagnetic radiation 7302 without waiting for decay time 7333 of electromagnetic radiation 7302 to elapse at positions 7331. Further communications manager 7314 can generate electromagnetic radiation without waiting for decay time 7333 to elapse in intermediate positions 7381. For example, electromagnetic radiation 7302 can be generated in a first position. Electromagnetic radiation 7302 can also be generated at an intermediate position and in a second position prior to the electromagnetic radiation 7302 in the first position being reduced to some lower level or disappearing. In this example, the reduction is a decrease in a number of characteristics for electromagnetic radiation 7302 that can be selected from at least one of intensity, amplitude, or some other characteristics of electromagnetic radiation 7302. This level can be for electromagnetic radiation 7302 to completely dissipate at the first position or reach some other level.

Further, as part of controlling the emissions of the set of laser beams 7330, communications manager 7314 can generate electromagnetic radiation 7302 at positions in space 7332 at selected time intervals 7334. With this example, electromagnetic radiation 7302 generated in each time interval in selected time intervals 7334 with positions 7331 and motions 7317 at positions 7331 in space 7332 represents a group of symbols 7336 in digital information 7304. In one example, the group of symbols can be a group of bits 7335 in which each symbol in symbols 7336 can be one or more of bits 7335.

In this illustrative example, as part of controlling the emission of the set of laser beams 7330, communications manager 7314 can control the emission of the set of laser beams 7330 by laser generation system 7320 to generate electromagnetic radiation 7302 at reference position 7350 in positions 7331 and end positions 7351 in positions 7331 with motions 7317 from reference position 7350 to end positions 7351. These positions and motions thereby encode the digital information 7304.

In another illustrative example, communications manager 7314 can control the emission of the set of laser beams 7330 by the laser generation system 7320 to generate electromagnetic radiation 7302 at end positions 7351 in the positions 7331 relative to reference position 7350 in positions 7331, with end positions 7351 and motions 7317 between the end positions 7351 thereby encoding the digital information 7304. In yet another example, communications manager 7314 can control the emission of the set of laser beams 7330 by the laser generation system 7320 to generate electromagnetic radiation 7302 between a first position and a second position in positions 7331. Electromagnetic radiation 7302 at the first position and electromagnetic radiation 7302 at the second position relative to reference position 7350 in positions 7331 represents a symbol in symbols 7336.

The symbol can be selected from a group consisting of a letter, a number, and an instruction. The symbol can be information in a semaphore alphabet.

In this illustrative example, communication system 7300 can also include receiver 7391. Receiver 7391 is a hardware system and can include software. Receiver 7391 can take a number of forms. For example, receiver 7391 can be at least one of a camera, a radio receiver, or other suitable types of receivers.

In this example, receiver 7391 can detect electromagnetic radiation 7302. Receiver 7391 can determine digital information 7304 from at least one of positions 7331 or motions 7317. In other words, positions 7331, motions 7317, or both positions 7331 and motions 7317 between positions 7331 can be used to determine digital information 7304. In these examples, this digital information can be a group of symbols 7336, such as a group of bits 7335.

Figure 74:
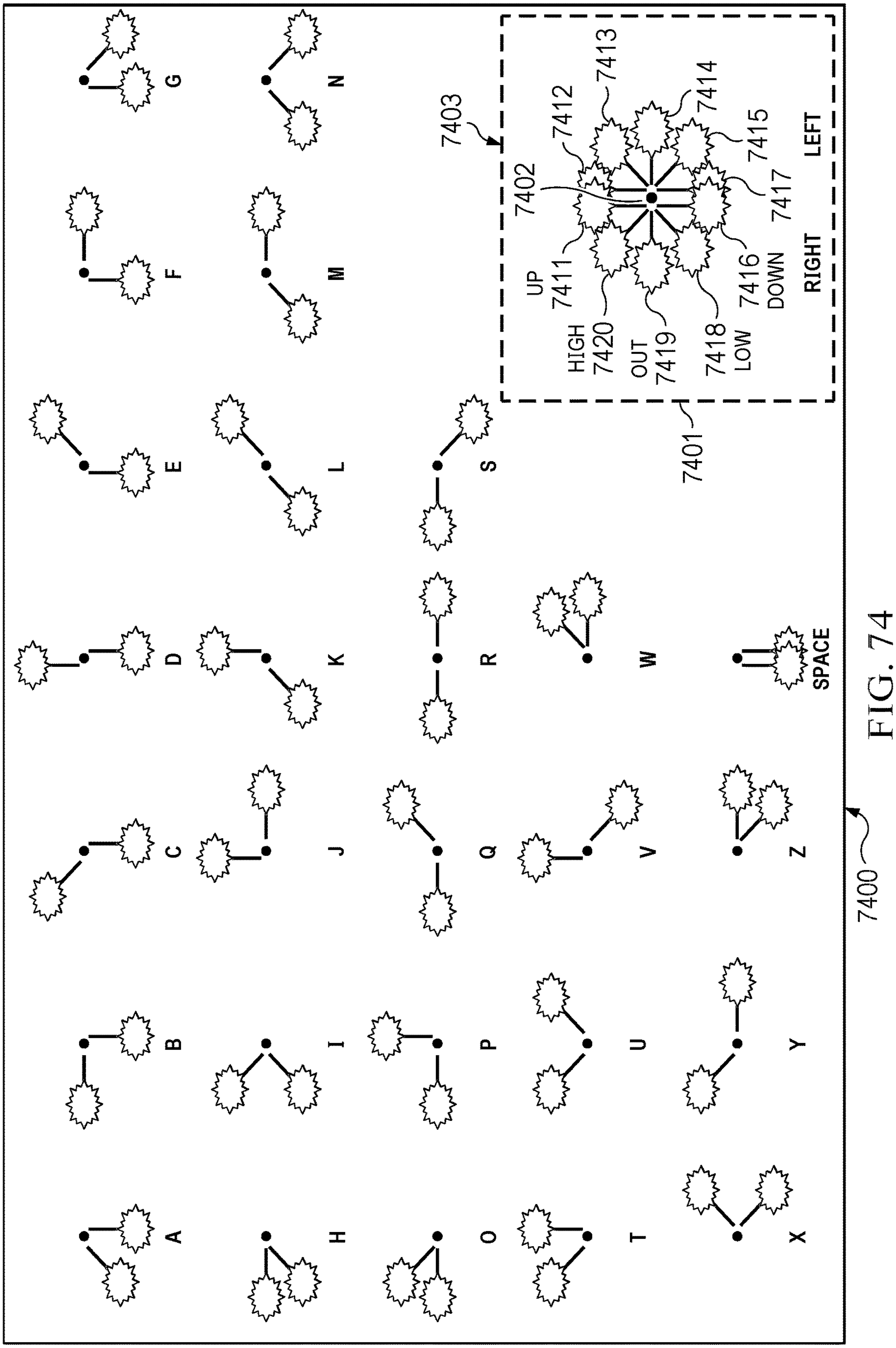
FIG. 74 is an illustration of a framework for encoding digital information in accordance with an illustrative embodiment.

Turning to FIG. 74, an illustration of a framework for encoding digital information in accordance with an illustrative embodiment. As depicted, framework 7400 is an example of framework that can be positional framework, or a positional in motion framework in these examples.

In this example, legend 7401 for framework 7400 identifies electromagnetic radiation that can be generated at end positions 7403 from reference position 7402 to end positions 7403 to thereby encode the digital information such as symbols. As shown in framework 7400, in this example of end positions 7403 in legend 7401 include end position 7411, end position 7412, end position 7413, end position 7414, end position 7415, end position 7416, end position 7417, end position 7418, end position 7419, and end position 7420.

In another example, legend 7401 for framework 7400 identifies electromagnetic radiation at end positions 7403 relative to reference position 7402 (shown in the center) with the motions between end positions 7403 that thereby encode the digital information. In this example, the motions can be from one end position to another end position. In another example, the motions can be from reference position 7402 to two of end positions 7403.

The motions can be identified using intermediate positions. In this example, the intermediate positions are not shown to avoid obscuring the illustration of different symbols that can be encoded using framework 7400.

In yet another illustrative example, the motions can be a linear motion or a curved motion from reference position 7402 to an end position in end positions 7403 with a linear or curved motion. The different motions from the reference position 7402 to an end position in end positions 7403 can encode symbols depending on the curved motion between these two positions.

Figure 75:
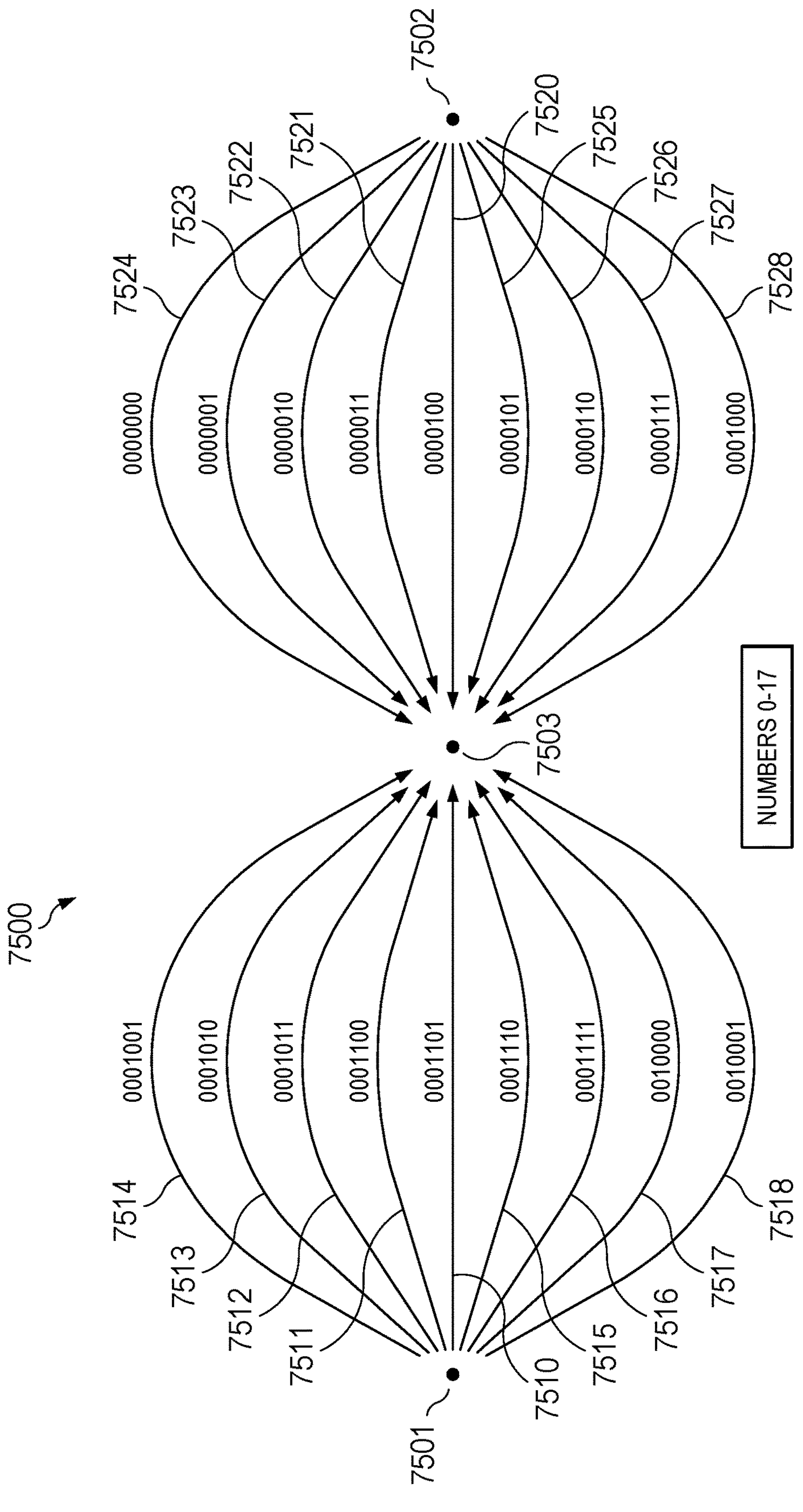
FIG. 75 is an illustration of horizontal linear and curved motions in accordance with an illustrative embodiment.

FIGS. 75-78 depict positions and motions between positions that encode symbols. With reference first to FIG. 75, an illustration of horizontal linear and curved motions is depicted in accordance with an illustrative embodiment. In this illustrative example, horizontal motions 7500 include horizontal linear motions and horizontal curved motions that represent symbols for numbers from 0 to 17. Horizontal motions 7500 begin at reference position 7503 and end at end position 7501 and at end position 7502. Direction and arc length are also used to represent symbols.

In this example, horizontal motions 7500 includes nine horizontal motions in a direction starting at reference positions 7503 and ending at end position 7501. The nine horizontal motions in this direction comprises horizontal linear motion 7510 that represents 0001101; horizontal curved motion 7511 that represents 0001100; horizontal curved motion 7512 that represents 0001011; horizontal curved motion 7513 that represents 0001010; horizontal curved motion 7514 that represents 0001001; horizontal curved motion 7515 that represents 0001110; horizontal curved motion 7516 that represents 0001111; horizontal curved motion 7517 that represents 0010000; and horizontal curved motion 7518 that represents 0010001.

Further, horizontal motions 7500 also include nine horizontal motions starting at reference position 7503 and ending at end position 7502. These horizontal curved motions comprise horizontal linear motion 7520 that represents 0000100; horizontal curved motion 7521 that represents 0000011; horizontal curved motion 7522 that represents 0000010; horizontal curved motion 7523 that represents 0000001; horizontal curved motion 7524 that represents 0000000; horizontal curved motion 7525 that represents 0000101; horizontal curved motion 7526 that represents 0000110; horizontal curved motion 7527 that represents 0000111; and horizontal curved motion 7528 that represents 0001000. Thus, horizontal motions 7500 encode different symbols based on a number of characteristics that include arc length, starting angle, and ending angle.

Figure 76:
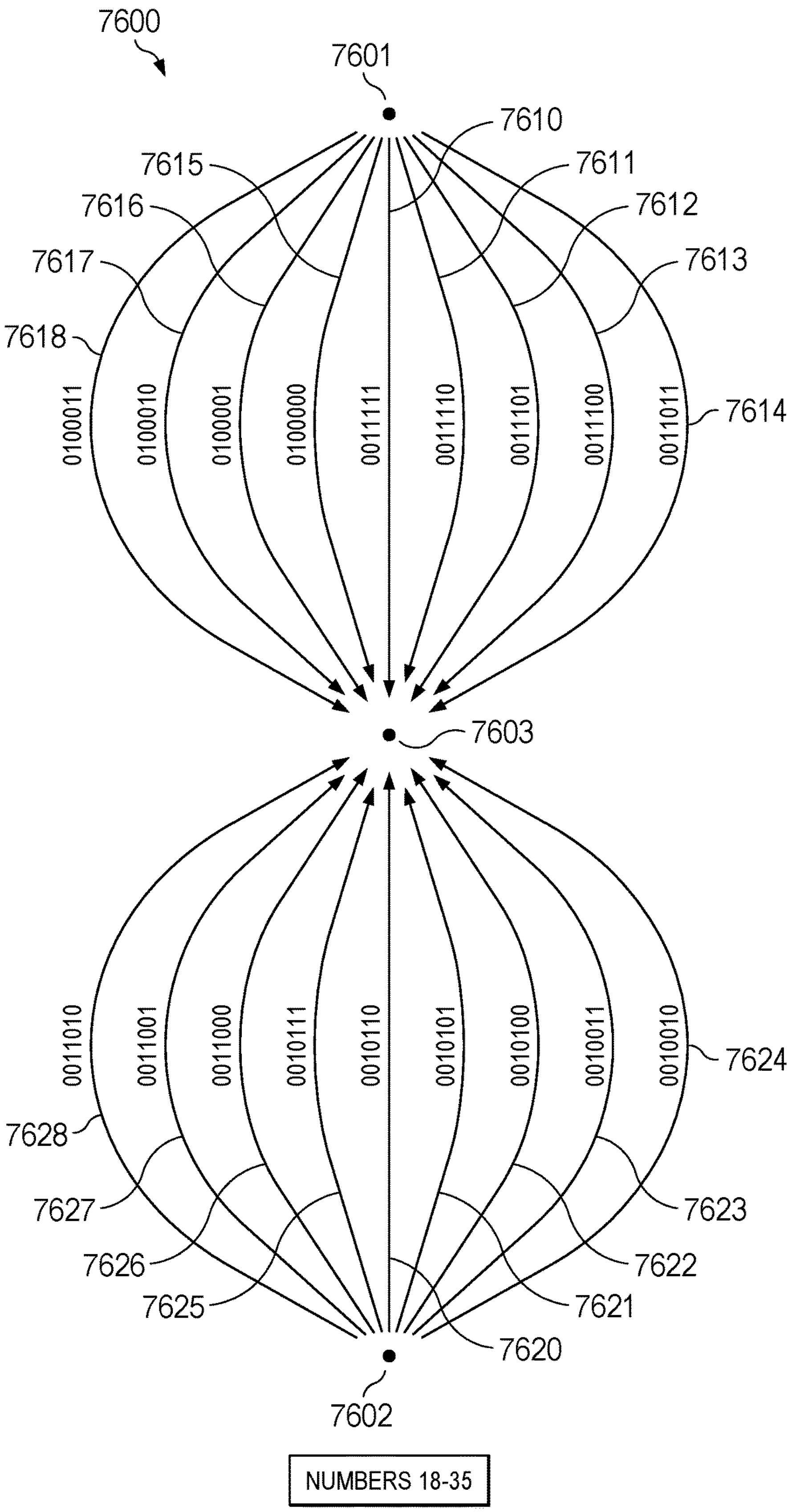
FIG. 76 is an illustration of vertical linear and curved motions in accordance with an illustrative embodiment.

Turning next to FIG. 76, an illustration of vertical linear and curved motions is depicted in accordance with an illustrative embodiment. In this illustrative example, vertical motions 7600 include vertical linear motions and vertical curved motions that represent symbols for numbers from 18 to 35. Vertical motions 7600 begin at reference position 7603 and end at end position 7601 and at end position 7602. Direction and arc length are also used to represent symbols.

In this example, vertical motions 7600 includes nine vertical motions in a direction starting at reference position 7603 and ending at end position 7601. The nine vertical motions in this direction comprise vertical linear motion 7610 that represents 0011111; vertical curved motion 7611 that represents 0011110; vertical curved motion 7612 that represents 0011101; vertical curved motion 7613 that represents 0011100; vertical curved motion 7614 that represents 0011011; vertical curved motion 7615 that represents 0100000; vertical curved motion 7616 that represents 0100001; vertical curved motion 7617 that represents 0100010; and vertical curved motion 7618 that represents 0100011.

Further, vertical motions 7600 also include nine vertical motions starting at reference position 7603 and ending at end position 7602. These vertical curved motions comprise vertical linear motion 7620 that represents 0010110; vertical curved motion 7621 that represents 0010101; vertical curved motion 7622 that represents 0010100; vertical curved motion 7623 that represents 0010011; vertical curved motion 7624 that represents 0010010; vertical curved motion 7625 that represents 0010111; vertical curved motion 7626 that represents 0011000; vertical curved motion 7627 that represents 0011001; and vertical curved motion 7628 that represents 0011010. Thus, vertical motions 7600 encode different symbols based on characteristics that include arc length, starting angle, and ending angle.

Figure 77:
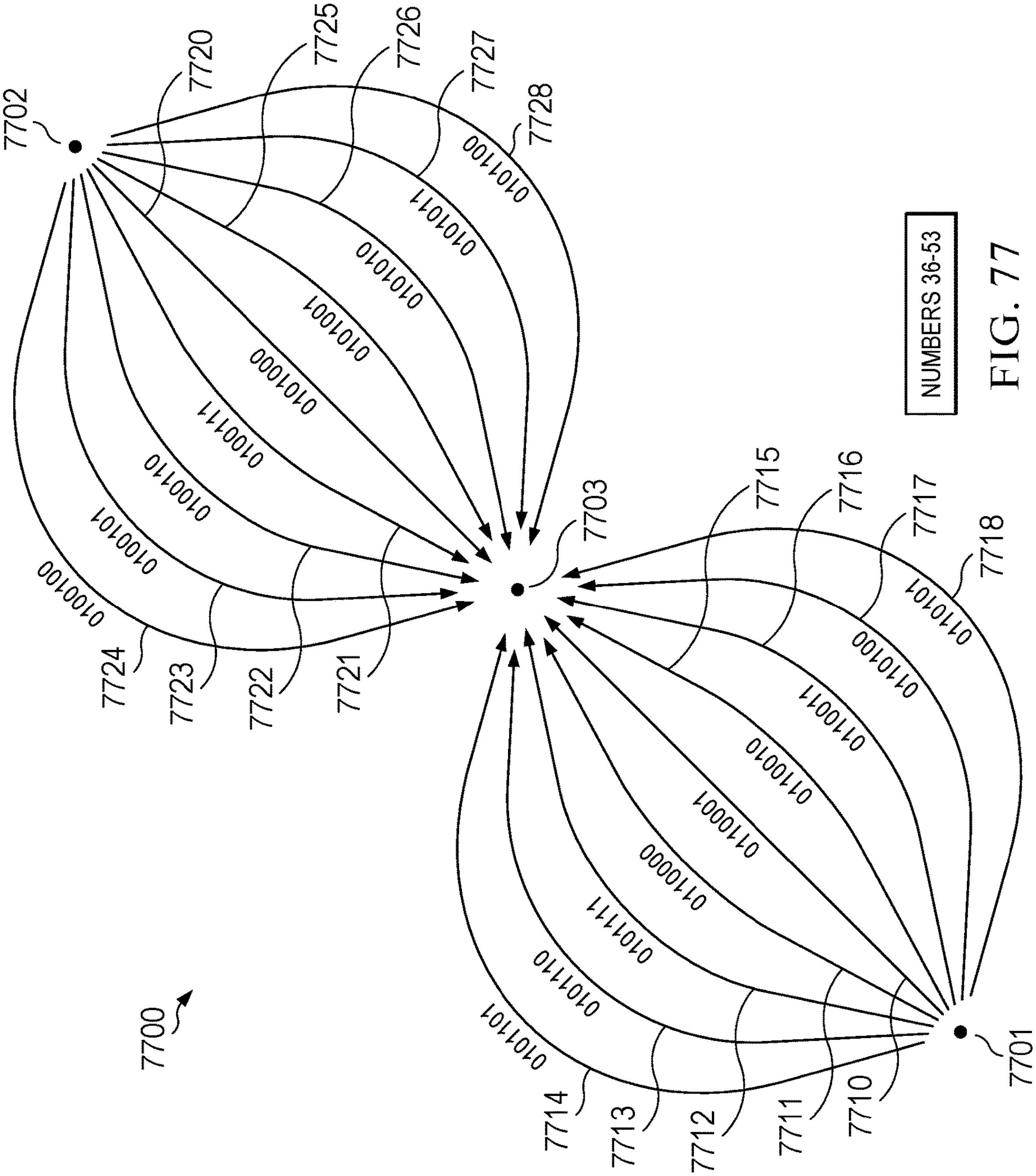
FIG. 77 is an illustration of first diagonal linear and first diagonal curved motions in accordance with an illustrative embodiment.

In FIG. 77, an illustration of first diagonal linear and first diagonal curved motions is depicted in accordance with an illustrative embodiment. In this illustrative example, first diagonal motions 7700 include first diagonal motions and first diagonal curved motions that represent symbols for numbers from 36 to 53. First diagonal motions 7700 begin at reference position 7703 and end at end position 7701 and at end position 7702. Direction and arc length are also used to represent symbols.

In this example, first diagonal motions 7700 include nine first diagonal motions in a direction starting at reference position 7703 and ending at end position 7701. The nine first diagonal motions in this direction comprise first diagonal linear motion 7710 that represents 0110001; first diagonal curved motion 7711 that represents 0110000; first diagonal curved motion 7712 that represents 0101111; first diagonal curved motion 7713 that represents 0101110; first diagonal curved motion 7714 that represents 0101101; first diagonal curved motion 7715 that represents 0110010; first diagonal curved motion 7716 that represents 0110011; first diagonal curved motion 7717 that represents 0110100; and first diagonal curved motion 7718 that represents 0110101.

Further, first diagonal motions 7700 also include nine first diagonal motions starting at reference position 7703 and ending at end position 7702. These first diagonal curved motions comprise first diagonal linear motion 7720 that represents 0101000; first diagonal curved motion 7721 that represents 0100111; first diagonal curved motion 7722 that represents 0100110; first diagonal curved motion 7723 that represents 0100101; first diagonal curved motion 7724 that represents 0100100; first diagonal curved motion 7725 that represents 0101001; first diagonal curved motion 7726 that represents 0101010; first diagonal curved motion 7727 that represents 0101011; and first diagonal curved motion 7728 that represents 0101100. Thus, first diagonal motions 7700 encode different symbols based on characteristics that include arc length, starting angle, and ending angle.

Figure 78:
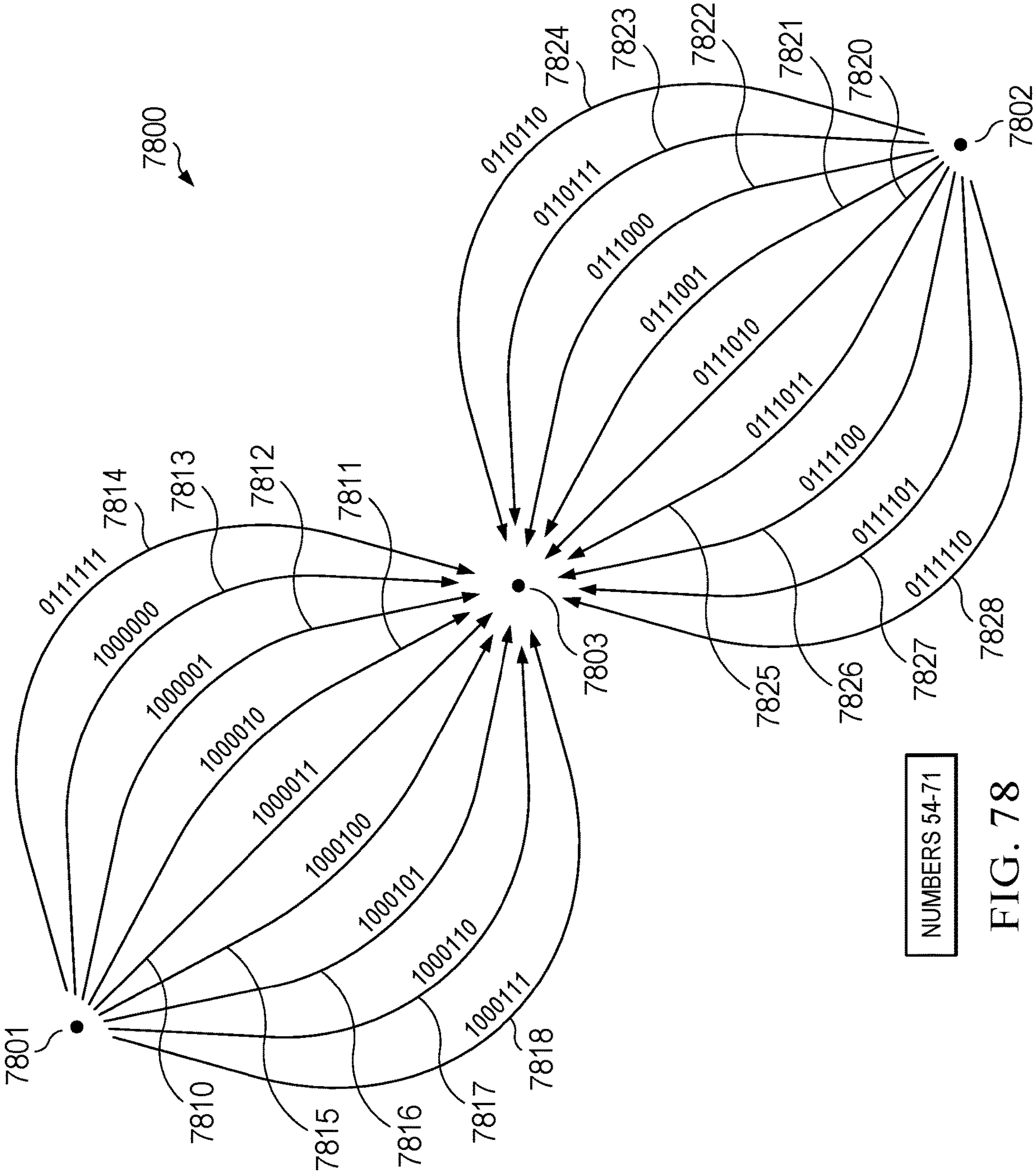
FIG. 78 is an illustration of second diagonal linear and second diagonal curved motions in accordance with an illustrative embodiment.

Turning next to FIG. 78, an illustration of second diagonal linear and second diagonal curved motions is depicted in accordance with an illustrative embodiment. In this illustrative example, second diagonal motions 7800 include second diagonal motions and second diagonal curved motions that represent symbols for numbers from 54 to 71. Second diagonal motions 7800 begin at reference position 7803 and end at end position 7801 and at end position 7802. Direction and arc length are also used to represent symbols.

In this example, second diagonal motions 7800 includes nine second diagonal motions in a direction starting at reference position 7803 and ending at end position 7801. The nine second diagonal motions in this direction comprise second diagonal linear motion 7810 that represents 1000011; second diagonal curved motion 7811 that represents 1000010; second diagonal curved motion 7812 that represents 1000001; second diagonal curved motion 7813 that represents 1000000; second diagonal curved motion 7814 that represents 0111111; second diagonal curved motion 7815 that represents 1000100; second diagonal curved motion 7816 that represents 1000101; second diagonal curved motion 7817 that represents 1000110; and second diagonal curved motion 7818 that represents 1000111.

Further, second diagonal motions 7800 also include nine second diagonal motions starting at reference position 7803 and ending at end position 7802. These second diagonal curved motions comprise second diagonal linear motion 7820 that represents 0111010; second diagonal curved motion 7821 that represents 0111001; second diagonal curved motion 7822 that represents 0111000; second diagonal curved motion 7823 that represents 0110111; second diagonal curved motion 7824 that represents 0110110; second diagonal curved motion 7825 that represents 0111011; second diagonal curved motion 7826 that represents 0111100; second diagonal curved motion 7827 that represents 0111101; and second diagonal curved motion 7828 that represents 0111110. Thus, second diagonal motions 7800 encode different symbols based on characteristics that include arc length, starting angle, and ending angle.

As a result, the different motions in FIGS. 75-78 can be used to encode 72 symbols for numbers from 0 to 71 in this example. In one example, these 72 symbols can be communicated in a single time interval with a single motion. With multiple lasers, electromagnetic radiation with two simultaneous moving positions can be used to represent 504 symbols. Electromagnetic radiation with three simultaneous moving positions can be used to represent 567 symbols; electromagnetic radiation with four simultaneous moving positions can be used to represent 540 symbols; and electromagnetic radiation with five simultaneous moving positions can be used to represent 550 symbols in a time interval.

Figure 79:
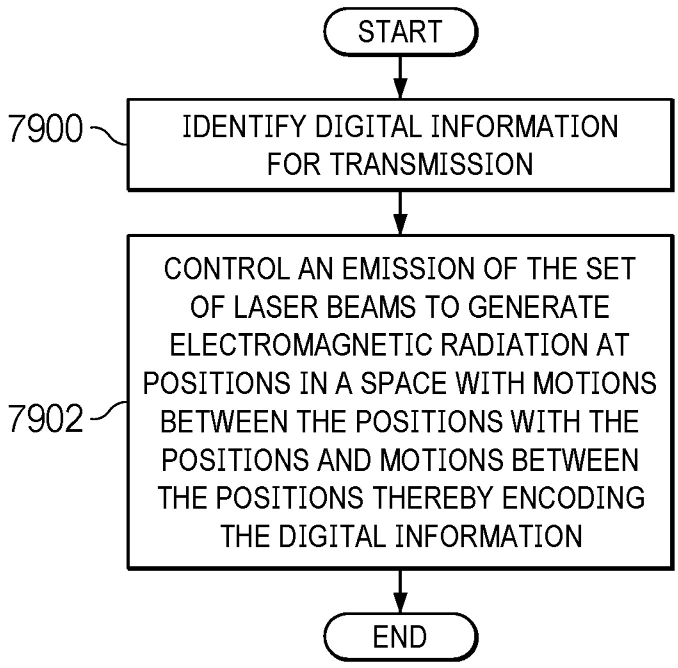
FIG. 79 is an illustration of a flowchart of a process for communicating digital information in accordance with an illustrative embodiment.

Turning next to FIG. 79, an illustration of a flowchart of a process for communicating digital information is depicted in accordance with an illustrative embodiment. The process in FIG. 79 can be implemented in hardware, software, or both. When implemented in software, the process can take the form of program instructions that are run by one of more processor units located in one or more hardware devices in one or more computer systems. For example, the process can be implemented in communications manager 7314 in computer system 7312 for communication system 7300 in FIG. 73.

The process begins by identifying digital information for transmission (operation 7900). The process controls an emission of the set of laser beams to generate electromagnetic radiation at positions in a space with motions between the positions with the positions and motions between the positions thereby encoding the digital information (operation 7902). The process terminates thereafter.

Figure 80:
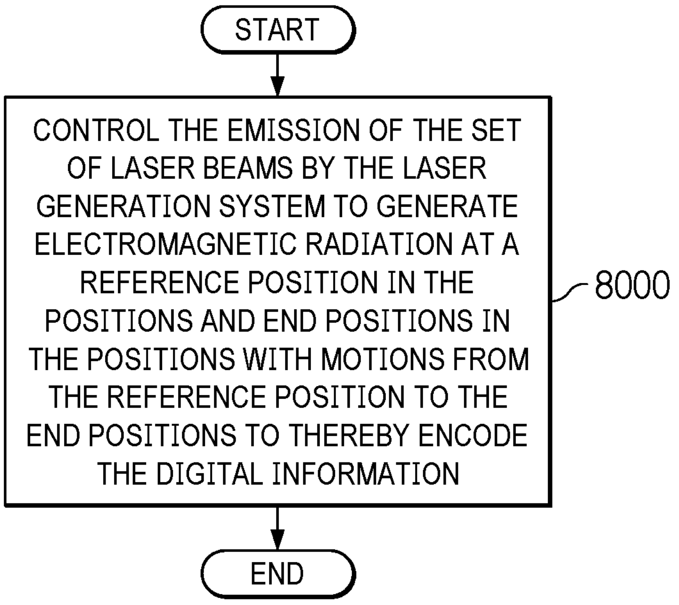
FIG. 80 is an illustration of a flowchart of a process for controlling emission of a set of laser beams in accordance with an illustrative embodiment.

With reference to FIG. 80, an illustration of a flowchart of a process for controlling emission of a set of laser beams is depicted in accordance with an illustrative embodiment. The process illustrated in this figure is an example of an implementation for operation 7902 in FIG. 79.

The process controls the emission of the set of laser beams by the laser generation system to generate electromagnetic radiation at a reference position in the positions and end positions in the positions with motions from the reference position to the end positions to thereby encode the digital information (operation 8000). The process terminates thereafter.

Figure 81:
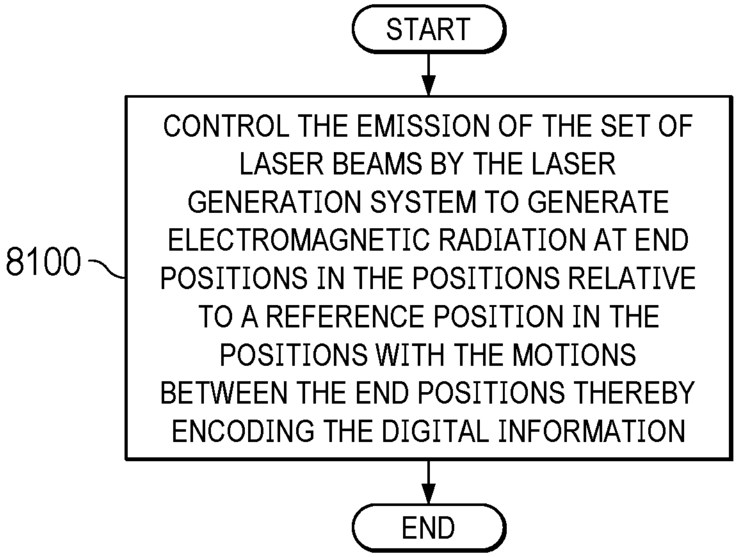
FIG. 81 is an illustration of a flowchart of a process for controlling emission of a set of laser beams in accordance with an illustrative embodiment.

Next in FIG. 81, an illustration of a flowchart of a process for controlling emission of a set of laser beams is depicted in accordance with an illustrative embodiment. The process illustrated in this flowchart is an example of an implementation for operation 7902 in FIG. 79.

The process controls the emission of the set of laser beams by the laser generation system to generate electromagnetic radiation at end positions in the positions relative to a reference position in the positions with the motions between the end positions thereby encoding the digital information (operation 8100). The process terminates thereafter.

Figure 82:
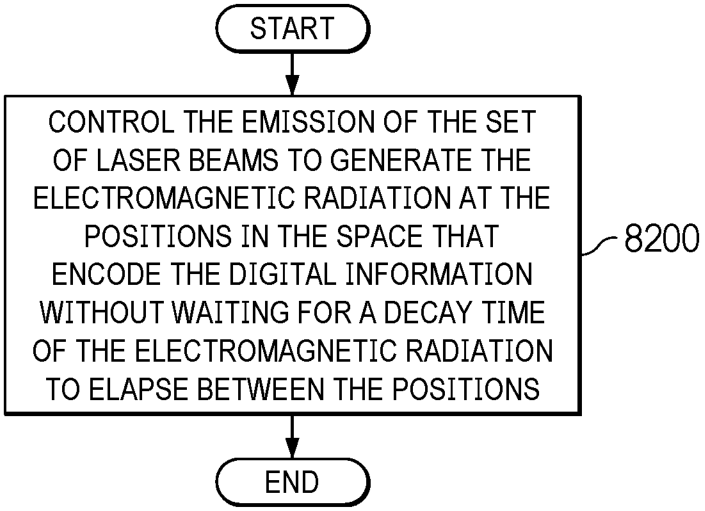
FIG. 82 is an illustration of a flowchart of a process for controlling emission of a set of laser beams in accordance with an illustrative embodiment.

Turning to FIG. 82, an illustration of a flowchart of a process for controlling emission of a set of laser beams is depicted in accordance with an illustrative embodiment. The process illustrated in this flowchart is an example of an implementation for operation 7902 in FIG. 79.

The process controls the emission of the set of laser beams to generate the electromagnetic radiation at the positions in the space that encode the digital information without waiting for a decay time of the electromagnetic radiation to elapse between the positions (operation 8200). The process terminates thereafter.

Figure 83:
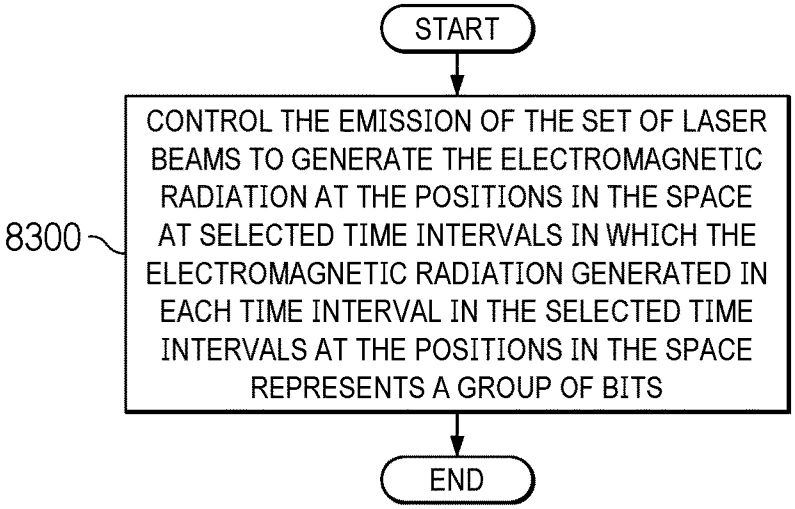
FIG. 83 is an illustration of a flowchart of a process for controlling emission of a set of laser beams in accordance with an illustrative embodiment.

In FIG. 83, an illustration of a flowchart of a process for controlling emission of a set of laser beams is depicted in accordance with an illustrative embodiment. The process illustrated in this flowchart is an example of an implementation for operation 7902 in FIG. 79.

The process controls the emission of the set of laser beams to generate the electromagnetic radiation at the positions in the space at selected time intervals in which the electromagnetic radiation generated in each time interval in the selected time intervals at the positions in the space represents a group of bits (operation 8300). The process terminates thereafter.

Figure 84:
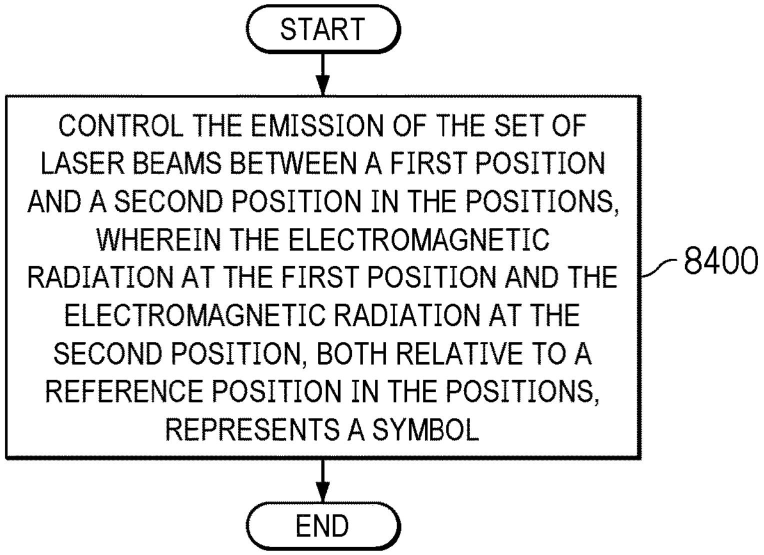
FIG. 84 is an illustration of a flowchart of a process for controlling emission of a set of laser beams in accordance with an illustrative embodiment.

Turning now to FIG. 84, an illustration of a flowchart of a process for controlling emission of a set of laser beams is depicted in accordance with an illustrative embodiment. The process illustrated in this flowchart is an example of an implementation for operation 7902 in FIG. 79.

The process controls the emission of the set of laser beams between a first position and a second position in the positions, wherein the electromagnetic radiation at the first position and the electromagnetic radiation at the second position, both relative to a reference position in the positions, represents a symbol (operation 8400). The process terminates thereafter. In operation 8400, the symbol is selected from a group consisting of a letter, a number, and an instruction. The symbol can be information in a semaphore alphabet.

Figure 85:
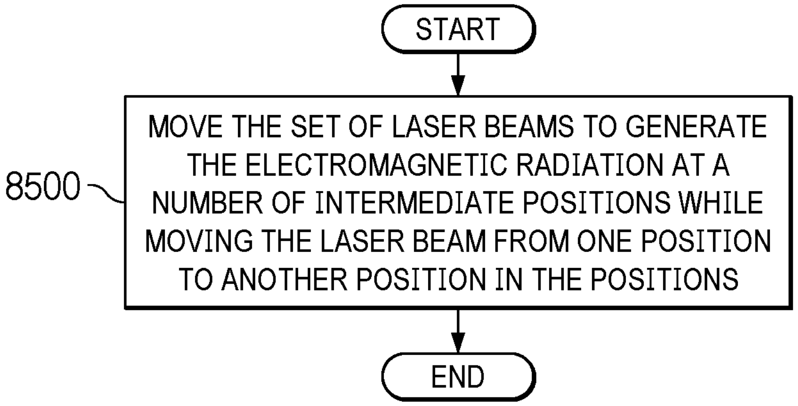
FIG. 85 is an illustration of a flowchart of a process for generating electromagnetic radiation in operation with an illustrative embodiment.

Next in FIG. 85, an illustration of a flowchart of a process for generating electromagnetic radiation is depicted in accordance with an illustrative embodiment. The operation in this flowchart is an example of an additional operation that can be performed with the operations in FIG. 79.

The process moves the set of laser beams to generate the electromagnetic radiation at a number of intermediate positions while moving the laser beam from one position to another position in the positions (operation 8500). The process terminates thereafter.

Figure 86:
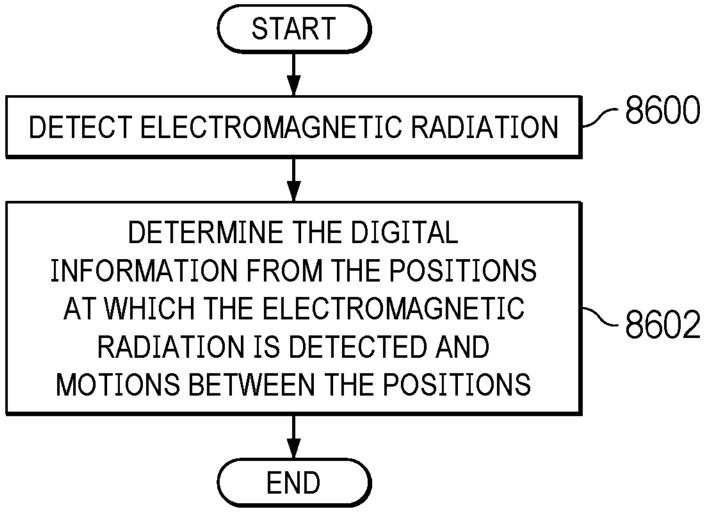
FIG. 86 is an illustration of a flowchart of a process for receiving digital information in accordance with an illustrative embodiment.

Turning to FIG. 86, an illustration of a flowchart of a process for receiving digital information is depicted in accordance with an illustrative embodiment. The process in this flowchart can be implemented using receiver 7391 in FIG. 71.

The process begins by detecting electromagnetic radiation (operation 8600). The process determines the digital information from the positions at which the electromagnetic radiation is detected and motions between the positions (operation 8602). The process terminates thereafter. In this example, the digital information can take the form of a symbol such as bits or other types of symbols encoded using the electromagnetic radiation.

Figure 87:
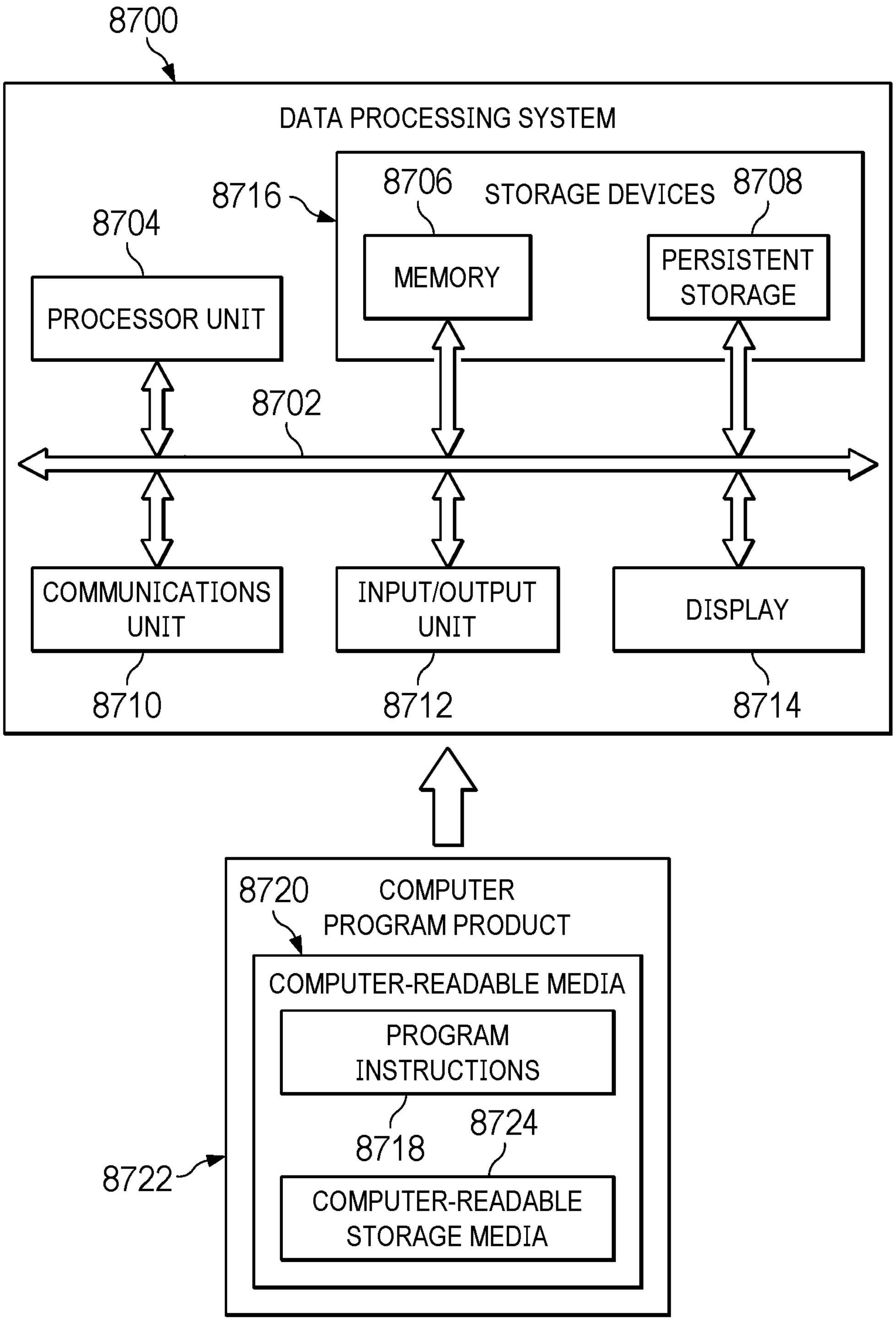
FIG. 87 is an illustration of a block diagram of a data processing system in accordance with an illustrative embodiment.

Turning now to FIG. 87, an illustration of a block diagram of a data processing system is depicted in accordance with an illustrative embodiment. Data processing system 8700 can be used to implement computer system 3612 in FIG. 36, computer system 5012 in FIG. 50 and computer system 7312 in FIG. 73. In this illustrative example, data processing system 8700 includes communications framework 8702, which provides communications between processor unit 8704, memory 8706, persistent storage 8708, communications unit 8710, input/output (I/O) unit 8712, and display 8714. In this example, communications framework 8702 takes the form of a bus system.

Processor unit 8704 serves to execute instructions for software that can be loaded into memory 8706. Processor unit 8704 includes one or more processors. For example, processor unit 8704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 8704 can be implemented using one or more heterogeneous processor systems in which a main processor is present with secondary processors on a single chip. As another illustrative example, processor unit 8704 can be a symmetric multi-processor system containing multiple processors of the same type on a single chip.

Memory 8706 and persistent storage 8708 are examples of storage devices 8716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 8716 may also be referred to as computer-readable storage devices in these illustrative examples. Memory 8706, in these examples, can be, for example, a random-access memory or any other suitable volatile or non-volatile storage device. Persistent storage 8708 may take various forms, depending on the particular implementation.

For example, persistent storage 8708 may contain one or more components or devices. For example, persistent storage 8708 can be a hard drive, a solid-state drive (SSD), a flash memory, a rewritable optical disk, a rewritable magnetic tape, or some combination of the above. The media used by persistent storage 8708 also can be removable. For example, a removable hard drive can be used for persistent storage 8708.

Communications unit 8710, in these illustrative examples, provides for communications with other data processing systems or devices. In these illustrative examples, communications unit 8710 is a network interface card.

Input/output unit 8712 allows for input and output of data with other devices that can be connected to data processing system 8700. For example, input/output unit 8712 may provide a connection for user input through at least one of a keyboard, a mouse, or some other suitable input device. Further, input/output unit 8712 may send output to a printer. Display 8714 provides a mechanism to display information to a user.

Instructions for at least one of the operating system, applications, or programs can be located in storage devices 8716, which are in communication with processor unit 8704 through communications framework 8702. The processes of the different embodiments can be performed by processor unit 8704 using computer-implemented instructions, which may be located in a memory, such as memory 8706.

These instructions are referred to as program instructions, computer usable program instructions, or computer-readable program instructions that can be read and executed by a processor in processor unit 8704. The program instructions in the different embodiments can be embodied on different physical or computer-readable storage media, such as memory 8706 or persistent storage 8708.

Program instructions 8718 are located in a functional form on computer-readable media 8720 that is selectively removable and can be loaded onto or transferred to data processing system 8700 for execution by processor unit 8704. Program instructions 8718 and computer-readable media 8720 form computer program product 8722 in these illustrative examples. In the illustrative example, computer-readable media 8720 is computer-readable storage media 8724.

Computer-readable storage media 8724 is a physical or tangible storage device used to store program instructions 8718 rather than a medium that propagates or transmits program instructions 8718. Computer-readable storage media 8724 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 8724, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation, or garbage collection. However, these operations do not render the storage device as transitory because the data is not transitory while the data is stored in the storage device.

Alternatively, program instructions 8718 can be transferred to data processing system 8700 using a computer-readable signal media. The computer-readable signal media are signals and can be, for example, a propagated data signal containing program instructions 8718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 8720" can be singular or plural. For example, program instructions 8718 can be located in computer-readable media 8720 in the form of a single storage device or system. In another example, program instructions 8718 can be located in computer-readable media 8720 that is distributed in multiple data processing systems. In other words, some instructions in program instructions 8718 can be located in one data processing system while other instructions in program instructions 8718 can be located in one data processing system. For example, a portion of program instructions 8718 can be located in computer-readable media 8720 in a server computer while another portion of program instructions 8718 can be located in computer-readable media 8720 located in a set of client computers.

The different components illustrated for data processing system 8700 are not meant to provide architectural limitations to the manner in which different embodiments can be implemented. In some illustrative examples, one or more of the components may be incorporated in or otherwise form a portion of, another component. For example, memory 8706, or portions thereof, may be incorporated in processor unit 8704 in some illustrative examples. The different illustrative embodiments can be implemented in a data processing system including components in addition to or in place of those illustrated for data processing system 8700. Other components shown in FIG. 87 can be varied from the illustrative examples shown. The different embodiments can be implemented using any hardware device or system capable of running program instructions 8718.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system comprising:

a laser generation system configured to emit a set of laser beams;

a computer system; and a communications manager in the computer system, wherein the communications manager is configured to: identify digital information for transmission; and control an emission of the set of laser beams by the laser generation system to generate electromagnetic radiation at positions in a space that encode the digital information, wherein as part of controlling the emission of the set of laser beams, the controller is configured to:

control the emission of the set of laser beams between a first position and a second position in the positions, wherein the electromagnetic radiation at the first position is a first logic value and the electromagnetic radiation at the second position is a second logic value, and wherein:

the first logic value is a "1" and the second logic value is a "0;" or the first logic value is the "0" and the second logic value is the "1".

2. The communications system of claim 1, wherein as part of controlling the emission of the set of laser beams, the controller is configured to:

generate the electromagnetic radiation at the positions in the space that encode the digital information without waiting for a decay time of the electromagnetic radiation to elapse between the positions.

3. The communications system of claim 1, wherein as part of controlling the emission of the set of laser beams, the controller is configured to:

generate the electromagnetic radiation at the positions in the space at selected time intervals in which the electromagnetic radiation generated in each time interval in the selected time intervals at the positions in the space represents a group of bits.

4. The communications system of claim 1, wherein as part of controlling the emission of the set of laser beams, the controller is configured to:

generate the electromagnetic radiation at the positions, wherein a presence of the electromagnetic radiation at a position in the positions is a first logic value and an absence of the electromagnetic radiation at the position in the positions is a second logic value, and wherein:

the first logic value is a "1" and the second logic value is a "0;" or the first logic value is the "0" and the second logic value is the "1".

5. The communications system of claim 1, wherein as part of controlling the emission of the set of laser beams, the controller is configured to:

control the emission of the set of laser beams at an array of positions in which each position in the array of positions represents a symbol.

6. The communications system of claim 5, wherein the array of positions is selected from a group consisting of a one-dimensional array, a two-dimensional array, and a three-dimensional array.

7. The communications system of claim 1, wherein the laser generation system is configured to at least one of:

emit a fixed laser beam at each position in the positions to generate the electromagnetic radiation; or move a laser beam from position to position in the positions to generate the electromagnetic radiation.

8. The communications system of claim 1, wherein a number of optical breakdowns at the positions in the space generated by the set of laser beams results in a number of plasma dots at the positions in the space.

9. The communications system of claim 1, wherein the electromagnetic radiation is selected from at least one of a visible light, an ultraviolet light, an infrared light, radio frequencies, or x-rays.

10. The communications system of claim 1, further comprising:

a receiver configured to detect electromagnetic radiation and determine the digital information from the positions at which the electromagnetic radiation is detected.

11. The communications system of claim 1, wherein the positions are:

on a surface of an object in the space; or in an empty space.

12. A method for communicating digital information, the method comprising:

identifying the digital information for transmission; and controlling an emission of a set of laser beams by a laser generation system to cause electromagnetic radiation at positions in a space that encode the digital information, wherein said controlling the emission of the set of laser beams comprises:

generating the electromagnetic radiation at the positions, wherein a presence of the electromagnetic radiation at a position in the positions is a first logic value and an absence of the electromagnetic radiation at the position in the positions is a second logic value, and wherein:

the first logic value is a "1" and the second logic value is a "0;" or the first logic value is the "0" and the second logic value is the "1".

13. The method of claim 12, wherein said controlling the emission of the set of laser beams comprises:

generating the electromagnetic radiation at the positions in the space that encode the digital information without waiting for a decay time of the electromagnetic radiation to elapse between the positions.

14. The method of claim 12, wherein said controlling the emission of the set of laser beams comprises:

generating the electromagnetic radiation at the positions in the space at selected time intervals in which the electromagnetic radiation occurs in each time interval in the selected time intervals represents a group of bits.

15. The method of claim 12, wherein said controlling the emission of the set of laser beams comprises:

controlling the emission of the set of laser beams between a first position and a second position in the positions, wherein the electromagnetic radiation at the first position is a first logic value and the electromagnetic radiation at the second position is a second logic value, and wherein:

the first logic value is a “1” and the second logic value is a “0;” or the first logic value is the “0” and the second logic value is the “1”.

16. The method of claim 12, wherein said controlling the emission of the set of laser beams comprises:

controlling the emission of the set of laser beams at an array of positions in which each position in the array of positions represents a symbol.

17. The method of claim 16, wherein the array of positions is selected from a group consisting of a one-dimensional array, a two-dimensional array, and a three-dimensional array.

18. The method of claim 12, wherein the laser generation system is configured to at least one of:

emit a fixed laser beam at each position in the positions to generate the electromagnetic radiation; or move a laser beam from position to position in the positions to generate the electromagnetic radiation.

19. The method of claim 12, wherein the electromagnetic radiation is selected from at least one of a visible light, an ultraviolet light, an infrared light, radio frequencies, or x-rays.

20. A computer program product for communicating digital information, the computer program product comprising a computer-readable storage medium having program instructions embodied therewith, the program instructions executable by a computer system to cause the computer system to perform the following computer operations:

identify the digital information for transmission; and control an emission of a set of laser beams by a laser generation system to cause electromagnetic radiation at positions in a space that encode the digital information, wherein control the emission of the set of laser beams comprises:

control the emission of the set of laser beams at an array of positions in which each position in the array of positions represents a symbol.

21. The computer program product of claim 20, wherein as part of controlling the emission of the set of laser beams, the program instructions are executable by the computer system to cause the computer system to:

generate the electromagnetic radiation at the positions in the space that encode the digital information without waiting for a decay time of the electromagnetic radiation to elapse between the positions.

22. The computer program product of claim 20, wherein as part of controlling the emission of the set of laser beams, the program instructions are executable by the computer system to cause the computer system to:

generate the electromagnetic radiation at the positions in the space at selected time intervals in which the electromagnetic radiation generated in each time interval in the selected time intervals at the positions in the space represents a group of bits.

* * * * *